United States Patent
Levien et al.

(10) Patent No.: US 8,726,366 B2
(45) Date of Patent: May 13, 2014

(54) ASCERTAINING PRESENTATION FORMAT BASED ON DEVICE PRIMARY CONTROL DETERMINATION

(75) Inventors: Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/373,796

(22) Filed: Nov. 29, 2011

(65) Prior Publication Data

US 2012/0254737 A1    Oct. 4, 2012

Related U.S. Application Data

(63) Continuation-in-part of application No. 13/065,885, filed on Mar. 30, 2011, and a continuation-in-part of application No. 13/065,964, filed on Mar. 31, 2011, and a continuation-in-part of application No. 13/066,848, filed on Apr. 25, 2011, now Pat. No. 8,402,535, and a continuation-in-part of application No. 13/066,917, filed on Apr. 26, 2011, now Pat. No. 8,347,399, and a continuation-in-part of application No. 13/135,314, filed on Jun. 29, 2011, and a continuation-in-part of application No. 13/135,392, filed on Jun. 30, 2011, and a continuation-in-part of application No. 13/199,237, filed on Aug. 22, 2011, and a continuation-in-part of application No. 13/199,286, filed on Aug. 23, 2011, and a continuation-in-part of application No. 13/200,743, filed on Sep. 28, 2011, and a continuation-in-part of application No. 13/200,800, filed on Sep. 29, 2011, and a continuation-in-part of application No. 13/317,827, filed on Oct. 27, 2011, and a continuation-in-part of application No. 13/317,832, filed on Oct. 28, 2011, and a continuation of application No. 13/373,679, filed on Nov. 23, 2011.

(51) Int. Cl.
    *G06F 21/00* (2013.01)

(52) U.S. Cl.
    USPC ............... 726/16; 726/21; 715/249; 715/862; 715/863; 715/864

(58) Field of Classification Search
    None
    See application file for complete search history.

(56) References Cited

U.S. PATENT DOCUMENTS

| | | |
|---|---|---|
| 6,002,427 A | 12/1999 | Kipust |
| 6,961,912 B2 | 11/2005 | Aoki et al. |

(Continued)

OTHER PUBLICATIONS

Noll, Josef; Alam, Sarfraz; Chowdhury, Mohammad M.R. Integrating Mobile Devices into Semantic Services Environments. ICWMC '08. Pub. Date: 2008. Relevant pp. 137-143. http://ieeexplore.ieee.org/stamp/stamp.jsp?tp=&arnumber=4591277.*

(Continued)

*Primary Examiner* — Cordelia Zecher
*Assistant Examiner* — Jeremiah Avery

(57) ABSTRACT

A computationally implemented method includes, but is not limited to: determining which of a plurality of users detected in proximate vicinity of a computing device has primary control of the computing device, the computing device designed for presenting one or more items; ascertaining one or more particular formats for formatting the one or more items based, at least in part, on said determining; and presenting, via the computing device, the one or more items in the one or more particular formats. In addition to the foregoing, other method aspects are described in the claims, drawings, and text forming a part of the present disclosure.

49 Claims, 28 Drawing Sheets

(56) References Cited

U.S. PATENT DOCUMENTS

| | | |
|---|---|---|
| 7,190,351 B1 | 3/2007 | Goren |
| 7,200,248 B2 | 4/2007 | Horiguchi |
| 7,260,726 B1 | 8/2007 | Doe et al. |
| 7,437,765 B2 | 10/2008 | Elms et al. |
| 7,649,444 B1 | 1/2010 | Fear et al. |
| 7,774,486 B2* | 8/2010 | Clarke .................... 709/230 |
| 7,868,778 B2* | 1/2011 | Kenwright ............... 340/686.6 |
| 8,279,242 B2 | 10/2012 | Bentley |
| 8,289,130 B2 | 10/2012 | Nakajima et al. |
| 8,406,162 B2* | 3/2013 | Haupt et al. .............. 370/311 |
| 2002/0176603 A1 | 11/2002 | Bauer et al. |
| 2003/0016253 A1 | 1/2003 | Aoki et al. |
| 2003/0107584 A1 | 6/2003 | Clapper |
| 2004/0015729 A1* | 1/2004 | Elms et al. ............... 713/201 |
| 2005/0039027 A1 | 2/2005 | Shapiro |
| 2005/0149726 A1 | 7/2005 | Joshi et al. |
| 2006/0052132 A1 | 3/2006 | Naukkarinen et al. |
| 2006/0277474 A1* | 12/2006 | Robarts et al. ............ 715/745 |
| 2007/0005616 A1 | 1/2007 | Hay et al. |
| 2007/0030824 A1 | 2/2007 | Ribaudo et al. |
| 2007/0042714 A1 | 2/2007 | Ayed |
| 2007/0052672 A1 | 3/2007 | Ritter et al. |
| 2007/0118604 A1 | 5/2007 | Costa Requena |
| 2007/0150827 A1* | 6/2007 | Singh et al. ............... 715/773 |
| 2007/0162574 A1 | 7/2007 | Williamson et al. |
| 2007/0174633 A1 | 7/2007 | Draper et al. |
| 2007/0234209 A1 | 10/2007 | Williams |
| 2007/0247425 A1 | 10/2007 | Liberty et al. |
| 2008/0159496 A1* | 7/2008 | Brown .................... 379/93.03 |
| 2008/0201783 A1 | 8/2008 | Tamai |
| 2008/0233996 A1 | 9/2008 | Ogasawara et al. |
| 2008/0266089 A1 | 10/2008 | Haren et al. |
| 2008/0271109 A1 | 10/2008 | Singh et al. |
| 2009/0005079 A1* | 1/2009 | Shields et al. ............. 455/456.3 |
| 2009/0006962 A1 | 1/2009 | Ives et al. |
| 2009/0015425 A1 | 1/2009 | Palmqvist et al. |
| 2009/0179765 A1 | 7/2009 | Nymark et al. |
| 2009/0210932 A1 | 8/2009 | Balakrishnan et al. |
| 2009/0239587 A1 | 9/2009 | Negron et al. |
| 2009/0240569 A1* | 9/2009 | Ramer et al. ............. 705/10 |
| 2009/0253410 A1* | 10/2009 | Fitzgerald et al. .......... 455/411 |
| 2009/0292930 A1 | 11/2009 | Marano et al. |
| 2009/0297064 A1 | 12/2009 | Koziol et al. |
| 2010/0053322 A1 | 3/2010 | Marti et al. |
| 2010/0124363 A1 | 5/2010 | Ek et al. |
| 2010/0157135 A1 | 6/2010 | Dossaji et al. |
| 2010/0167783 A1 | 7/2010 | Alameh et al. |
| 2010/0180210 A1* | 7/2010 | Toyama et al. ............. 715/750 |
| 2010/0222141 A1 | 9/2010 | LaSalvia et al. |
| 2010/0235667 A1 | 9/2010 | Mucignat et al. |
| 2011/0025842 A1 | 2/2011 | King et al. |
| 2011/0069940 A1 | 3/2011 | Shim y et al. |
| 2011/0072452 A1 | 3/2011 | Shim y et al. |
| 2011/0083109 A1* | 4/2011 | Hildebrandt et al. ......... 715/862 |
| 2011/0093806 A1 | 4/2011 | Cohen et al. |
| 2011/0107427 A1 | 5/2011 | Cohen et al. |
| 2011/0110557 A1 | 5/2011 | Clark et al. |
| 2011/0133908 A1 | 6/2011 | Leung |
| 2011/0141011 A1 | 6/2011 | Lashina et al. |
| 2011/0154266 A1 | 6/2011 | Friend et al. |
| 2011/0166972 A1 | 7/2011 | Cohen et al. |
| 2011/0197121 A1 | 8/2011 | Kletter |
| 2011/0202269 A1 | 8/2011 | Reventlow |
| 2011/0227856 A1 | 9/2011 | Corroy et al. |
| 2011/0231911 A1 | 9/2011 | White et al. |
| 2011/0265179 A1 | 10/2011 | Newman et al. |
| 2011/0317872 A1 | 12/2011 | Free |
| 2011/0321143 A1 | 12/2011 | Angaluri et al. |
| 2012/0017147 A1 | 1/2012 | Mark |
| 2012/0028625 A1 | 2/2012 | Konig |
| 2012/0062729 A1 | 3/2012 | Hart et al. |
| 2012/0081392 A1 | 4/2012 | Arthur |
| 2012/0088543 A1 | 4/2012 | Lindner et al. |
| 2012/0108215 A1 | 5/2012 | Kameli |
| 2012/0151339 A1 | 6/2012 | Zhang et al. |
| 2012/0166966 A1* | 6/2012 | Wood et al. .................... 715/750 |
| 2012/0191764 A1 | 7/2012 | Leibu et al. |
| 2012/0235790 A1 | 9/2012 | Zhao et al. |
| 2012/0254737 A1* | 10/2012 | Levien et al. ................. 715/249 |
| 2012/0254941 A1* | 10/2012 | Levien et al. ................. 726/3 |
| 2012/0254986 A1* | 10/2012 | Levien et al. ................. 726/17 |
| 2012/0256967 A1 | 10/2012 | Baldwin et al. |
| 2012/0293528 A1 | 11/2012 | Larsen |
| 2012/0311438 A1* | 12/2012 | Cranfill et al. ................ 715/256 |
| 2012/0330660 A1 | 12/2012 | Jaiswal |
| 2013/0065608 A1 | 3/2013 | Nakajima et al. |
| 2013/0159939 A1 | 6/2013 | Krishnamurthi |

OTHER PUBLICATIONS

U.S. Appl. No. 13/374,479, Levien et al.
U.S. Appl. No. 13/374,352, Levien et al.
U.S. Appl. No. 13/374,213, Levien et al.
U.S. Appl. No. 13/374,083, Levien et al.
U.S. Appl. No. 13/373,679, Levien et al.
U.S. Appl. No. 13/317,832, Levien et al.
U.S. Appl. No. 13/317,827, Levien et al.
U.S. Appl. No. 13/200,800, Levien et al.
U.S. Appl. No. 13/200,743, Levien et al.
U.S. Appl. No. 13/199,286, Levien et al.
U.S. Appl. No. 13/199,237, Levien et al.
U.S. Appl. No. 13/135,392, Levien et al.
U.S. Appl. No. 13/135,314, Levien et al.
U.S. Appl. No. 13/066,917, Levien et al.
U.S. Appl. No. 13/066,848, Levien et al.
U.S. Appl. No. 13/065,964, Levien et al.
U.S. Appl. No. 13/065,885, Levien et al.
"Computer Detecting User Presence Video Mockup [Ubuntu]"; Web Upd8.org; Bearing a date of Sep. 14, 2010; pp. 1-11; located at: http://www.webupd8.org/2010/09/computer-detecting-user-presence-video.html; printed on Mar. 30, 2011.
"How do I detect when a user is sitting in the chair in front of a computer?"; Superuser.com; Bearing a date of Aug. 11, 2009; 5 Total pages; located at: http://superuser.com/questions/21364/how-do-i-detect-when-a-user-is-sitting-in-the-chair-in-front-of-a-computer.
Pike, John; "Homeland Security: Biometrics"; GlobalSecurity.org; Bearing a date of Mar. 9, 2007; 4 Total pages; located at: http://www.globalsecurity.org/security/systems/biometrics.htm.
Hughes, Neil; "Apple Exploring Face Detection to Unlock, Customize & Interact with iOS Devices"; bearing a date of Apr. 5, 2012; pp. 1-4; AppleInsider; http://www.appleinsider.com/articles/12/04/05/apple_exploring_face_detection_to_unlock_customize_interact_with_ios_devices.html.
Kernchen et al.; "Multimodal user interfaces for context-aware mobile applications"; IEEE 16th International Symposium on Personal, Indoor and Mobile Radio Communications; bearing a date of Mar. 20, 2005; pp. 2268-2273; #1568961325; IEEE.

* cited by examiner

ASCERTAINING PRESENTATION FORMAT BASED ON DEVICE PRIMARY CONTROL DETERMINATION

CROSS-REFERENCE TO RELATED APPLICATIONS

For purposes of the USPTO extra-statutory requirements, the present application constitutes a continuation of U.S. patent application Ser. No. 13/373,679, entitled ASCERTAINING PRESENTATION FORMAT BASED ON DEVICE PRIMARY CONTROL DETERMINATION, naming Royce A. Levien; Richard T. Lord; Robert W. Lord; Mark A. Malamud; John D. Rinaldo, Jr.; Clarence T. Tegreene as inventors, filed 23 Nov. 2011, which is currently co-pending or is an application of which a currently co-pending application is entitled to the benefit of the filing date.

The present application is related to and claims the benefit of the earliest available effective filing date(s) from the following listed application(s) (the "Related Applications") (e.g., claims earliest available priority dates for other than provisional patent applications or claims benefits under 35 USC§119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

For purposes of the USPTO extra-statutory requirements, the present application constitutes a continuation-in-part of U.S. patent application Ser. No. 13/065,885, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 30 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,964, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 31 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,848, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 25 Apr. 2011 now U.S. Pat. No. 8,402,535, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,917, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 26 Apr. 2011 now U.S. Pat. No. 8,347,399, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/135,314, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 29 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/135,392, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 30 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,237, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 22 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,286, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 23 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,743, entitled PROVIDING GREATER ACCESS TO ONE OR MORE ITEMS IN RESPONSE TO VERIFYING DEVICE TRANSFER, naming Royce A. Levien; Richard T. Lord; Robert W. Lord; Mark A. Malamud; John D. Rinaldo, Jr.; Clarence T. Tegreene as inventors, filed 28 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,800, entitled PROVIDING GREATER ACCESS TO ONE OR MORE ITEMS IN RESPONSE TO VERIFYING DEVICE TRANSFER, naming Royce A. Levien; Richard T. Lord; Robert W. Lord; Mark A. Malamud; John D. Rinaldo, Jr.; Clarence T. Tegreene as inventors, filed 29 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/317,827, entitled PRESENTATION FORMAT SELECTION BASED AT LEAST ON DEVICE TRANSFER DETERMINATION, naming Royce A. Levien; Richard T. Lord; Robert W. Lord; Mark A. Malamud; John D. Rinaldo, Jr.; Clarence T. Tegreene as inventors, filed 27 Oct. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/317,832, entitled PRESENTATION FORMAT SELECTION BASED AT LEAST ON DEVICE TRANSFER DETERMINATION, naming Royce A. Levien; Richard T. Lord; Robert W. Lord; Mark A. Malamud; John D. Rinaldo, Jr.; Clarence T. Tegreene as inventors, filed 28 Oct. 2011, which is currently co-pending or is an application of which a currently co-pending application is entitled to the benefit of the filing date.

The United States Patent Office (USPTO) has published a notice to the effect that the USPTO's computer programs require that patent applicants both reference a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

A computationally implemented method includes, but is not limited to determining which of a plurality of users detected in proximate vicinity of a computing device has primary control of the computing device, the computing device designed for presenting one or more items; ascertaining one or more particular formats for formatting the one or more items based, at least in part, on said determining; and presenting, via the computing device, the one or more items in the one or more particular formats. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware in one or more machines or article of manufacture configured to effect the herein-referenced method aspects depending upon the design choices of the system designer.

A computationally implemented system includes, but is not limited to: means for determining which of a plurality of users detected in proximate vicinity of a computing device has primary control of the computing device, the computing device designed for presenting one or more items; means for ascertaining one or more particular formats for formatting the one or more items based, at least in part, on said determining; and means for presenting, via the computing device, the one or more items in the one or more particular formats. In addition to the foregoing, other system aspects are described in the claims, drawings, and text forming a part of the present disclosure.

A system includes, but is not limited to: a primary control determining module configured to determine which of a plurality of users detected in proximate vicinity of a computing device has primary control of the computing device, the computing device designed for presenting one or more items; a format ascertaining module configured to ascertain one or more particular formats for formatting the one or more items based, at least in part, on said determining; and a particular formatted item presenting module configured to present, via the computing device, the one or more items in the one or more particular formats. In addition to the foregoing, other system aspects are described in the claims, drawings, and text forming a part of the present disclosure.

A computationally implemented system includes, but is not limited to: circuitry for determining which of a plurality of users detected in proximate vicinity of a computing device has primary control of the computing device, the computing device designed for presenting one or more items; circuitry for ascertaining one or more particular formats for formatting the one or more items based, at least in part, on said determining; and circuitry for presenting, via the computing device, the one or more items in the one or more particular formats. In addition to the foregoing, other system aspects are described in the claims, drawings, and text forming a part of the present disclosure.

An article of manufacture includes, but is not limited to: a non-transitory storage medium bearing one or more instructions for determining which of a plurality of users detected in proximate vicinity of a computing device has primary control of the computing device, the computing device designed for presenting one or more items; one or more instructions for ascertaining one or more particular formats for formatting the one or more items based, at least in part, on said determining; and one or more instructions for presenting, via the computing device, the one or more items in the one or more particular formats. In addition to the foregoing, other computer program product aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
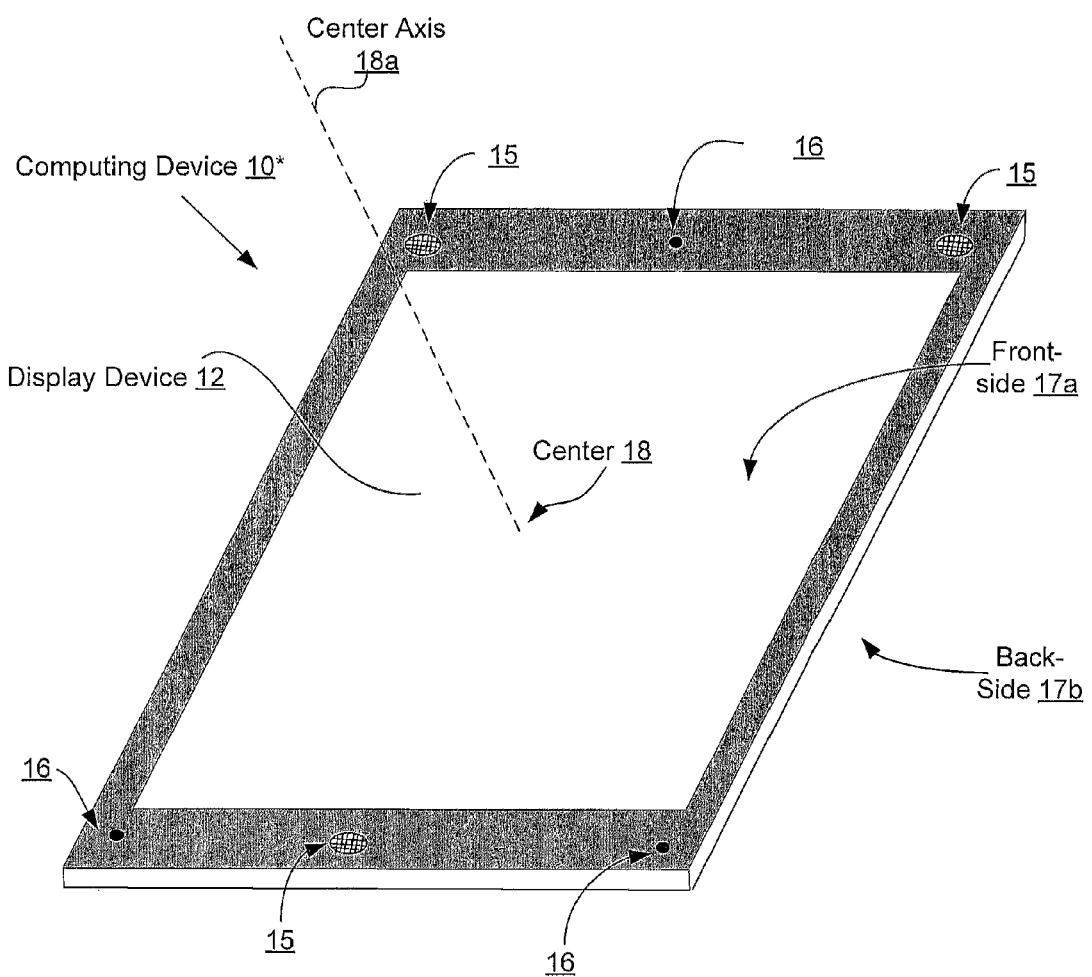
FIG. 1 shows an exemplary computing device 10* in accordance with various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) in recent years have greatly facilitated the development of computing devices having increasingly smaller form factors while still maintaining exceptional processing capabilities. Examples of such mobile computing devices include, for example, laptops, Netbooks, tablet computers (i.e., "slate" computers), e-readers, Smartphones, personal digital assistants (PDAs), and so forth. Because of their compactness, such mobile computing devices (herein "computing devices") are becoming much easier to share among a plurality of users. That is, due to their small form factors, such devices allow users of such devices to physically share such devices with friends, family, co-workers, clients, and so forth.

These portable computing devices, similar to their larger brethren, are able to visually and/or audibly present a wide variety of electronic items including, for example, applications, application interfaces, content, textual documents, audio and/or image files, electronic messages including textual, email, or audio messages, user credentials including passwords, Internet web pages, hyperlinks, and so forth (all of which will be referred to herein as "items") in a wide range of formats depending on, for example, the needs of users and the types of items to be presented. There are a number of ways to format items that may be visually and/or audibly presented through such devices.

One way to format such items (e.g., applications such as gaming, productivity, or communication applications, audio or image files, textual documents, web pages, communication messages, and so forth) is to directly format the items themselves. For example, items such as textual documents including word processing documents and email messages may be formatted to be presented in a wide variety of font styles and font sizes depending on, for example, the particular needs of users (e.g. elderly users with poor vision and/or hearing, or with unsteady fingers and having difficulty using, for example, a touchscreen). Another way to format such items is to configure a user interface (e.g., a display monitor and/or speakers) that is used to visually and/or audibly present the items (e.g., applications and content) in particular ways so that items that are presented through the user interface are presented in appropriate form. For example, a display monitor may be configured in a particular way so that one or more items (e.g., video files) that are to be displayed through the display monitor may be displayed through a screen having certain brightness and color background that may be, for example, desired by the end user.

By properly formatting the items that may be presented through a portable computing device, the needs of an end user who is consuming (e.g., viewing and/or listening) the formatted items may be best satisfied (note that "the needs of the end user" may be the actual needs or preferences of the end user or the needs of a third party as to how the items should be formatted when presented to the end user). Unfortunately when such portable computing devices are shared amongst a plurality of users having varying formatting requirements or needs, it may be difficult to correctly or properly format items which may be presented through such a device. For example, suppose a primary user (e.g., an owner) of a mobile computing device wants to show a particular electronic document being displayed through her computing device to a group of friends by handing-off the computing device to the group of friends. Prior to being passed-off to the group of friends, the electronic document may have been presented to the primary user in a particular format (e.g., particular font style or size, brightness, color, audio volume, etc.) that met the needs of the primary user. Unfortunately the original format of the electronic document (the format of the electronic document as the electronic document was being presented to the primary user) may not be the most appropriate or may not meet the needs of the group of friends who are being handed the portable computing device. There are also countless other situations, some of which will be described herein, where a mobile computing device (e.g., a tablet computer, an e-reader, a Smartphone, a laptop, and so forth) may be shared between a plurality of users having differing formatting needs and requirements.

In accordance with various embodiments, computationally implemented methods, systems, and articles of manufacture are provided that can automatically determine which of a plurality of users detected in proximate vicinity of a computing device that is designed for presenting one or more electronic items has primary control of the computing device; ascertaining one or more formats for formatting the one or more items based, at least in part, on determining which of the plurality of users has primary control of the computing device; and presenting through the computing device the one or more electronic items in the one or more particular formats. In various embodiments, such computationally implemented methods, systems, and articles of manufacture may be implemented at the computing device. Note that although the "computing device" to be described herein will be described/illustrated as being a tablet computer, in alternative embodiments, a computing device may take on other form factors including a variety of other types of portable/mobile computing devices including, for example, a Smartphone, a laptop computer, a Netbook, an e-reader, a personal digital assistant (PDA), and so forth.

Referring now to FIG. 1 illustrating a computing device 10* in the form of a tablet computer in accordance with various embodiments. For the embodiments, the computing device 10* may have at least a front-side 17a that includes a display device 12 (e.g., a touch screen), and a back-side 17b (not visible in FIG. 1 but shown in FIG. 2c) that is opposite of the front-side 17a. As further illustrated in FIG. 1, the front-side 17a of the computing device 10* may include a center 18 (note that in FIG. 1 a center axis 18a has been drawn-in that represents an axis originating from the center 18 of the front-side 17a of the computing device 10* and perpendicular to the surface of the front-side 17a of the computing device 10*). In various embodiments, the front-side 17a of the computing device 10* may include one or more camera lens or viewing ports 16 (e.g., one or more viewing ports 16 for one or more cameras including one or more digital cameras, webcams, infrared cameras, and/or other types of image capturing devices) and/or one or more audio ports 15 (e.g., one or more audio ports for one or more microphones). Note that although/the front-side 17a of the computing device 10* of FIG. 1 is illustrated as having three viewing ports 16 for three image capturing devices 304 (see FIG. 3f) and three audio ports 16 for three audio capturing devices 306 (see FIG. 3f), in alternative embodiments, the front-side 17a may include alternative number of viewing ports 16 and/or audio ports 15 than what is depicted in FIG. 1. Further, and although not shown in FIG. 1, in various embodiments, the backside 17b of the computing device 10* may also include one or more viewing ports 16 and/or audio ports 15 (see, for example, FIG. 2c, which shows at least one viewing port 16 and at least one audio port 15 included in the back-side 17b of the computing device 10*). Note that FIGS. 3a and 3b illustrate two different implementations of the computing device 10* of FIG. 1 illustrated in FIG. 3a as computing device 10' and in FIG. 3b as computing device 10". Note further that for purposes of the following, "*" represents a wildcard. Thus, references in the following to the "computing device 10*" may be in reference to the computing device 10' of FIG. 3a or the computing device 10" of FIG. 3b.

Figure 2A:
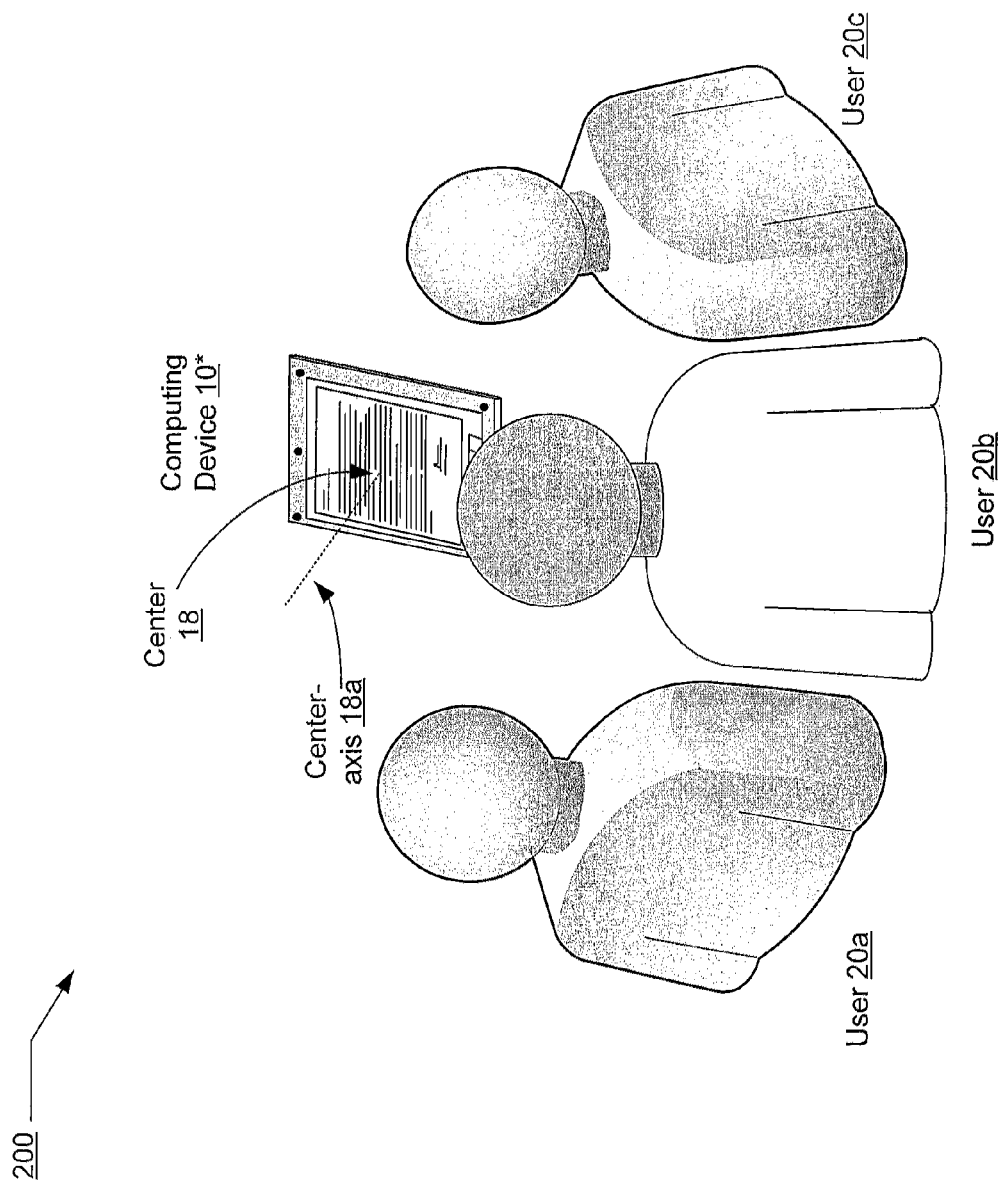
FIG. 2a shows an exemplary environment 200 in which a plurality of users 20a, 20b, and 20c are gathered around and being in the proximate vicinity of the computing device 10* of FIG. 1.

FIGS. 2a to 2d illustrate various exemplary environments in which a plurality of users 20* may be detected in the proximate vicinity of the computing device 10*. Referring particularly now to FIG. 2a illustrating an exemplary environment 200 in which a plurality of users 20* (e.g., user 20a, user 20b, and user 20c) are gathered around the computing device 10* of FIG. 1 in order to jointly use/access the computing device 10*. In some instances, the plurality of users 20a, 20b, and 20c, may have gathered around the computing device 10* even before the computing device 10* was initially powered-on or before the computing device 10* was awakened from, for example, a low power (e.g., sleep mode) state. For these situations, upon being awakened from a sleep or off-mode, the computing device 10* may be designed to automatically activate one or more sensors 120 (e.g., one or more movement sensors 302 such as accelerometers, one or more image capturing devices 304 such as digital cameras or webcams, and/or one or more audio capturing devices 306 such as microphones) in order to detect presence of one or more users 20* in the proximate vicinity of the computing device 10*.

Figure 2B:
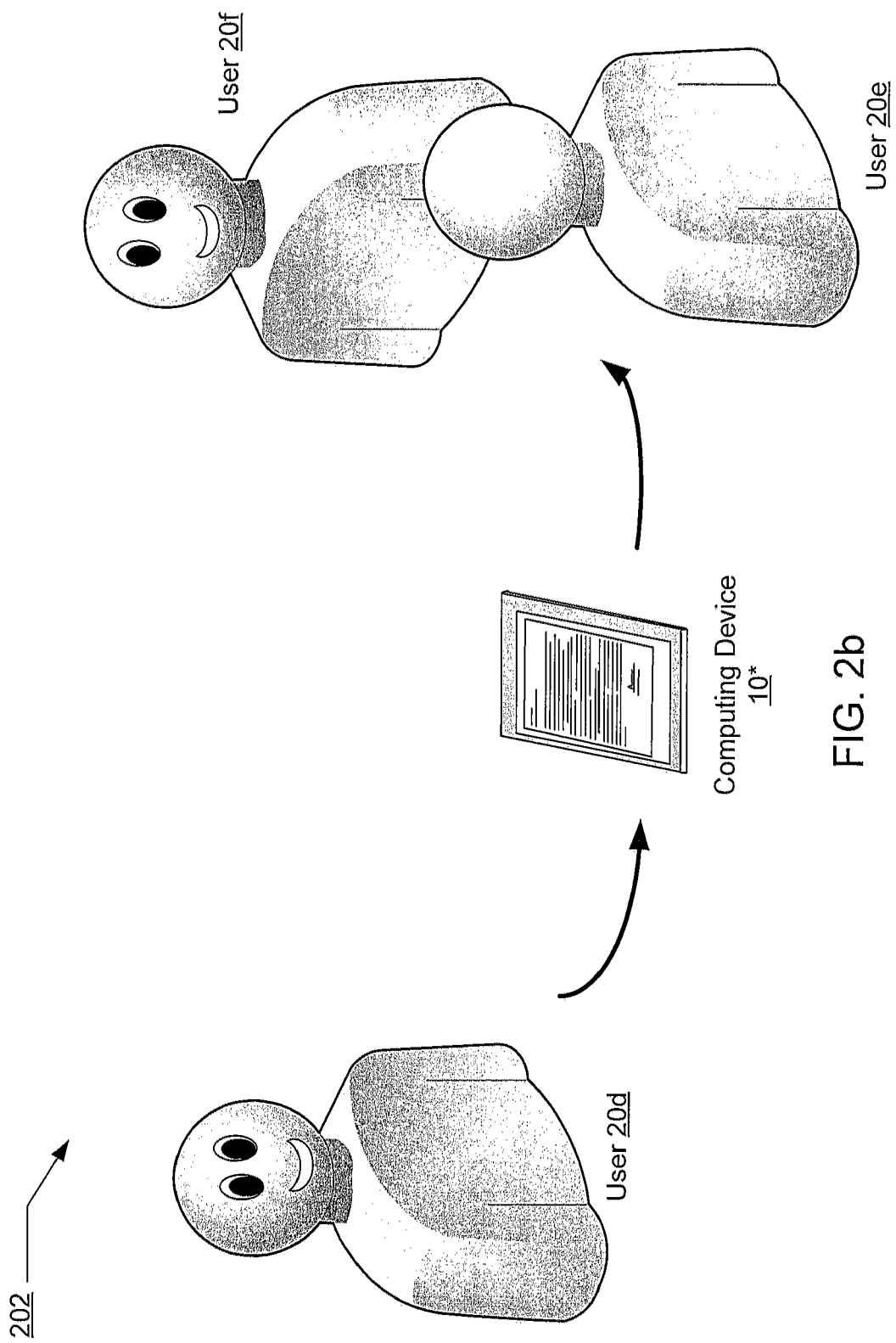
FIG. 2b shows another exemplary environment 202 in which primary control of the computing device 10* of FIG. 1 is being relinquished by a user 20d and being transferred to a plurality of users 20e and 20f.
Figure 3A:
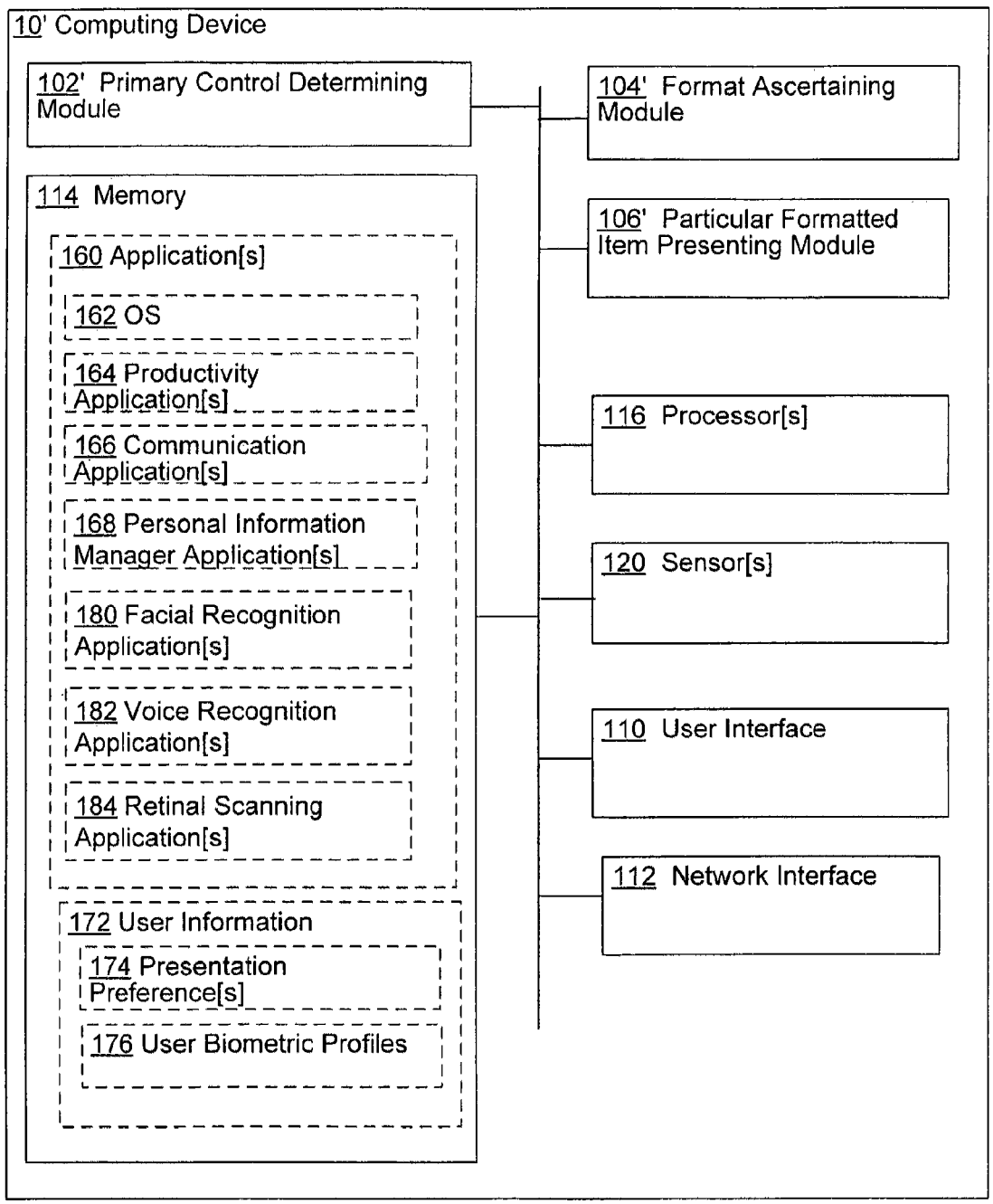
FIG. 3a shows a particular implementation of the computing device 10* of FIG. 1 illustrated as computing device 10'.
Figure 3B:
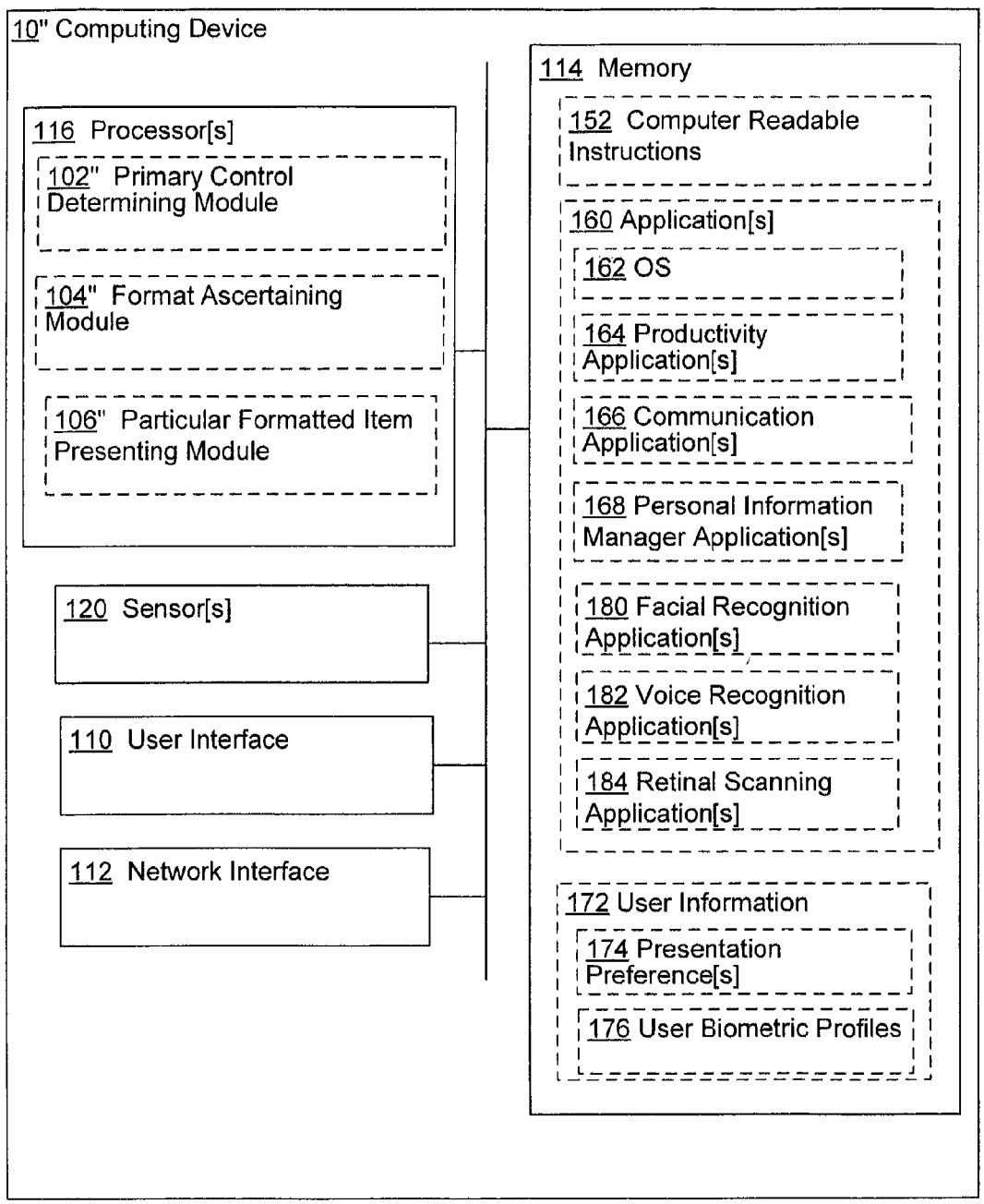
FIG. 3b shows another implementation of the computing device 10* of FIG. 1 illustrated as computing device 10".

Turning now to FIG. 2b illustrating another exemplary environment 202 in which primary control of the computing device 10* of FIG. 1 is being relinquished by a user 20d when the user 20d transfers the computing device 10* to a plurality of users 20e and 20f. In various embodiments, the computing device 10* may be designed to detect that the primary control of the computing device 10* is being relinquished by user 20d based on, for example, data provided by one or more sensors 120 (e.g., one or more movement sensors 302, one or more image capturing devices 304, and/or one or more audio capturing devices 306 as illustrated in FIG. 3f). For these embodiments, the computing devices 10* may additionally or alternatively be designed to detect the presence of multiple users 20e and 20f in the proximate vicinity of the computing device 10*.

The detection of the users 20e and 20f in the proximate vicinity of the computing device 10* in some cases may be based on data provided by one or more sensors 120. After detecting the presence of multiple users 20e and 20f in the proximate vicinity of the computing device 10*, the computing device 10* may be designed to determine which of the multiple users 20e and 20f has primary control of the computing device 10*. In various embodiments, such a determination may be based on the spatial locations of the multiple users 20e and 20f (e.g., spatial locations of the faces or eyes of users 20e and 20f) relative to, for example, the specific orientation of the computing device 10* (e.g., relative to the first side 18 of the computing device 10*). For example, in some cases, the computing device 10* or at least the logic endowed with computing device 10* may be designed to determine which of the users 20e and 20f (or the faces or eyes of the users 20e and 20f) detected in the proximate vicinity of the computing device 10* is centered on the front-side 17a (which may also be referred to herein as "first side") of the computing device 10* or centered nearest to the center 18 (e.g., nearest to center axis 18a) of the front-side 17a of the computing device 10*. Based on such a determination, a determination may be made as to which of the users 20e and 20f has primary control of the computing device 10*.

Figure 2C:
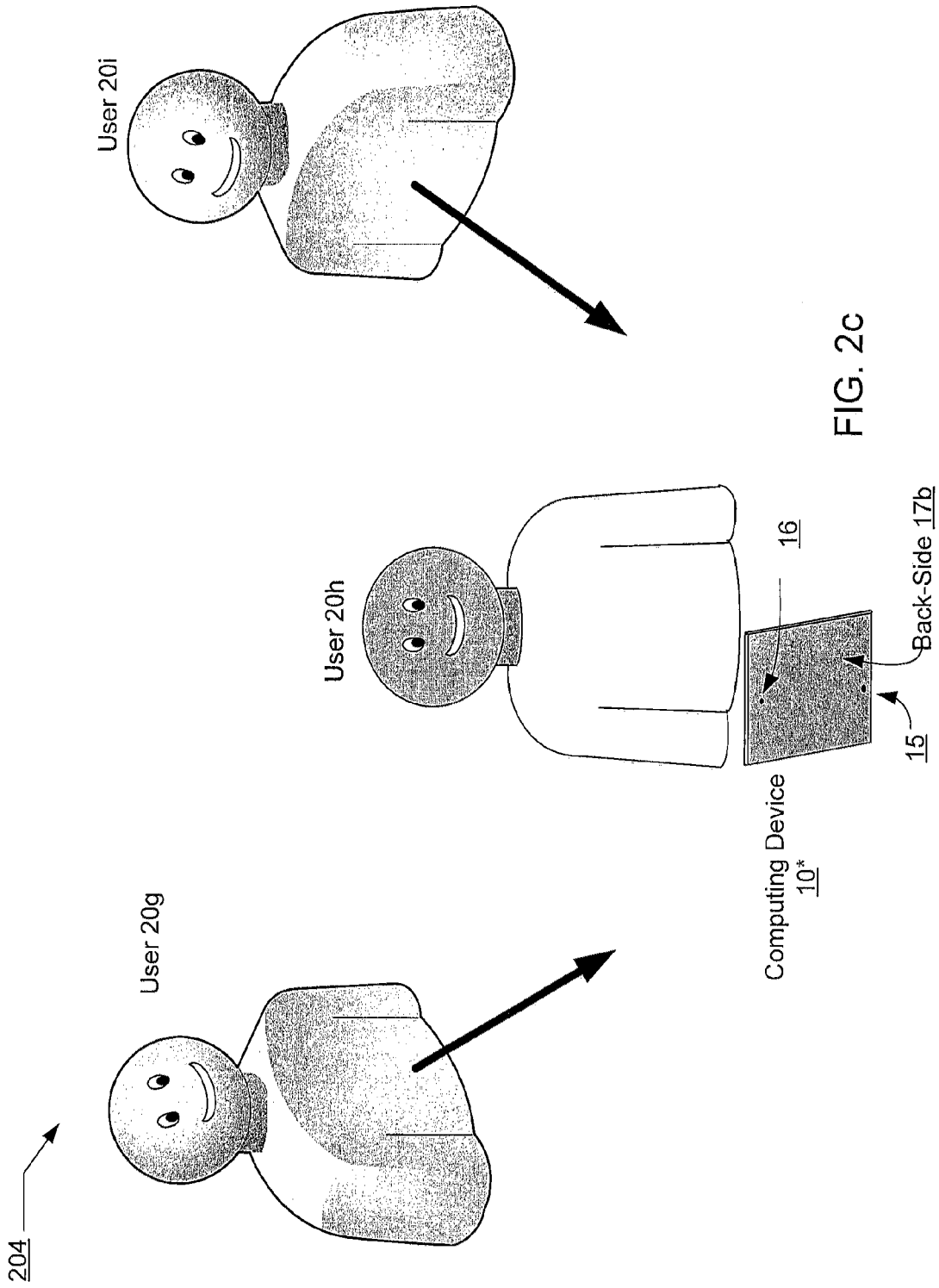
FIG. 2c shows another exemplary environment 204 in which two users 20g and 20i join a third user 20h in using/accessing the computing device 10* of FIG. 1.

Referring now to FIG. 2c illustrating another exemplary environment 204 in which two users, user 20g and user 20i joins a third user, user 20h in accessing (e.g., viewing and/or listening to visual and/or audio output via a touch screen and/or speakers, and/or providing input via, for example a touch screen) the computing device 10* of FIG. 1. In various embodiments, the computing device 10* may be designed to detect the presence of multiple users 20g, 20h, and 20i in the proximate vicinity of the computing device 10*. The detection of the users 20g, 20h, and 20i in the proximate vicinity of the computing device 10* in some cases may be based on data provided by one or more sensors 120). After detecting the presence of multiple users 20g, 20h, and 20i in the proximate vicinity of the computing device 10*, the computing device 10* may be designed to determine which of the multiple users 20g, 20h, and 20i has primary control of the computing device 10*. In various embodiments, such a determination may be based on the spatial locations of the multiple users 20g, 20h, and 20i (e.g., spatial locations of the faces or eyes of users 20g, 20h, and 20i) relative to, for example, the specific orientation of the computing device 10* (e.g., relative to the front-side 17a of the computing device 10*). For example, in some cases, the computing device 10* may be designed to determine which of the users 20g, 20h, and 20i (or the faces or eyes of the users 20g, 20h, and 20i) detected in the proximate vicinity of the computing device 10* is centered on the front-side 17a of the computing device 10* or centered nearest to the center 18 of front-side 17a of the computing device 10* (see FIG. 1). Based on such a determination, a determination may be made as to which of the users 20g, 20h, and 20i has primary control of the computing device 10*.

Figure 2D:
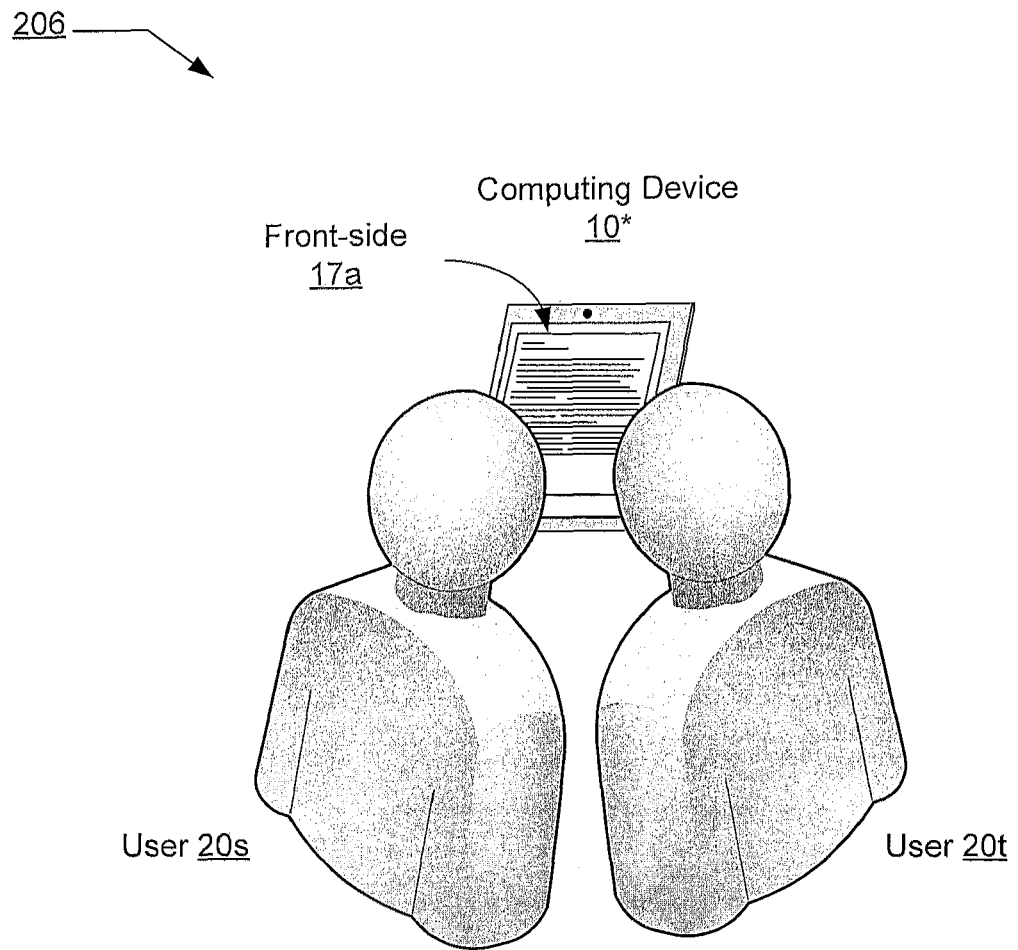
FIG. 2d shows another exemplary environment 206 in which two users 20s and 20t have joint primary control of the computing device 10* of FIG. 1.

Referring now to FIG. 2d illustrating another exemplary environment 206 in which two users, user 20s and user 20t, have joint primary control of the computing device 10*. As before, the computing device 10* may be designed to detect the presence of multiple users 20s and 20t in the proximate vicinity of the computing device 10*. After detecting the presence of multiple users 20s and 20t in the proximate vicinity of the computing device 10*, the computing device 10* may be designed to determine which of the multiple users 20s and 20t has primary control of the computing device 10*. In various embodiments, such a determination may be based on the spatial locations of each of the multiple users 20s and 20t (e.g., spatial locations of the faces or eyes of user 20s and 20t) relative to, for example, the specific orientation of the computing device 10* (e.g., relative to the front-side 17a of the computing device 10*).

For example, in some cases, the computing device 10* may be designed to determine which of the users 20s and 20t (or the faces or eyes of the users 20s and 20t) detected in the proximate vicinity of the computing device 10* is centered on the front-side 17a of the computing device 10* or centered nearest to the center 18 of front-side 17a of the computing device 10* (see FIG. 1). If the computing device 10* (or at least the logic endowed with the computing device 10*) determines that multiple users 20s and 20t have joint primary control of the computing device 10* (e.g., users 20s and 20t are determined to be equal distance from the first side 17a or the center 17 of the first side 17a of the computing device 10*), then the computing device 10* may be designed to use one or more tie-breaker rules to ascertain/select the one or more particular formats to apply to one or more items to be presented via the computing device 10*. For example, in some embodiments, the computing device 10* or the logic endowed with the computing device 10* may be designed to determine whether either of the users 20s and 20t having joint primary control are a primary user of the computing device 10* (e.g., a primary user is a user, such as an owner of the computing device 10*, who has greater accessing rights to the computing device 10* or its stored content/applications than, for example, a secondary user of the computing device 10*). If a determination is made that one of the users 20s and 20t is a primary user, then applying one or more particular formats that are determined to be associated with that user to the one or more items to be presented through the computing device 10* is performed. Alternatively, the computing device 10* (or the endowed logic) may be designed to determine whether either of the users 20s and 20t are a secondary user of the computing device 10*. If a determination is made that one of the users 20s and 20t is a secondary user, then applying one or more particular formats that are determined to be associated with that user to the one or more items to be presented through the computing device 10* is performed.

As will be further described herein, in various embodiments, data provided by one or more sensors 120 (e.g., one or more movement sensors 302, one or more image capturing devices 304, and/or one or more audio capturing devices 306 as illustrated in FIG. 3f) may be used to detect or determine at least the presence of one or more users (e.g., one or more persons) in the proximate vicinity (e.g., immediate surrounding area) of the computing device 10*. Examples of movement sensors 302 include, for example, accelerometers, inertia sensors, gyroscopes, and so forth. In some embodiments, data from such sensors 120 may also be used/analyzed in order to detect the specific spatial locations, relative to the computing device 10*, of those users detected in the proximate vicinity of the computing device 10*. Still further, data from such sensors 120 may be used in some embodiments in order to identify users 20* who may have primary control of the computing device 10*.

As will be further described herein, the illustrated computing device 10* may employ the computationally implemented methods, systems, and articles of manufacture in accordance with various embodiments for presenting one or more items in one or more particular formats, the one or more particular formats being ascertained/selected based on determining which of a plurality of users detected in the proximate vicinity of the computing device 10* has primary control of the computing device 10*. In particular, the computing device 10* may be endowed with logic that is designed to, among other things, detect the presence of a plurality of users 20* in the proximate vicinity of the computing device 10*, determine which of the plurality of users 20* detected in the proximate vicinity of a computing device 10* has primary control of the computing device 10*, ascertain one or more particular formats for formatting the one or more items based, at least in part, on determining which of the plurality of users 20* detected in the proximate vicinity of the computing device 10* had primary control of the computing device 10*; and to present, via the computing device 10*, the one or more items in the one or more particular formats. As will be further described herein, in various embodiments, the determination as to which of the plurality of users 20* detected in the proximate vicinity of the computing device 10* has "primary control" of the computing device 10* may be based on data provided by one or more sensors 120 (see FIGS. 3a, 3b, and 30 that may be included with the computing device 10*.

Turning briefly to FIGS. 3a and 3b, FIGS. 3a and 3b are two block diagrams representing two different implementations of the computing device 10* of FIG. 1 illustrated in FIG. 3a as computing device 10' and in FIG. 3b as computing device 10". In particular, and as will be further described herein, FIG. 3a illustrates a computing device 10' that is the "hardwired" or "hard" implementation of the computing device 10* of FIG. 1 in which certain logic modules including a primary control determining module 102', a format ascertaining module 104', and a particular formatted item presenting module 106' are implemented using purely hardware or circuitry components (e.g., application specific integrated circuit or ASIC). In contrast, FIG. 3b illustrates a computing device 10" that is the "soft" implementation of the computing device 10* of FIG. 1 in which certain logic modules including a primary control determining module 102", a format ascertaining module 104", and a particular formatted item presenting module 106" are implemented using electronic circuitry such as one or more processors (e.g., microprocessors, controllers, etc.) executing one or more programming instructions (e.g., software).

Note that the embodiments of the computing device 10* illustrated in FIGS. 3a and 3b are two extreme or opposite versions/implementations of the computing device 10* of FIG. 1 in which certain logic modules (e.g., the primary control determining module 102*, the format ascertaining module 104*, and the particular formatted item presenting module 106*) are implemented using purely "hardware solutions" (e.g., implemented using circuitry such as ASIC as illustrated in FIG. 3a, or using purely "software solutions" (e.g., implemented using software executed by hardware such as one or more processors) as illustrated in FIG. 3b. That is, those of ordinary skill in the art will recognize that the computing device 10* or at least the logic modules (e.g., the primary control determining module 102*, the format ascertaining module 104*, and the particular formatted item presenting module 106*) illustrated in FIGS. 3a and 3b, 3c, 3d, and 3e may be implemented using essentially any combination of hardware and software solutions. Since, there are many ways of combining hardware, software, and/or firmware in order to implement the various logic modules (e.g., the primary control determining module 102*, the format ascertaining module 104*, and the particular formatted item presenting module 106*), only the two extreme implementations illustrated in FIGS. 3a and 3b (e.g., the purely hardware solution as illustrated in FIG. 3a and the software solution of FIG. 3b) are illustrated here. It should be noted here that with respect to the "soft" implementation illustrated in FIG. 3b, hardware such as one or more processors 116 are still needed in order to execute the software. Further details related to the two implementations of computing device 10* illustrated in FIGS. 3a and 3b will be provided in greater detail below.

Various techniques may be employed in order to detect presence of users 20* in the proximate vicinity of the computing device 10*. For example, in some cases, a facial recognition system or software (e.g., facial recognition application 182 of FIGS. 3a and 3b) in combination with visual data provided by one or more image capturing devices 304 (e.g., webcams and/or digital cameras) may be employed in order to detect whether the faces of one or more users 20* are in the proximate vicinity of the computing device 10*. Alternatively or additionally, a voice recognition system or software (e.g., voice recognition application 182 of FIGS. 3a and 3b) in combination with audio data provided by one or more audio capturing devices 306 (e.g., microphones) may be employed in order to detect whether the voices of one or more users 20* are originating from the proximate vicinity of the computing device 10*. In still other cases, movement data provided by one or more movement sensors 302 may additionally or alternatively be used in order to detect whether the computing device 10* is exhibiting one or more movements (e.g., a heart or pulse rate, or particular gestural movements that have been transferred to the computing device 10* by being in contact with a particular user 20* and that is only known to the particular user 20*) that is determined to be associated with one or more users 20* (e.g., detection of such signature movements may at least infer that the computing device 10* is in physical contact with the one or more users 20*). As alluded to above, in some cases, data from a variety of sensors 120 (e.g., movement sensors 302, image capturing devices 304 and/or audio capturing devices 306) may be employed in order to determine whether one or more users 20* are in the proximate vicinity of the computing device 10*.

If the computing device 10*, or the logic endowed with the computing device 10*, determines that a plurality of users 20* are in the proximate vicinity (e.g., the immediate users around the computing device such as within ten feet, six feet, three feet, two feet, and so forth) of the computing device 10*, then that computing device 10* may be designed to determine which of the plurality of users 20* determined to be in the proximate vicinity of the computing device 10* has primary control of the computing device 10*. In some embodiments, such a determination may be automatically executed whenever the computing device 10*(or its endowed logic) detects that there are a plurality of users 20* in the proximate vicinity of the computing device 10*. In some alternative embodiments, and as will be described below, the determination as to which of a plurality of users 20* detected in the proximate vicinity of the computing device 10* has primary control of the computing device 10* may be automatically done whenever a user 20*(e.g., who may be a primary user or a secondary user having inferior access rights than the primary user) is detected relinquishing primary control of the computing device 10*. In various embodiments, the "proximate vicinity" of the computing device 10* may be the immediate area surrounding the computing device 10* from which a user 20* may access (e.g., hear, see, use, manipulate, modify, and so forth) one or more items (e.g., electronic files or documents, software applications, audio or image files, passwords, and so forth) through the computing device 10*.

As will be further described herein, the determination as to which users 20* detected in the proximate vicinity of the computing device 10* has "primary control" of the computing device 10* may be accomplished in a number of different ways in various alternative embodiments. For example, in some embodiments, the determination as to which users 20* detected in the proximate vicinity of the computing device 10* has primary control of the computing device 10* may involve at least initially detecting or determining the specific spatial locations of the plurality of users 20* with respect to the computing device 10*. In some cases, this may mean detecting the specific spatial locations of certain features such as the faces or eyes of each of the plurality of the users 20* with respect to the computing device 10* or with respect to the specific orientation of the computing device 10*. That is, typically those users 20* detected as being on the backside 17b (see FIGS. 1 and 2c) of the computing device 10* can be discounted as having primary control when determining which users 20* has primary control of the computing device 10* since users 20* who are determined to be on the backside 17b of the computing device 10* will have limited access at least to the display device 12. Thus, a strong inference may be made that those users 20* detected as being on the back-side 17b of the computing device 10* will not have primary control of the computing device 10*.

In various embodiments, the determination of the specific spatial locations of the plurality of users 20*(e.g., specific spatial locations of the faces or eyes of the plurality of users 20*) may be based on visual data provided by one or more image capturing devices 304 and/or based on audio data provided by one or more audio capturing devices 306. By employing, for example, parallax techniques, and based on data provided by, for example, one or more image capturing devices 304 (providing image data from different angles) the specific spatial locations of each of the plurality of users 20* detected in the proximate vicinity of the computing device 10* may be determined at least with respect to the computing device 10*(e.g., determined relative to the specific spatial location of the computing device 10*). In some embodiments, the computing device 10* may employ multiple image capturing devices 304 and/or multiple audio capturing devices 306 in order to more accurately determine the specific spatial locations of each of the detected users 20*(e.g., parallax techniques for determining distances typically require a minimum of two different lines of sight) relative to the location of the computing device 10*. Thus, more accurate results may be obtained by using data provided by multiple sensors 120 (e.g., multiple image capturing devices 304).

After the computing device 10* (or at least the logic endowed with the computing device 10*) determines the specific spatial locations of each of the plurality of users 20* detected in the proximate vicinity of the computing device 10*, a determination may be made by the computing device 10* as to which of the detected users 20* detected in the proximate vicinity of the computing device 10* has primary control of the computing device 10* based on the specific spatial locations of the plurality of users 20*. In order to make such a determination (e.g., which detected user 20* has "primary control" of the computing device 10*), in some embodiments, the computing device 10* may be designed to determine which user 20* detected to be in the proximate vicinity of the computing device 10* is actually nearest or closest to the computing device 10*. More particularly, in some cases, the computing device 10*(or the endowed logic) may be designed to determine which of the plurality of users 20* is nearest to the front-side 17a (or the display device 12) of the computing device 10*. In various embodiments, those users 20* determined to be nearest to the computing device 10* or at least to the front-side 17a of the computing device 10* may be determined to have primary control of the computing device 10*. Of course, in many cases, particularly in situations where a plurality of users 20* are in close quarters with the computing device 10*, it may be difficult to determine which of the users 20* is actually closest or nearest to the computing device 10*. For these situations, the determination as to which user 20* is nearest to the computing device 10* may be based on a determination as to which user's particular physical features (e.g., a face or eyes) is nearest to, for example, the front-side 17a of the computing device 10* or is located closest to the center 18 or center axis 18a of the front-side of the computing device 10*.

In some embodiments, in order to determine which user 20* has primary control of the computing device 10*, the computing device 10*(or at least the logic endowed with the computing device 10*) may be additionally or alternatively designed to determine which of the plurality of users 20* is or are spatially located principally on the front-side 17a of the computing device 10*. For these embodiments, the computing device 10* may be designed to determine which of the plurality of users 20*(e.g., determine which of the eyes or faces of the plurality of users 20*) is or are located centered on the front-side 17a or spatially centered closest to the center 18 (or center axis 18a) of the front-side 17a of the computing device 10*. For example, in FIG. 2a, user 20b appears to be nearest to the center 18 (or center axis 18a) of the front-side 17a and would, therefore, be considered to have primary control of the computing device 10*.

In some embodiments, in order to determine which of the plurality of users 20* detected in the proximate vicinity of the computing device 10* has primary control of the computing device 10*, the computing device 10* may be designed to detect whether the computing device is exhibiting one or more movements that at least substantially matches with one or more signature movements (e.g., heart or pulse rate, or personal gestures) of one or more users 20* detected as being in the proximate vicinity of the computing device 10*. By making such a determination, an inference may be made that those users 20*, whose signature movements appears to be exhibited by the computing device 10*, may be in contact with the computing device 10*, and therefore, has primary control of the computing device 10*.

Note that in cases where multiple users 20* are deemed to have primary control of the computing device 10*, the computing device 10* may be designed to use tie-breaker rules in order to provide the proper formatting to the one or more items as will be described herein. For example, and as will be further described below, in some embodiments, if two or more users 20* are determined to have primary control of the computing device 10*(e.g., the faces of multiple users 20* are detected to be equal distance from the first side 18 of the computing device 10*), then the format to be applied to the one or more items to be presented through the computing device 10* may be a format that is associated with (e.g., linked to or connected to) one of the users 20* who have been determined to have primary control of the computing device 10* and who is also a primary user (e.g., an owner or another user who has superior accessing rights to the computing device 10* or its content than secondary users of the computing device 10*) of the computing device 10*. Alternatively, the format to be applied to the one or more items to be presented through the computing device 10* may be a format that is associated with one of the users 20* who have been determined to have primary control of the computing device 10* and who is determined to be a secondary user of the computing device 10*.

As part of determining which of the plurality of users 20* detected in the proximate vicinity of the computing device 10* has primary control of the computing device 10*, the computing device (or at least the logic endowed with the computing device 10*) may be designed to at least partially identify the one or more users determined to have primary control of the computing device 10\*. That is, in various embodiments, the computing device 10\* may be able to determine whether those users 20\* determined to have primary control of the computing device 10\* is or are registered users who have been registered with the computing device 10\*. In some embodiments, a user 20\* may be a registered user when the user's one or more identification credentials (e.g., biometric profiles such as facial profile or voice profile) and/or presentation preferences 174 (see FIGS. 3a and 3b) of the user 20\* have been registered (e.g., inputted or entered) with the computing device 10\*. In some cases, a user's identification credentials may be registered with the computing device 10\* when a user's input identification credentials have been registered with the computing device 10\*. For purposes of the following, the user's input identification credentials may be, for example, personal (or secret) finger or body gestures that may be entered through a touch screen or through an image capturing device 304 (e.g., a webcam or digital camera) that may be used in order to verify that a particular user 20\* has primary control of the computing device 10\*.

In response to determining which of the plurality of users 20\* detected in the proximate vicinity of the computing device 10\* has primary control of the computing device 10\*, the computing device 10\*(or at least the logic endowed with the computing device 10\*) may be designed to ascertain (or select) one or more particular formats for formatting the one or more items to be presented (e.g., audibly and/or visually presented) via the computing device 10\*. In various embodiments, the one or more particular formats that are to be selected for formatting the one or more items may be selected or ascertained based on their association with the user 20\* who was determined to have primary control of the computing device 10\*. In some cases, the ascertainment of the one or more particular formats for formatting the one or more items may involve ascertaining whether there are one or more presentation preferences 174 associated with the user 20\* detected as having primary control of the computing device 10\*, the one or more presentation preferences 174 being one or more preferences for how one or more items are to be preferably presented (formatted) via the computing device 10\*. In some cases, such presentation preferences 174 may define the one or more particular formats to be applied to one or more items to be presented through the computing device 10\*.

In various embodiments, the memory 114 of the computing device 10\* may store one or more presentation preferences 174 of one or more users 20\*. In some embodiments, the memory 114 may store one or more presentation preferences 174 that are specifically associated with a primary user or owner of the computing device 10\* and one or more presentation preferences 174 (which may include one or more generic preferences) for any other users who may access the computing device 10. Thus, for example, when the computing device 10\*(or the endowed logic) determines that the primary user or owner of the computing device 10\* has primary control of the computing device 10\* then the one or more presentation preferences 174 that are determined to be specifically associated with the primary user or owner may be invoked. On the other hand, if the computing device 10\* determines that someone else other than the primary user or owner has primary control of the computing device 10\*, then a generic one or more presentation preferences 174 (which may be for any other user other than the primary user or owner) may be invoked or one or more presentation preferences 174 that are specifically associated with or connected to the user 20 having primary control of the computing device 10\* may be invoked.

As described earlier, in addition to being able to determine which of a plurality of users 20\* detected in the proximate vicinity of the computing device 10\* has primary control of the computing device 10\* and ascertain one or more particular formats for formatting one or more items to be presented through the computing device 10\* in response to determining which of the plurality of users 20\* has primary control of the computing device 10\*, the computing device 10\* or at least the logic that may be endowed with the computing device 10\* may also be designed to present the one or more items in the one or more particular formats.

The type of formatting to be selected and applied to the one or more items to be presented via the computing device 10\* will depend on a number of factors including what types of items are to be formatted and whether there are any presentation preferences 174 associated with the user 20\* who was determined to have primary control of the computing device 10\* and which can be used in order to properly format the items to be presented through the computing device 10\*. A more detailed discussion related to the presentation of the one or more items in the one or more particular formats will be provided in greater detail herein.

Referring now to FIGS. 3a and 3b illustrating two embodiments (illustrated in FIGS. 3a and 3b as computing device 10' and computing device 10") of the computing device 10\* of FIGS. 1, 2a, 2b, 2c, and 2d. Referring particularly now to FIG. 3a, which illustrates a computing device 10' that includes a primary control determining module 102', a format ascertaining module 104', a particular formatted item presenting module 106', a memory 114 that may store one or more applications 160 (e.g., an operating system (OS) 162, one or more productivity applications 164 such as a word processing application and/or spreadsheet application, one or more communication applications 166 such as an email or text messaging application, one or more personal information manager applications 168 such as Microsoft Office, one or more facial recognition application 180, one or more voice recognition applications 182, one or more retinal scanning applications 184, and/or other applications including gaming applications) and user information 172 including one or more presentation preferences 174 and/or one or more user credentials in the form of for example, user biometric profiles 176 such as facial or retinal profiles and/or signature speech patterns, one or more processors 116 (e.g., microprocessors, controllers, etc.), one or more sensors 120, a user interface 110 (e.g., a display device 12 such as a touchscreen, a keypad, a mouse, a microphone, one or more speakers, and/or other interface devices), and a network interface 112 (e.g., network interface card or NIC).

In various embodiments, the primary control determining module 102' of FIG. 2a is a logic module that is designed to, among other things, determine which of a plurality of users 20\* detected in proximate vicinity of a computing device 10\* has primary control of the computing device 10\*, the computing device 10\* designed for presenting one or more electronic items. The format ascertaining module 104' is a logic module that is designed to ascertain one or more particular formats for formatting the one or more electronic items based, at least in part, on said determining which of the plurality of users 20\* detected in the proximate vicinity of the computing device 10\* has primary control of the computing device 10\*. The particular formatted item presenting module 106' is a logic module that is designed to audibly and/or visually present the one or more electronic items in the one or more particular formats. For this particular embodiment of the computing device 10\* of FIGS. 1, 2a, 2b, 2c, and 2d, the three logic modules (e.g., the primary control determining module 102', the format ascertaining module 104', and the particular formatted item presenting module 106') are implemented using purely circuitry components such as application specific integrated circuit or ASIC. Thus, the computing device 10' illustrated in FIG. 2a may be referred to as the "hardwired" version or embodiment of the computing device 10* of FIGS. 1, 2a, 2b, 2c, and 2d.

Turning now to FIG. 3b, which illustrates a "soft" version or embodiment (e.g., computing device 10") of the computing device 10* of FIGS. 1, 2a, 2b, 2c, and 2d. In particular, FIG. 3b shows a computing device 10" that has components similar or the same as the components of the computing device 10' of FIG. 3a. That is, computing device 10", similar to computing device 10' of FIG. 3a, may comprise of a memory 114 (which may store one or more applications 160 and user information 172 including one or more presentation preferences 174 and/or one or more user biometric profiles 176 such as facial or retinal profiles and/or signature speech patterns), one or more processors 116, one or more sensors 120, user interface 110, and/or a network interface 112. And similar to the computing device 10' of FIG. 3a, the computing device 10" of FIG. 3b may include logic modules including a primary control determining module 102", a format ascertaining module 104', and a particular formatted item presenting module 106" that correspond to and mirror the primary control determining module 102', the format ascertaining module 104', and the particular formatted item presenting module 106' of the computing device 10' of FIG. 3a. However, unlike the logic modules (e.g., the primary control determining module 102', the format ascertaining module 104', and the particular formatted item presenting module 106') of the computing device 10' of FIG. 3a, the logic modules (e.g., the primary control determining module 102", the format ascertaining module 104", and the particular formatted item presenting module 106") of the computing device 10" of FIG. 3b are implemented by the one or more processors 116 executing computer readable instructions 152 (e.g., software and/or firmware) that may be stored in the memory 114.

Note that although FIG. 3a illustrates all of the logic modules (e.g., the primary control determining module 102', the format ascertaining module 104', and the particular formatted item presenting module 106') being implemented using purely circuitry components such as ASIC, and although FIG. 3b illustrates all of the logic modules (e.g., the primary control determining module 102", the format ascertaining module 104", and the particular formatted item presenting module 106") being implemented using one or more processors 116 executing computer readable instructions 152, in other embodiments, these logic modules may be implemented using a combination of specifically designed circuitry such as ASIC and one or more processors 116 (or other types of circuitry such as field programmable gate arrays or FPGAs) executing computer readable instructions 152. For example, in some embodiments, at least one of the logic modules may be implemented using specially designed circuitry (e.g., ASIC) while a second logic module may be implemented using a processor 116 (or other types of programmable circuitry such as FPGA) executing computer readable instructions 152 (e.g., software and/or firmware).

In various embodiments, the memory 114 of the computing device 10' of FIG. 3a and the computing device 10" of FIG. 3b may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments the one or more applications 160 stored in memory 114 may include, for example, an operating system 162, one or more productivity applications 164 such as a word processing application or a spreadsheet application, one or more communication applications 166 such as an email or IM application, one or more personal information manager applications 168 (e.g., Microsoft Outlook), one or more facial recognition applications 180, one or more voice recognition applications 182, one or more retinal scanning applications 184, and/or other applications including one or more gaming applications.

Figure 3C:
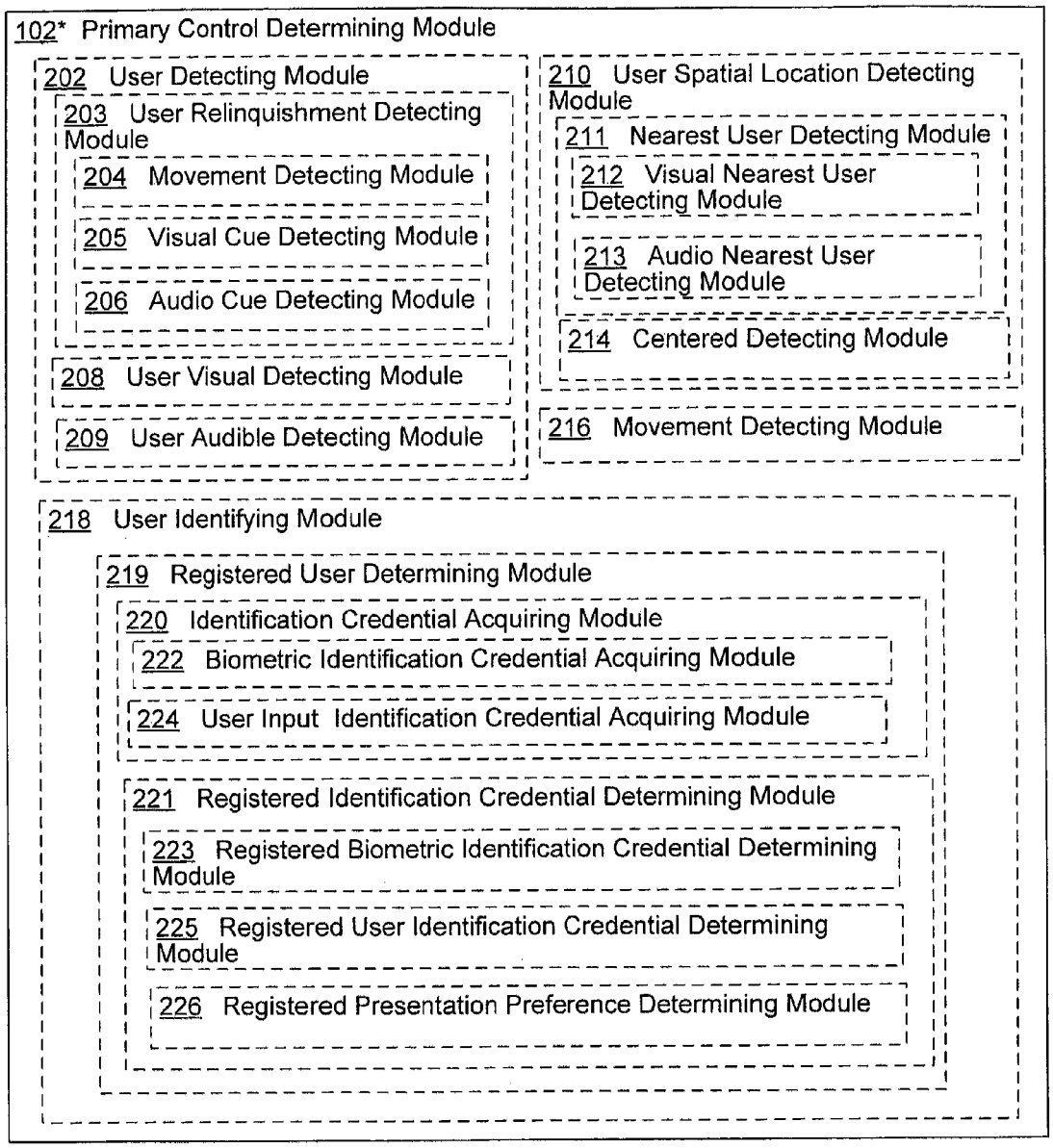
FIG. 3c shows another perspective of the primary control determining module 102* of FIGS. 3a and 3b.

Turning now to FIG. 3c illustrating a particular implementation of the primary control determining module 102*(e.g., the primary control determining module 102' of FIG. 3a or the primary control determining module 102" of FIG. 3b). As illustrated, the primary control determining module 102* may include one or more sub-logic modules in various alternative implementations. For example, in various implementations, the primary control determining module 102* may include a user detecting module 202, which may include a user relinquishment detecting module 203 (which may further include a movement detecting module 204, a visual cue detecting module 205, and/or an audio cue detecting module 206), a user visual detecting module 208, and/or a user audible detecting module 209, a user spatial location detecting module 210 that includes a nearest user detecting module 211 (which may further include a visual nearest user detecting module 212 and/or an audio nearest user detecting module 213) and/or a centered detecting module 214, a movement detecting module 216, and a user identifying module 218 that may include a registered user determining module 219, which may include an identification credential acquiring module 220 (which may further include a biometric identification credential acquiring module 222 and/or user input identification credential acquiring module 224) and/or a registered identification credential determining module 221 (which may further include a registered biometric identification credential determining module 223, a registered user identification credential determining module 225, and/or a registered presentation preference determining module 226). Specific details related to the primary control determining module 102* as well as the above-described sub-modules of the primary control determining module 102* will be provided below with respect to the operations and processes to be described herein.

Figure 3D:
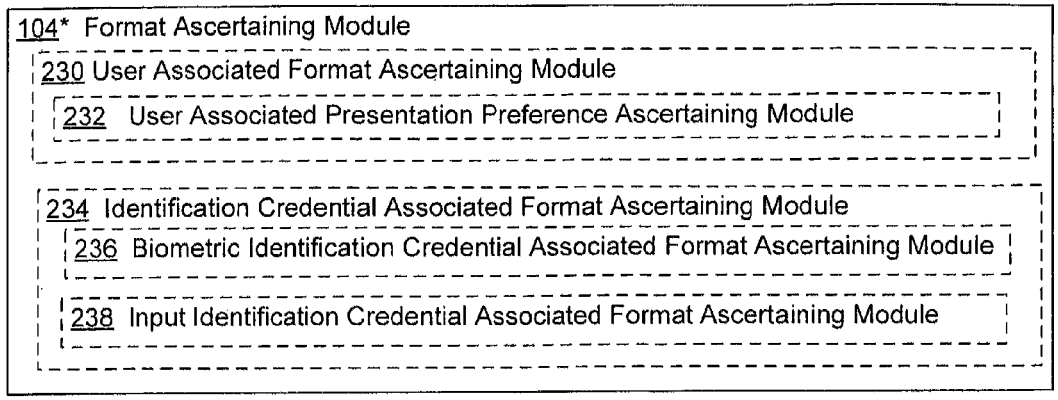
FIG. 3d shows another perspective of the format ascertaining module 104* of FIGS. 3a and 3b.

Referring now to FIG. 3d illustrating a particular implementation of the format ascertaining module 104*(e.g., the format ascertaining module 104' of FIG. 3a or the format ascertaining module 104" of FIG. 3b). As illustrated, the format ascertaining module 104* may include one or more sub-logic modules in various alternative implementations. For example, in various implementations, the format ascertaining module 104* may include a user associated format ascertaining module 230 that may further include a user associated presentation preference ascertaining module 232 and/or an identification credential associated format ascertaining module 234 that may further include a biometric identification credential associated format ascertaining module 236 and/or an input identification credential associated format ascertaining module 238. Specific details related to the format ascertaining module 104* as well as the above-described sub-modules of the format ascertaining module 104* will be provided below with respect to the operations and processes to be described herein.

Figure 3E:
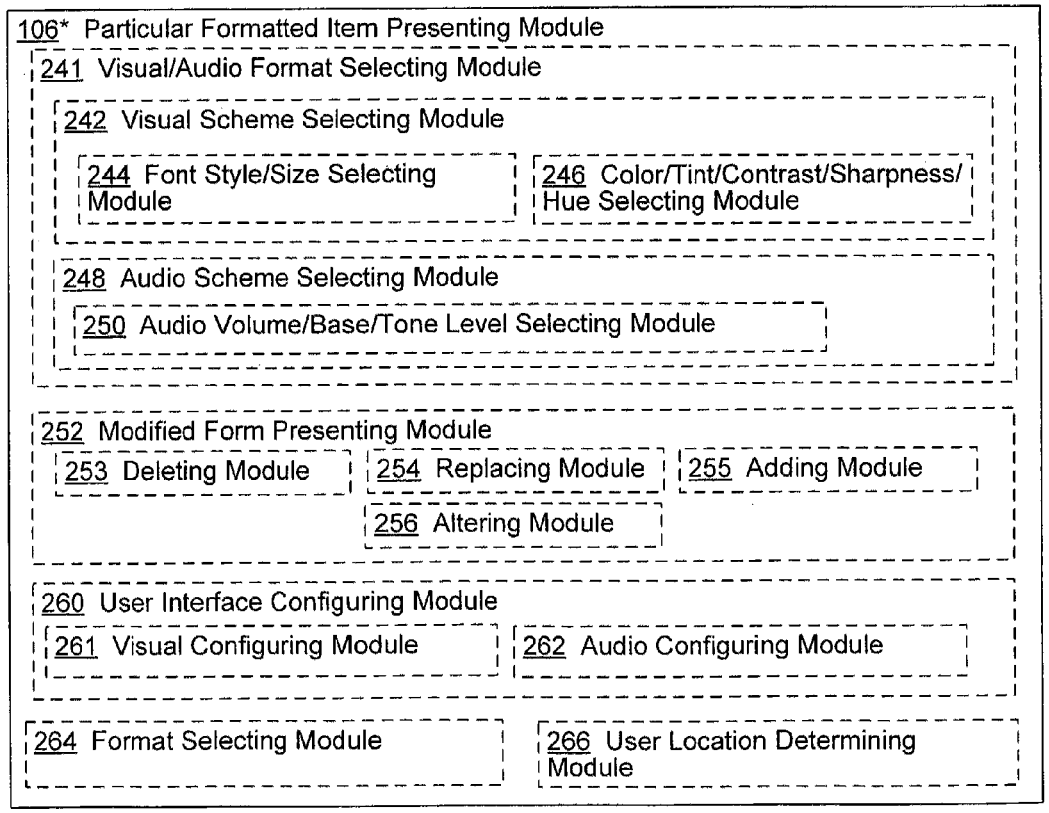
FIG. 3e shows another perspective of the particular formatted item presenting module 106* of FIGS. 3a and 3b.
Figure 3F:
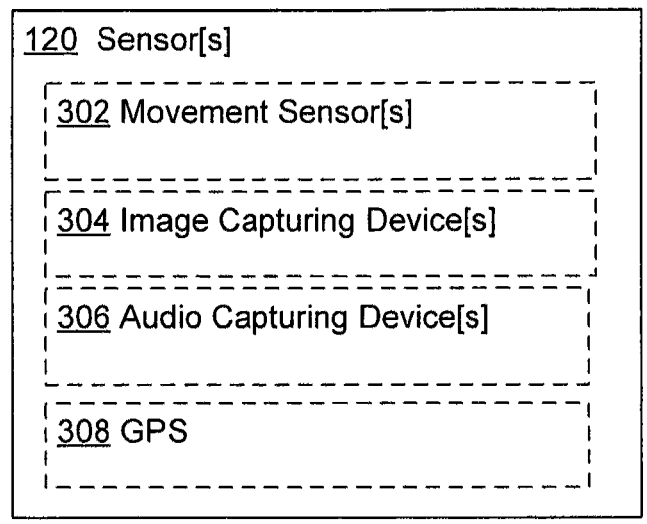
FIG. 3f shows various types of sensors 120 that may be included in the computing device 10* of FIGS. 3a and 3b.

Referring now to FIG. 3e illustrating a particular implementation of the particular formatted item presenting module 106*(e.g., the particular formatted item presenting module 106' of FIG. 3a or the particular formatted item presenting module 106" of FIG. 3b). As illustrated, the particular formatted item presenting module 106* may include one or more sub-logic modules in various alternative implementations. For example, in various implementations, the particular formatted item presenting module 106* may include a visual/audio format selecting module 241, a modified form presenting module 252, a user interface configuring module 260, a format selecting module 264, and/or a user location detecting module 266. In implementations where the particular formatted item presenting module 241 includes the visual/audio format selecting module 241, the visual/audio format selecting module 241 may include a visual scheme selecting module 242 (which may further include a font style/size selecting module 244 and/or a color/tint/contrast/sharpness/hue selecting module 246) and/or an audio scheme selecting module 248 (which may further include an audio volume/base/tone level selecting module 250). In implementations where the particular formatted item presenting module 106 includes the modified form presenting module 252, the modified form presenting module 252 may include a deleting module 253, a replacing module 254, an adding module 255, and/or an altering module 256. In implementations where the particular formatted item presenting module 106 includes the user interface configuring module 260, the user interface configuring module 260 may include a visual configuring module 261 and/or an audio configuring module 262. Specific details related to the particular formatted item presenting module 106* as well as the above-described sub-modules of the particular formatted item presenting module 106* will be provided below with respect to the operations and processes to be described herein.

FIG. 3f illustrates the various types of sensors 120 that may be included with the computing device 10*(e.g., the computing device 10' of FIG. 3a or the computing device 10" of FIG. 3b) of FIGS. 1, 2a, 2b, 2c, and 2d. As illustrated, the one or more sensors 120 that may be included with the computing device 10* may include one or more movement sensors 302 (e.g., an accelerometer, an inertia sensor, and/or a gyro sensor), one or more image capturing devices 304 (e.g., a web cam, a digital camera, an infrared camera, etc.), one or more audio capturing devices 306 (e.g., microphones), and/or a global positioning system (GPS) 308 (which may include any device that can determine its geographic location including those devices that determine its geographic location using triangulation techniques applied to signals transmitted by satellites or by communication towers such as cellular towers).

Figure 4:
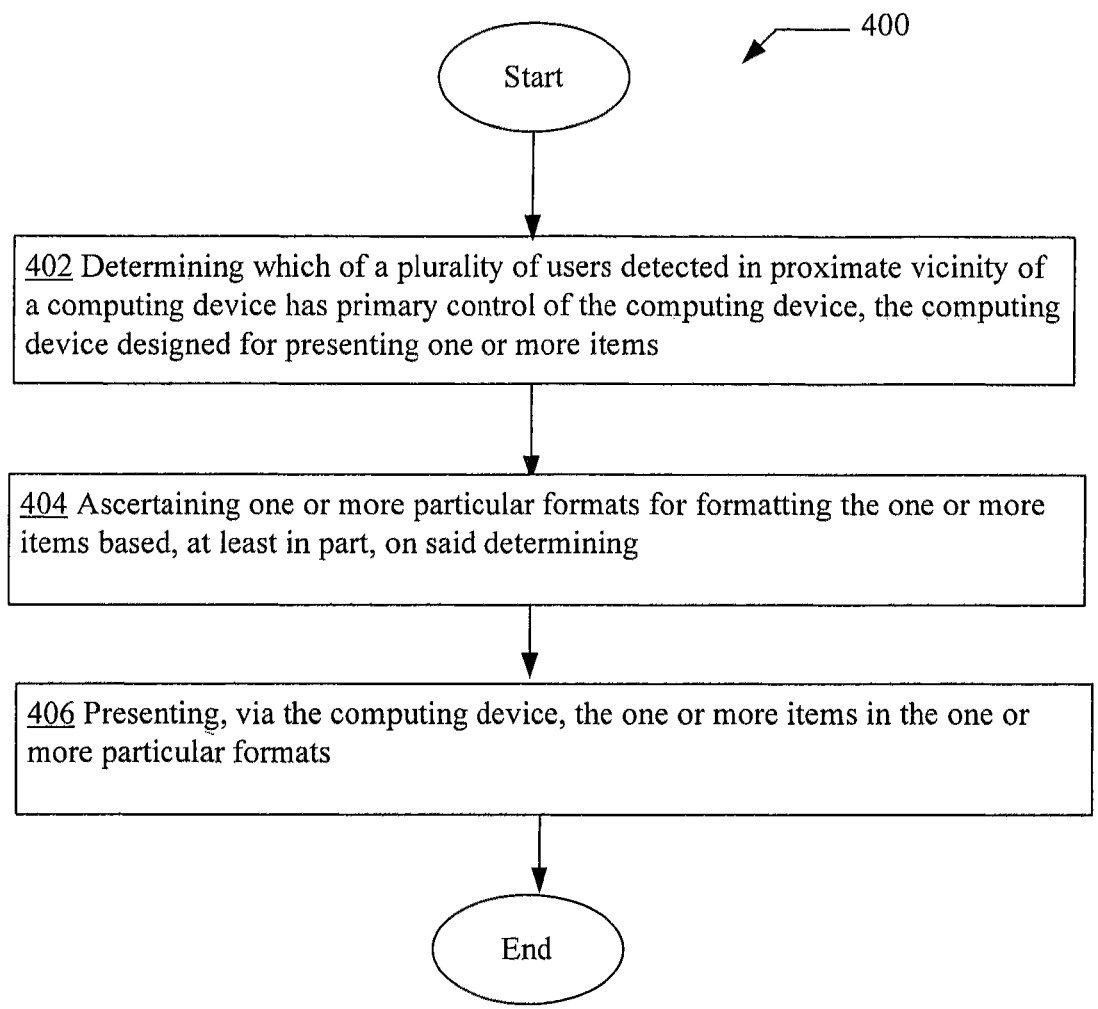
FIG. 4 is a high-level logic flowchart of a process.

A more detailed discussion related to the computing device 10* of FIGS. 1, 2a, 2b, 2c, and 2d (e.g., the computing device 10' of FIG. 3a or the computing device 10" of FIG. 3b) will now be provided with respect to the processes and operations to be described herein. FIG. 4 illustrates an operational flow 400 representing example operations for, among other things, presenting, via a computing device, one or more items in one or more particular formats, the one or more particular formats being selected/ascertained based, at least in part, on determining which of a plurality of users detected in the proximity of the computing device has primary control of the computing device. In FIG. 4 and in the following figures that include various examples of operational flows, discussions and explanations will be provided with respect to the exemplary environment 100 described above and as illustrated in FIG. 1 and/or with respect to other examples (e.g., as provided in FIGS. 2a, 2b, 2c, 2d, 3a, 3b, 3c, 3d, 3e, 3f, 8a, 8b, 8c, and 8d) and contexts. However, it should be understood that the operational flows may be executed in a number of other environments and contexts, and/or in modified versions of FIGS. 2a, 2b, 2c, 2d, 3a, 3b, 3c, 3d, 3e, 3f, 8a, 8b, 8c, and 8d. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one of a machine, an article of manufacture, or a composition of matter unless indicated otherwise.

In any event, after a start operation, the operational flow 400 of FIG. 4 may move to a primary control determining operation 402 for determining which of a plurality of users detected in proximate vicinity of a computing device has primary control of the computing device, the computing device designed for presenting one or more items. For instance, and as an illustration, the primary control determining module 102*(e.g., the primary control determining module 102' of FIG. 3a or the primary control determining module 102" of FIG. 3b) determining which of a plurality of users 20* detected in proximate vicinity of a computing device 10* has primary control of the computing device 10*, the computing device 10* designed for presenting one or more items (e.g., electronic items such as software applications, application interface, textual documents or files, audio and/or video files, user credentials including passwords, electronic messages including emails or instant messages, and so forth). In various implementations, such an operation may be performed by at least one of a machine, article of manufacture, or composition of matter. Note that in various implementations, and as will be further described herein, a particular user 20*(or a group of particular users 20*) from a plurality of users 20* detected in the proximate vicinity of a computing device 10* may have "primary control" of the computing device 10* when the user 20*(or users 20*) is or are located nearest or closest to the computing device 10*, is or are situated in a particular location or locations with respect to the computing device 10 such as being located directly in "front" of the computing device 10*, and/or is in physical contact with the computing device 10*. For purposes of the following, and unless indicated otherwise, the phrase "proximate vicinity" may be in reference to the immediate area surrounding a computing device 10* from which a user 20* may directly interact (e.g., the immediate area surrounding a computing device 10* from which a user 20* may see/hear output generated by the computing device via display screen and/or speakers, and/or from which the user 2Q* can provide direct input to the computing device 10* via, touch screen, keyboard, or microphone) with the computing device 10*. In various embodiments, the computing device 10* may be designed to present the one or more items by having one or more components for presenting such items including, for example, a user interface 110 for audibly and/or visually presenting the one or more items, software applications (e.g., a word processing application, a gaming application, a messaging application such as an email application, a browser application, and so forth), and other components that may be needed in order to present the one or more items via the computing device 10\*.

In addition to the primary control determining operation 402, operational flow 400 may also include a format ascertaining operation 404 for ascertaining one or more particular formats for formatting the one or more items based, at least in part, on said determining. For instance, the format ascertaining module 104\*(e.g., the format ascertaining module 104' of FIG. 3*a* or the format ascertaining module 104" of FIG. 3*b*) of the computing device 10\* of FIG. 1 (e.g., the computing device 10' of FIG. 3*a* or the computing device 10" of FIG. 3*b*) ascertaining (e.g. selecting) one or more particular formats (e.g., visual and/or audio format) for formatting the one or more items based, at least in part, on said determining.

In addition to the primary control determining operation 402 and the format ascertaining operation 404, operational flow 400 of FIG. 4 may also include a particular formatted item presenting operation 406 for presenting, via the computing device, the one or more items in the one or more particular formats as further illustrated in FIG. 4. For instance, the particular formatted item presenting module 106\*(e.g., the particular formatted item presenting module 106' of FIG. 3*a* or the particular formatted item presenting module 106" of FIG. 3*b*) of the computing device 10\* of FIG. 1 (e.g., the computing device 10' of FIG. 3*a* or the computing device 10" of FIG. 3*b*) presenting, via the computing device 10\*(e.g., a mobile computing device such as a tablet computer, a smartphone, an e-reader, a laptop, or other types of portable computing device), the one or more items in the one or more particular formats that were ascertained based on determining which of the plurality of users 20\* detected in the proximate vicinity of the computing device 10\* has primary control of the computing device 10\*.

Various types of formatting may be applied to various items that may be presented through the computing device 10\* in various alternative implementations. For example, in some cases, the presenting of the one or more items in one or more particular formats may involve displaying the one or more items (e.g., textual documents such as a word processing document or an email message) in one or more particular font styles or sizes. In some cases, the presenting of the one or more items in one or more particular formats may involve audibly presenting the one or more items (e.g., audio or video files) at a particular volume/base/pitch levels. In other cases, the presenting of the one or more items in one or more particular formats may involve displaying the one or more items through a user interface (e.g., a display device 12 such as a touch screen) that has been configured to display items at particular level or levels of brightness, tint, hue, and/or contrast. In still other cases, the presenting of the one or more items in one or more particular formats may involve displaying the one or more items in one or more particular color schemes. Other types of formatting may additionally or alternatively be applied to the one or more items to be presented in various other implementations as described herein.

Figure 5A:
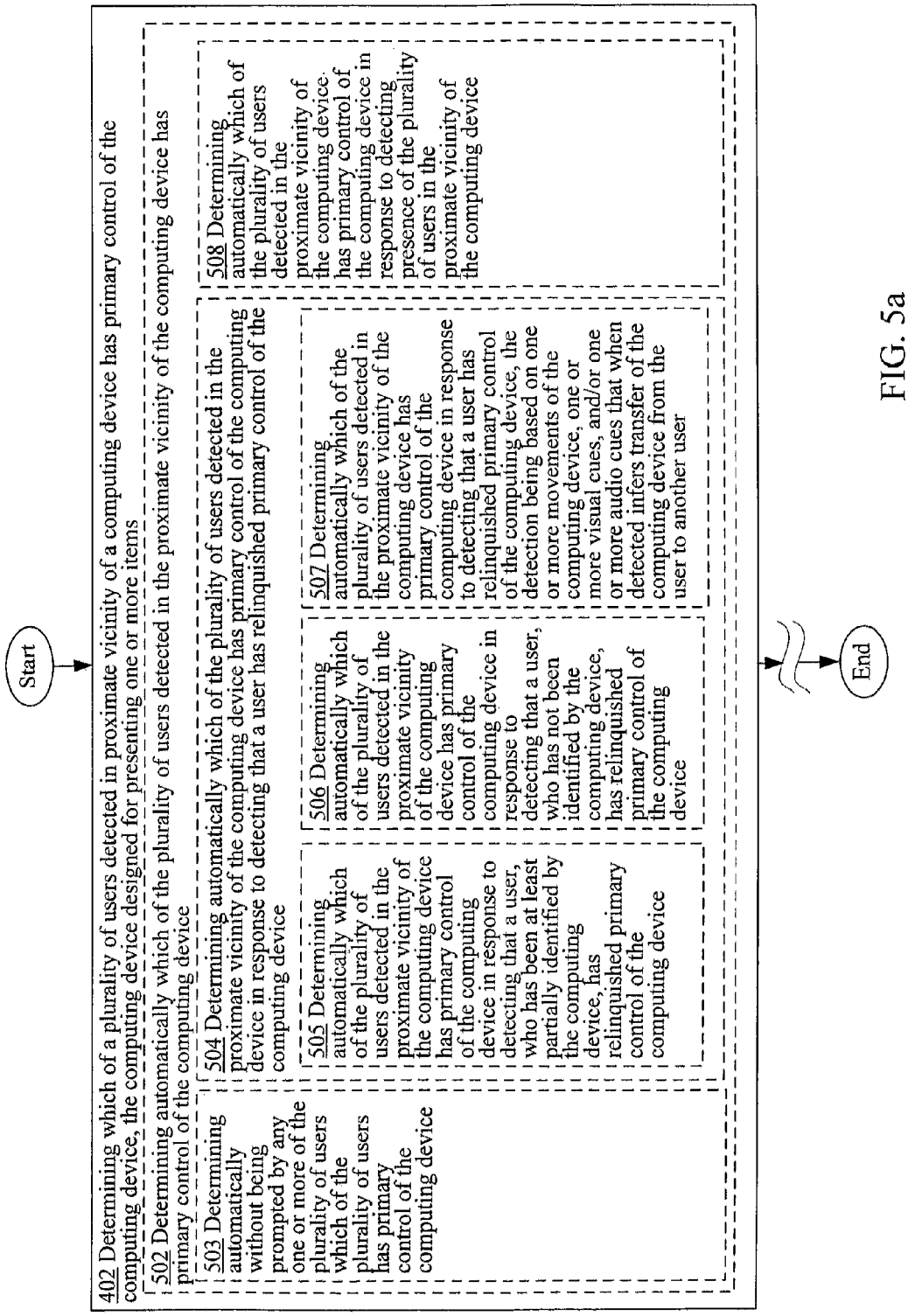
FIG. 5a is a high-level logic flowchart of a process depicting alternate implementations of the primary control determining operation 402 of FIG. 4.

As will be further described herein, the primary control determining operation 402, the format ascertaining operation 404, and the particular formatted item presenting operation 406 of FIG. 4 may be executed in a variety of different ways in various alternative implementations. FIGS. 5*a*, 5*b*, 5*c*, 5*d*, 5*e*, 5*f*, and 5*g*, for example, illustrate at least some of the alternative ways that the primary control determining operation 402 of FIG. 4 may be executed in various alternative implementations. For example, in various implementations, the primary control determining operation 402 of FIG. 4 may include an operation 502 for determining automatically which of the plurality of users detected in the proximate vicinity of the computing device has primary control of the computing device as illustrated in FIG. 5*a*. For instance, the primary control determining module 102\*(e.g., the primary control determining module 102' of FIG. 3*a* or the primary control determining module 102" of FIG. 3*b*) including the user detecting module 202 (see FIG. 3*c*) of the computing device 10\* of FIG. 1 (e.g., the computing device 10' of FIG. 3*a* or the computing device 10" of FIG. 3*b*) determining automatically (e.g., without interference from the users 20\*) which of the plurality of users 20\* detected by the user detecting module 202 as being in the proximate vicinity of the computing device 10\* has primary control of the computing device 10\*.

As further illustrated in FIG. 5*a*, in some implementations, 502 may further include one or more additional operations including an operation 503 for determining automatically without being prompted by any one or more of the plurality of users which of the plurality of users has primary control of the computing device. For instance, the primary control determining module 102\* of the computing device 10\* of FIG. 1 (e.g., the computing device 10' of FIG. 3*a* or the computing device 10" of FIG. 3*b*) determining automatically without being prompted by any one or more of the plurality of users 20\* which of the plurality of users 20\* has primary control of the computing device 10\*.

In the same or different implementations, operation 502 may include an operation 504 for determining automatically which of the plurality of users detected in the proximate vicinity of the computing device has primary control of the computing device in response to detecting that a user has relinquished primary control of the computing device. For instance, the primary control determining module 102\* including the user detecting module 202 and the user relinquishment detecting module 203 (see FIG. 3*c*) of the computing device 10\*determining automatically which of the plurality of users 20\* detected in the proximate vicinity of the computing device 10\* as detected by the user detecting module 202 has primary control of the computing device 10\* in response to detecting that a user 20\* has relinquished primary control of the computing device 10\*.

In some implementations, operation 504 may include an operation 505 for determining automatically which of the plurality of users detected in the proximate vicinity of the computing device has primary control of the computing device in response to detecting that a user, who has been at least partially identified by the computing device, has relinquished primary control of the computing device as further depicted in FIG. 5*a*. For instance, the primary control determining module 102\* including the user detecting module 202 and the user relinquishment detecting module 203 of the computing device 10\*determining automatically which of the plurality of users 20\*detected in the proximate vicinity of the computing device 10\* has primary control of the computing device 10\* in response to detecting that a user 20\*, who has been at least partially identified by the computing device 10\*(e.g. at least partially identified using, for example, facial, retinal, or voice recognition techniques), has relinquished primary control of the computing device 10\*.

In the same or different implementations, operation 504 may include an operation 506 for determining automatically which of the plurality of users detected in the proximate vicinity of the computing device has primary control of the computing device in response to detecting that a user, who has not been identified by the computing device, has relinquished primary control of the computing device. For instance, the primary control determining module 102\* including the user detecting module 202 and the user relinquishment detecting module 203 of the computing device 10* determining automatically which of the plurality of users 20* detected in the proximate vicinity of the computing device 10*, as detected by the user detecting module 202, has primary control of the computing device 10*, the detection as to which of the plurality of users 20* detected in the proximate vicinity of the computing device 10* has primary control of the computing device 10* being in response to detecting by the user relinquishment detecting module 203 that a user 20*, who has not been identified by the computing device 10*, has relinquished primary control of the computing device 10*.

In the same or alternative implementations, operation 504 may include an operation 507 for determining automatically which of the plurality of users detected in the proximate vicinity of the computing device has primary control of the computing device in response to detecting that a user has relinquished primary control of the computing device, the detection being based on one or more movements of the computing device, one or more visual cues, and/or one or more audio cues that when detected infers transfer of the computing device from the user to another user. For instance, the primary control determining module 102* including the user detecting module 202 and the user relinquishment detecting module 203 of the computing device 10* determining automatically which of the plurality of users 20*(e.g., users 20e and 20f of FIG. 2c) detected in the proximate vicinity of the computing device 10*(e.g., as detected by the user detecting module 202) has primary control of the computing device 10* in response to detecting that a user 20* has relinquished primary control of the computing device 10* (e.g., as detected by the user relinquishment detecting module 203), the detection being based on one or more movements of the computing device 10* (e.g., as detected by a movement detecting module 204—see FIG. 3c), one or more visual cues (e.g., as detected by a visual cue detecting module 205), and/or one or more audio cues (e.g., as detected by an audio cue detecting module 206) that when detected infers transfer of the computing device 10* from the user 20d to another user 20f as illustrated, for example, in FIG. 2b.

In some cases, operation 502 may include an operation 508 for determining automatically which of the plurality of users detected in the proximate vicinity of the computing device has primary control of the computing device in response to detecting presence of the plurality of users in the proximate vicinity of the computing device as depicted in FIG. 5a. For instance, the primary control determining module 102* including the user detecting module 202 of the computing device 10* of FIG. 1 determining automatically which of the plurality of users 20* detected in the proximate vicinity of the computing device 10**, as detected by the user detecting module 202, has primary control of the computing device 10* in response to detecting presence of the plurality of users 20* in the proximate vicinity of the computing device 10*.

Figure 5B:
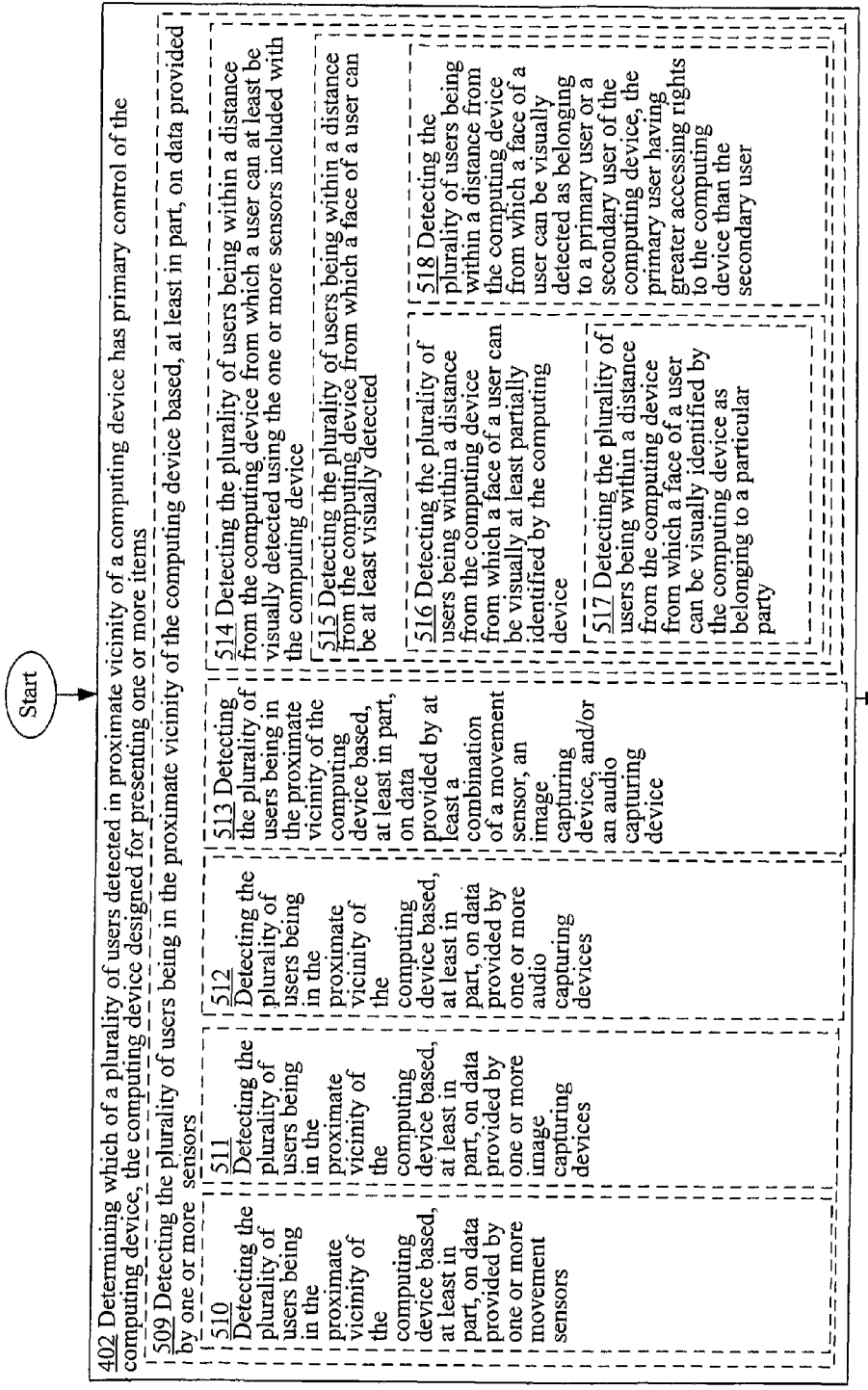
FIG. 5b is a high-level logic flowchart of a process depicting alternate implementations of the primary control determining operation 402 of FIG. 4.

Turning now to FIG. 5b, in the same or alternative implementations, the primary control determining operation 402 may include an operation 509 for detecting the plurality of users being in the proximate vicinity of the computing device based, at least in part, on data provided by one or more sensors. For instance, the user detecting module 202 of the computing device 10* detecting the plurality of users 20* being in the proximate vicinity of the computing device 10* based, at least in part, on data provided by one or more sensors 120. In some implementations, the one or more sensors 120 may be integrated into the computing device 10*.

As further illustrated in FIG. 5b, in various implementations, operation 509 may include one or more additional operations. For example, in some implementations, operation 509 may include an operation 510 for detecting the plurality of users being in the proximate vicinity of the computing device based, at least in part, on data provided by one or more movement sensors. For instance, the user detecting module 202 of the computing device 10* detecting the plurality of users 20* being in the proximate vicinity of the computing device 10* based, at least in part, on data provided by one or more movement sensors 302 (e.g., one or more inertia sensors, accelerometers such as three-axis or 3D accelerometers, gyroscopes, and so forth). Such movement sensors 302 may be designed to detect a variety of movements that may be exhibited by the computing device 10* including, for example, vibration or spatial movements as a result of being in, for example, contact with one or more users 20.

In the same or alternative implementations, operation 509 may include an operation 511 for detecting the plurality of users being in the proximate vicinity of the computing device based, at least in part, on data provided by one or more image capturing devices. For instance, the user detecting module 202 of the computing device 10* detecting the plurality of users 20* being in the proximate vicinity of the computing device 10* based, at least in part, on data provided by one or more image capturing devices 304 (e.g., digital cameras, webcams, infrared cameras, and so forth).

In the same or alternative implementations, operation 509 may include an operation 512 for detecting the plurality of users being in the proximate vicinity of the computing device based, at least in part, on data provided by one or more audio capturing devices. For instance, the user detecting module 202 of the computing device 10* detecting the plurality of users 20* being in the proximate vicinity of the computing device 10* based, at least in part, on data provided by one or more audio capturing devices 306 (e.g., microphones).

In some implementations, operation 509 may involve an operation 513 for detecting the plurality of users being in the proximate vicinity of the computing device based, at least in part, on data provided by at least a combination of a movement sensor, an image capturing device, and/or an audio capturing device as illustrated in FIG. 5b. For instance, the user detecting module 202 of the computing device 10* detecting the plurality of users 20* being in the proximate vicinity of the computing device 10* based, at least in part, on data provided by at least a combination of a movement sensor 302, an image capturing device 304, and/or an audio capturing device 306.

In some cases, operation 509 may include an operation 514 for detecting the plurality of users being within a distance from the computing device from which a user can at least be visually detected using the one or more sensors included with the computing device as further depicted in FIG. 5b. For instance, the user detecting module 202 including the user visual detecting module 208 (see FIG. 3c) of the computing device 10* detecting the plurality of users 20* being within a distance from the computing device 10* from which a user 20* can at least be at least visually detected by, for example, the user visual detecting module 208 (see FIG. 3c) using the one or more sensors 120 (e.g., one or more image capturing devices 304) included with the computing device 10*.

As further illustrated in FIG. 5b, operation 514 may include one or more additional operations in various implementations including, for example, an operation 515 for detecting the plurality of users being within a distance from the computing device from which a face of a user can be at least visually detected. For instance, the user detecting module 202 including the user visual detecting module 208 of the computing device 10* detecting the plurality of users 20* being within a distance from the computing device 10* from which a face of a user 20* can be at least visually detected by, for example, the user visual detecting module 208 using the one or more sensors 120 (e.g., one or more image capturing devices 304). In some cases, in order to facilitate such an operation, the user visual detecting module 208 may comprise a facial recognition system or application.

In some implementations, operation 515 may include an operation 516 for detecting the plurality of users being within a distance from the computing device from which a face of a user can be visually at least partially identified by the computing device as illustrated in FIG. 5b. For instance, the user detecting module 202 of the computing device 10* detecting the plurality of users 20* being within a distance from the computing device 10* from which a face of a user 20* can be visually at least partially identified by the computing device 10*.

In some cases, operation 516 may include an operation 517 for detecting the plurality of users being within a distance from the computing device from which a face of a user can be visually identified by the computing device as belonging to a particular party. For instance, the user detecting module 202 of the computing device 10* detecting the plurality of users 20* being within a distance from the computing device 10* from which a face of a user 20* can be visually identified by the computing device 10* as belonging to a particular party (e.g., a primary user or owner of the computing device 10* or a registered or unregistered third party whose face may or may not be registered with the computing device 10*).

In the same or different implementations, operation 515 may include an operation 518 for detecting the plurality of users being within a distance from the computing device from which a face of a user can be visually detected as belonging to a primary user or a secondary user of the computing device, the primary user having greater accessing rights to the computing device than the secondary user. For instance, the user detecting module 202 of the computing device 10* detecting the plurality of users 20* being within a distance from the computing device 10* from which a face of a user 20* can be visually detected as belonging to a primary user or a secondary user of the computing device 10*, the primary user (e.g., an owner of the computing device 10*) having greater accessing rights to the computing device 10* than the secondary user.

Figure 5C:
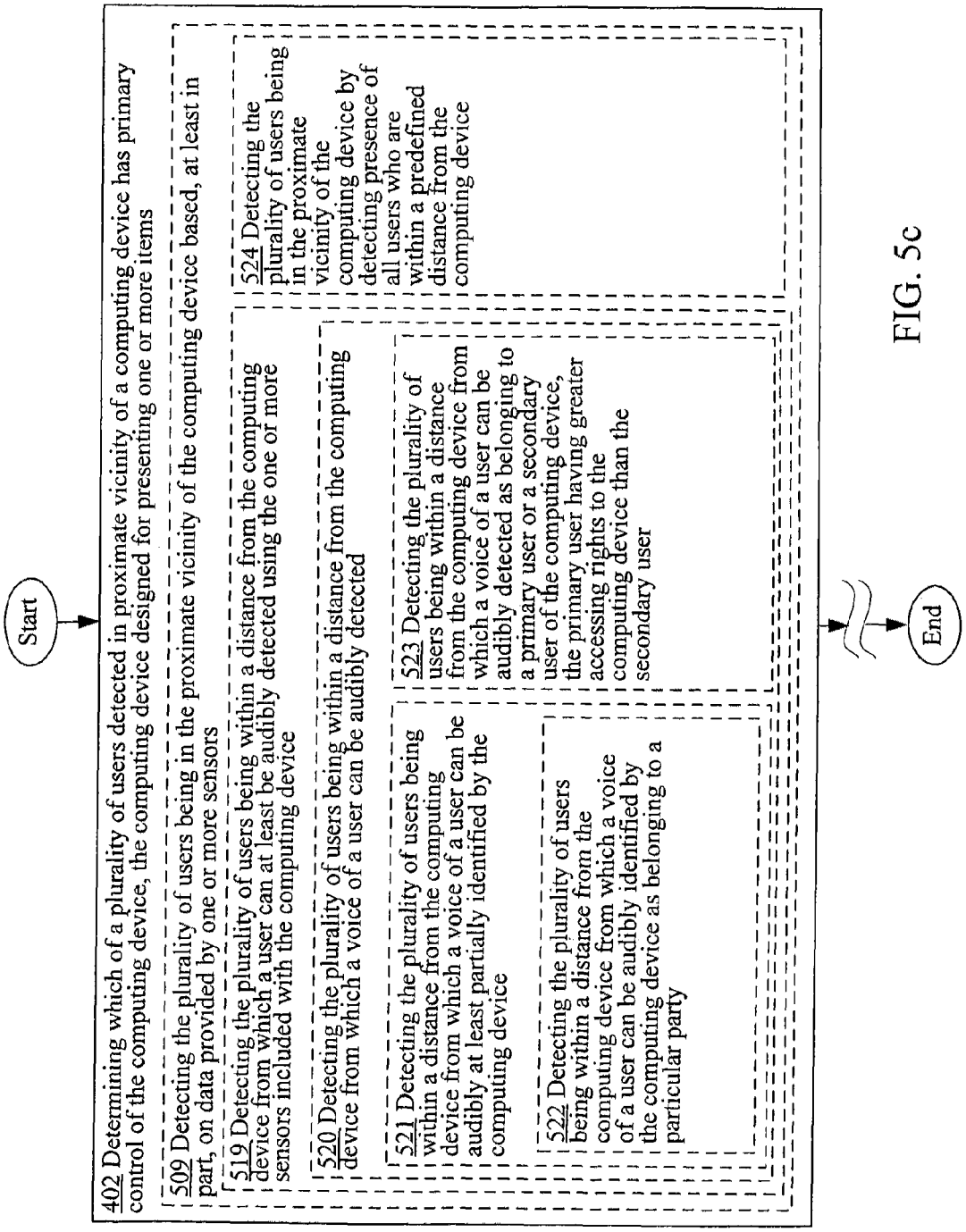
FIG. 5c is a high-level logic flowchart of a process depicting alternate implementations of the primary control determining operation 402 of FIG. 4.

Referring now to FIG. 5c, in various implementations, operation 509 for detecting the plurality of users being in the proximate vicinity of the computing device based, at least in part, on data provided by one or more sensors may include an operation 519 for detecting the plurality of users being within a distance from the computing device from which a user can at least be audibly detected using the one or more sensors included with the computing device. For instance, the user detecting module 202 including the user audible detecting module 209 (see FIG. 3c) of the computing device 10* detecting the plurality of users 20* being within a distance from the computing device 10* from which a user 20* can at least be audibly detected by the user audible detecting module 209 using the one or more sensors 120 (e.g., one or more audio capturing devices 306) included with the computing device 10*.

As further illustrated in FIG. 5c, in various implementations, operation 519 may include one or more additional operations including an operation 520 for detecting the plurality of users being within a distance from the computing device from which a voice of a user can be audibly detected. For instance, the user detecting module 202 including the user audible detecting module 209 of the computing device 10* detecting the plurality of users 20* being within a distance from the computing device 10* from which a voice of a user 20* can be audibly detected by, for example, the user detecting module 209 using one or more audio capturing devices 306.

In some cases, operation 520 may include an operation 521 for detecting the plurality of users being within a distance from the computing device from which a voice of a user can be audibly at least partially identified by the computing device. For instance, the user detecting module 202 of the computing device 10* detecting the plurality of users 20* being within a distance from the computing device 10* from which a voice of a user 20* can be audibly at least partially identified (e.g., audibly partially identified as at least not belonging to a particular user 20* such as not belonging to a primary user 20* or owner of the computing device 10*) by the computing device 10*.

In some implementations, operation 521 may further include an operation 522 for detecting the plurality of users being within a distance from the computing device from which a voice of a user can be audibly identified by the computing device as belonging to a particular party. For instance, the user detecting module 202 of the computing device 10* detecting the plurality of users 20* being within a distance from the computing device 10* from which a voice of a user 20* can be audibly identified by the computing device 10*(e.g., using voice recognition application) as belonging to a particular party.

As further illustrated in FIG. 5c, in some cases, operation 520 may include an operation 523 for detecting the plurality of users being within a distance from the computing device from which a voice of a user can be audibly detected as belonging to a primary user or a secondary user of the computing device, the primary user having greater accessing rights to the computing device than the secondary user. For instance, the user detecting module 202 of the computing device 10* detecting the plurality of users 20* being within a distance from the computing device 10* from which a voice of a user 20* can be visually detected as belonging to a primary user or a secondary user of the computing device 10*, the primary user having greater accessing rights to the computing device 10* than the secondary user.

In various implementations, operation 509 for detecting the plurality of users being in the proximate vicinity of the computing device based, at least in part, on data provided by one or more sensors may include an operation 524 for detecting the plurality of users being in the proximate vicinity of the computing device by detecting presence of all users who are within a predefined distance from the computing device. For instance, the user detecting module 202 of the computing device 10* detecting the plurality of users being in the proximate vicinity of the computing device 10* by detecting presence of all users 20* who are within a predefined distance (e.g., within three feet, four feet, five feet, or within some other distance) from the computing device 10*.

Figure 5D:
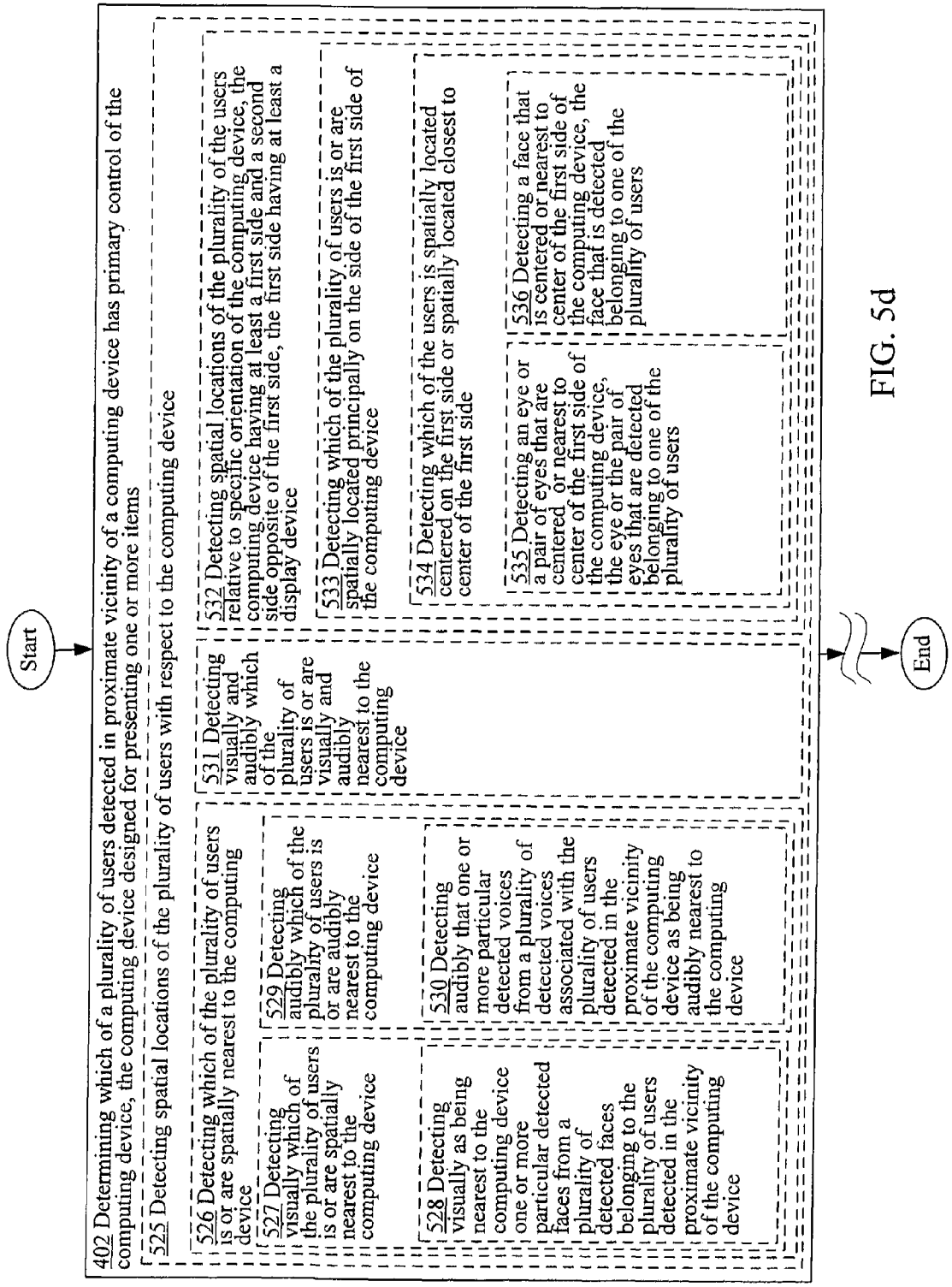
FIG. 5d is a high-level logic flowchart of a process depicting alternate implementations of the primary control determining operation 402 of FIG. 4.

Turning now to FIG. 5d, in various implementations, the primary control determining operation 402 of FIG. 4 for determining which of a plurality of users detected in proximate vicinity of a computing device has primary control of the computing device, the computing device designed for presenting one or more items may include an operation 525 for detecting spatial locations of the plurality of users with respect to the computing device. For instance, the user spatial location detecting module 210 (see FIG. 3c) of the computing device 10* detecting spatial locations of the plurality of users 20* with respect to the computing device 10*. In some cases, information related to the spatial locations of the plurality of users 20* may be used in order to determine which of the plurality of users 20* has primary control of the computing device 10*.

As further illustrated in FIG. 5d, operation 525 may include one or more additional operations in various alternative implementations. For example, in some implementations, operation 525 may include an operation 526 for detecting which of the plurality of users is or are spatially nearest to the computing device. For instance, the nearest user detecting module 211 (see FIG. 3c) of the computing device 10* detecting which of the plurality of users 20* is or are spatially nearest to the computing device 10*.

There are a number of ways to determine which of the plurality of users 20* is or are spatially nearest to the computing device 10*. For example, in some implementations, operation 526 may include an operation 527 for detecting visually which of the plurality of users is or are spatially nearest to the computing device. For instance, the visual nearest user detecting module 212 detecting visually using, for example, one or more image capturing devices 304, which of the plurality of users 20* is or are spatially nearest to the computing device 10*.

Note that in some situations, it may be difficult to determine visually which of the plurality of users 20* detected in the proximate vicinity of the computing device 10* is actually nearest to the computing device 10*. For example, if the plurality of users 20* are located in close quarters to the computing device 10*(e.g., the users 20* being closely clustered around the computing device 10*), it may be difficult to visually determine which of the plurality of the users 20* is actually nearest to the computing device 10*. Thus, in some implementations, a determination as to which user 20* is nearest to the computing device 10* may be based on visually determining whose particular feature (e.g., face, eyes, etc.) is nearest to the computing device 10*. For example, in some implementations, operation 527 may further include an operation 528 for detecting visually as being nearest to the computing device one or more particular detected faces from a plurality of detected faces belonging to the plurality of users detected in the proximate vicinity of the computing device. For instance, the visual nearest user detecting module 212 of the computing device 10* detecting visually as being nearest to the computing device 10* one or more particular detected faces from a plurality of detected faces belonging to the plurality of users 20* detected in the proximate vicinity of the computing device 10*.

In the same or different implementations, operation 526 may include an operation 529 for detecting audibly which of the plurality of users is or are audibly nearest to the computing device. For instance, the audio nearest user detecting module 213 (see FIG. 3c) of the computing device 10* detecting audibly using, for example, one or more audio capturing devices 306, which of the plurality of users 20* is or are audibly nearest to the computing device 10*. Note that in order to provide a better audio determination as to which of the plurality of users 20* detected in the proximate vicinity of the computing device 10* is nearest to the computing device 10*, audio data from multiple audio capturing devices 306 (e.g., microphones) may be processed and analyzed in order to make such a determination.

As further illustrated in FIG. 5d, in various implementations, operation 529 may include an operation 530 for detecting audibly that one or more particular detected voices from a plurality of detected voices associated with the plurality of users detected in the proximate vicinity of the computing device as being audibly nearest to the computing device. For instance, the audio nearest user detecting module 213 of the computing device 10* detecting audibly that one or more particular detected voices from a plurality of detected voices associated with the plurality of users 20* detected in the proximate vicinity of the computing device 10* as being audibly nearest to the computing device 10*.

In various implementations, operation 525 for detecting spatial locations of the plurality of users with respect to the computing device may include an operation 531 for detecting visually and audibly which of the plurality of users is or are visually and audibly nearest to the computing device. For instance, the nearest user detecting module 211 of the computing device 10* detecting visually and audibly which of the plurality of users 20* is or are visually and audibly nearest to the computing device 10*. Note that in cases where multiple users are determined to be "nearest" to the computing device 10*, the computing device 10* or at least the logic endowed with the computing device 10* may use-tie-breaking rules to determine which of the multiple users 20* that were initially determined to be equally nearest to the computing device 10* will be deemed nearest to the computing device 10*. Example of tie-breaking rules include, which of the multiple users 20* determined to be equally nearest to the computing device 10* is determined to be located center or nearest to the center of the front-side 17a of the computing device 10*, which of the multiple users 20* determined to be equally nearest to the computing device 10* has highest or lowest accessing rights to the computing device 10*(e.g., formatting of one or more items being based on such a determination), and so forth.

In some implementations, operation 525 for detecting spatial locations of the plurality of users with respect to the computing device may include an operation 532 for detecting spatial locations of the plurality of the users relative to specific orientation of the computing device, the computing device having at least a first side and a second side opposite of the first side, the first side having at least a display device. For instance, the user spatial location detecting module 210 of the computing device 10* detecting spatial locations of the plurality of the users relative to specific orientation of the computing device 10*, the computing device 10* having at least a first side (e.g., the front-side 17a of the computing device 10* of FIG. 1) and a second side (e.g., the back-side 17b of the computing device 10* of FIG. 1) opposite of the first side, the first side having at least a display device 12.

As further illustrated in FIG. 5d, in various implementations, operation 532 may include an operation 533 for detecting which of the plurality of users is or are spatially located principally on the side of the first side of the computing device. For instance, the user spatial location detecting module 210 of the computing device 10* detecting which of the plurality of users 20* is or are spatially located principally (e.g., mostly or substantially) on the side of the first side (e.g., the front-side 17a of the computing device 10* of FIG. 1) of the computing device 10*.

In some cases, operation 533 may further include an operation 534 for detecting which of the users is spatially located centered on the first side or spatially located closest to center of the first side. For instance, the centered detecting module 214 (see FIG. 3c) of the computing device 10* detecting which of the users 20* is spatially located centered on the first side (e.g., front-side 17a in FIG. 1) or spatially located closest to center 18 (or the center axis 18a) of the first side (e.g., front-side 17a).

In some implementations, operation 534 may include an operation 535 for detecting an eye or a pair of eyes that are centered or nearest to center of the first side of the computing device, the eye or the pair of eyes that are detected belonging to one of the plurality of users. For instance, the centered detecting module 214 of the computing device 10* detecting an eye or a pair of eyes that are centered or nearest to center 18 (e.g., nearest to the center axis 18a of FIG. 1) of the first side of the computing device 10*, the eye or the pair of eyes that are detected belonging to one of the plurality of users 20*.

In the same or different implementations, operation 534 may include an operation 536 for detecting a face that is centered or nearest to center of the first side of the computing device, the face that is detected belonging to one of the plurality of users. For instance, the centered detecting module 214 of the computing device 10* detecting a face that is centered or nearest to center 18 of the first side (e.g., the front-side 17a of the computing device 10* of FIG. 1) of the computing device 10*, the face that is detected belonging to one of the plurality of users 20*.

Figure 5E:
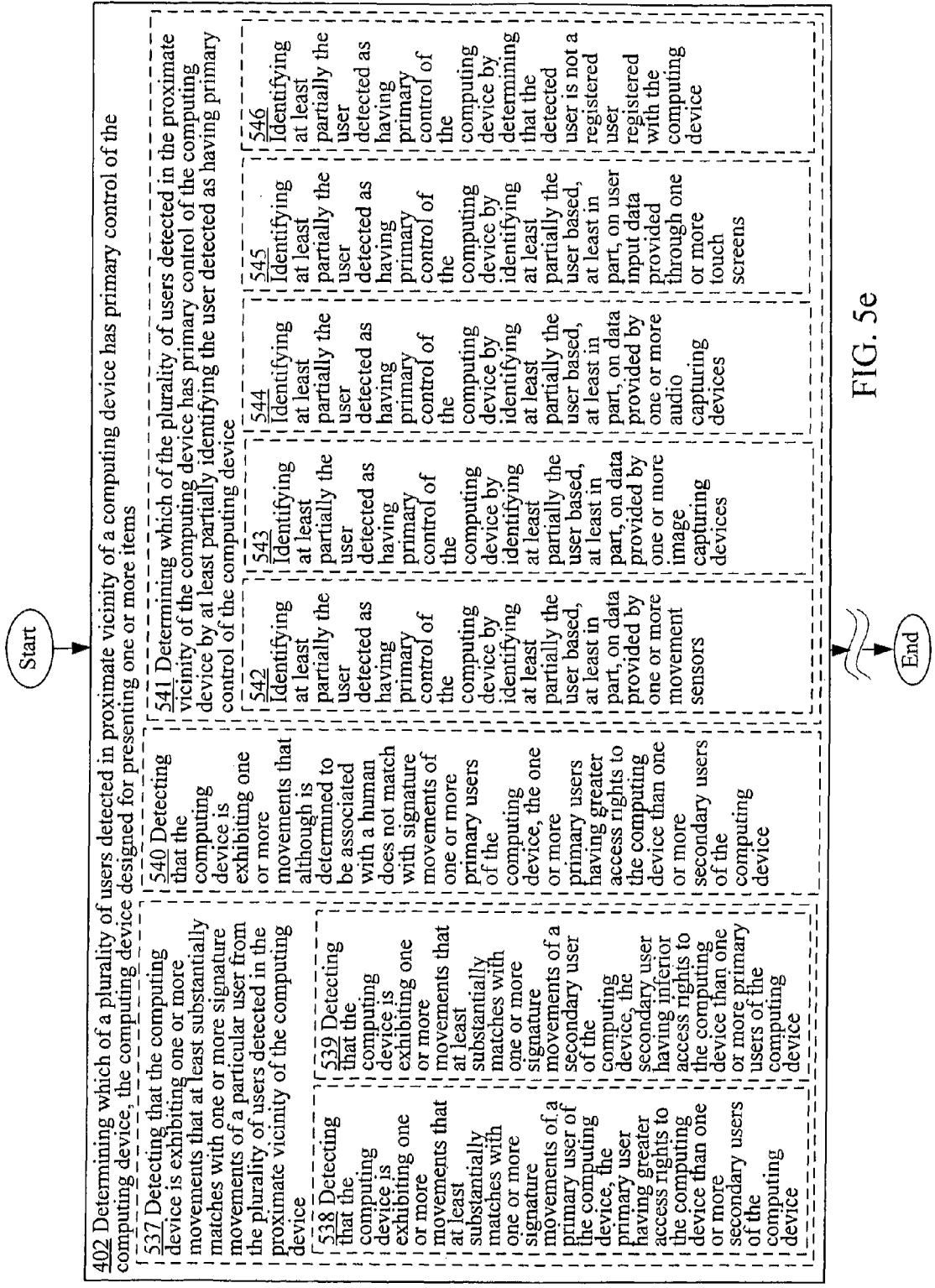
FIG. 5e is a high-level logic flowchart of a process depicting alternate implementations of the primary control determining operation 402 of FIG. 4.

Referring now to FIG. 5e, in various implementations the primary control determining operation 402 of FIG. 1 for determining which of a plurality of users detected in proximate vicinity of a computing device has primary control of the computing device, the computing device designed for presenting one or more items may include an operation 537 for detecting that the computing device is exhibiting one or more movements that at least substantially matches with one or more signature movements of a particular user from the plurality of users detected in the proximate vicinity of the computing device. For instance, the movement detecting module 216 (see FIG. 3c) of the computing device 10* detecting that the computing device 10* is exhibiting one or more movements that at least substantially matches with one or more signature movements of a particular user (e.g., a user whose signature movements has been registered with the computing device 10*) from the plurality of users 20* detected in the proximate vicinity of the computing device 10*. In various implementations, the movements exhibited by the computing device 10* may be directly detected (e.g., directly detected using one or more movement sensors 302) or indirectly detected (e.g., based on visual cues or indicators as detected via one or more image capturing devices 304).

As further illustrated in FIG. 5e, in some implementations, operation 537 may include an operation 538 for detecting that the computing device is exhibiting one or more movements that at least substantially matches with one or more signature movements of a primary user of the computing device, the primary user having greater access rights to the computing device than one or more secondary users of the computing device. For instance, the movement detecting module 216 of the computing device 10* detecting that the computing device 10* is exhibiting one or more movements (e.g., movements as caused by the computing device 10* being in contact with one or more users 20*) that at least substantially matches with one or more signature movements of a primary user (e.g., an owner) of the computing device 10*, the primary user having greater access rights to the computing device 10* than one or more secondary users of the computing device 10*.

In the same or different implementations, operation 537 may include an operation 539 for detecting that the computing device is exhibiting one or more movements that at least substantially matches with one or more signature movements of a secondary user of the computing device, the secondary user having inferior access rights to the computing device than one or more primary users of the computing device. For instance, the movement detecting module 216 of the computing device 10* detecting that the computing device 10* is exhibiting one or more movements that at least substantially matches with one or more signature movements of a secondary user of the computing device 10*, the secondary user having inferior access rights to the computing device 10* than one or more primary users of the computing device 10*.

In some cases, the primary control determining operation 402 of FIG. 4 may include an operation 540 for detecting that the computing device is exhibiting one or more movements that although is determined to be associated with a human does not match with signature movements of one or more primary users of the computing device, the one or more primary users having greater access rights to the computing device than one or more secondary users of the computing device as illustrated in FIG. 5e. For instance, the movement detecting module 216 of the computing device 10* detecting that the computing device is exhibiting one or more movements that although is determined to be associated with a human does not match with signature movements of one or more primary users of the computing device, the one or more primary users having greater access rights to the computing device 10* than one or more secondary users of the computing device 10*.

As will be further described herein, in various implementations, the primary control determining operation 402 of FIG. 4 may involve at least partially identifying a user who was detected as having primary control of the computing device 10*. For example, in various implementations, the primary control determining operation 402 may include an operation 541 for determining which of the plurality of users detected in the proximate vicinity of the computing device has primary control of the computing device by at least partially identifying the user detected as having primary control of the computing device. For instance, the primary control determining module 102* including the user identifying module 218 (see FIG. 3c) of the computing device 10* determining which of the plurality of users 20* detected in the proximate vicinity of the computing device 10* has primary control of the computing device 10* when the user identifying module 218 at least partially identifies the user detected as having primary control of the computing device 10*. The phrase "partially identifying" is used here because such an operation does not require the determination of the actual name or username of the user 20* having primary control of the computing device 10*.

The user that was detected as having primary control of the computing device 10* may be partially identified in a number different ways in various alternative implementations. For example, in some implementations, operation 541 may include an operation 542 for identifying at least partially the user detected as having primary control of the computing device by identifying at least partially the user based, at least in part, on data provided by one or more movement sensors as depicted in FIG. 5e. For instance, the user identifying module 218 of the computing device 10* identifying at least partially the user 20* detected as having primary control of the computing device 10* by identifying at least partially the user 20* based, at least in part, on data provided by one or more movement sensors 302.

In the same or different implementations, operation 541 may include an operation 543 for identifying at least partially the user detected as having primary control of the computing device by identifying at least partially the user based, at least in part, on data provided by one or more image capturing devices. For instance, the user identifying module 218 of the computing device 10* identifying at least partially the user 20* detected as having primary control of the computing device 10* by identifying at least partially the user 20* based, at least in part, on data provided by one or more image capturing devices 304.

In the same or different implementations, operation 541 may include an operation 544 for identifying at least partially the user detected as having primary control of the computing device by identifying at least partially the user based, at least in part, on data provided by one or more audio capturing devices. For instance, the user identifying module 218 of the computing device 10\* identifying at least partially the user 20\* detected as having primary control of the computing device 10\* by identifying at least partially the user based, at least in part, on data provided by one or more audio capturing devices 306.

In the same or different implementations, operation 541 may include an operation 545 for identifying at least partially the user detected as having primary control of the computing device by identifying at least partially the user based, at least in part, on user input data provided through one or more touch screens. For instance, the user identifying module 218 of the computing device 10\* identifying at least partially the user 20\* detected as having primary control of the computing device 10\* by identifying at least partially the user 20\* based, at least in part, on user input data (e.g., personal symbolic credentials such as personal finger gestures) provided through one or more touch screens (e.g., display device 12 in FIG. 1).

In the same or different implementations, operation 541 may include an operation 546 for identifying at least partially the user detected as having primary control of the computing device by determining that the detected user is not a registered user registered with the computing device. For instance, the user identifying module 218 including the registered user determining module 219 (see FIG. 3c) of the computing device 10\* identifying at least partially the user 20\* detected as having primary control of the computing device 10\* when the registered user determining module 219 determines that the detected user 20\* is not a registered user registered with the computing device 10\*. In other words, determining that the user 20\* who was determined to have primary control of the computing device 10\* is an unregistered user whose personal information such as formatting preferences and/or personal identification information (e.g., biometric identification information) have not been registered (e.g., inputted or entered) with the computing device 10\*.

Figure 5F:
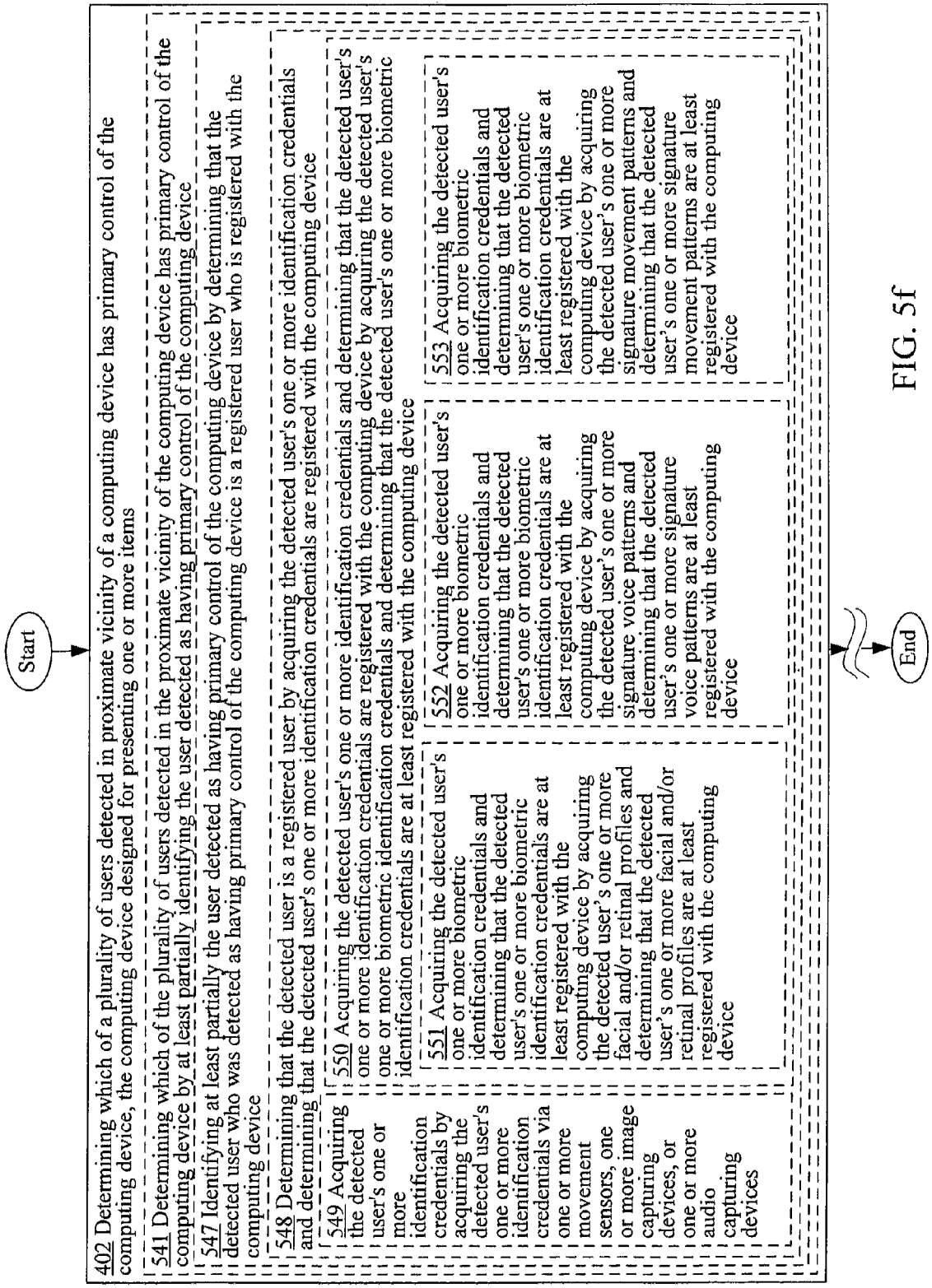
FIG. 5f is a high-level logic flowchart of a process depicting alternate implementations of the primary control determining operation 402 of FIG. 4.

Referring now to FIG. 5f, in some implementations, operation 541 for determining which of the plurality of users detected in the proximate vicinity of the computing device has primary control of the computing device by at least partially identifying the user detected as having primary control of the computing device may include an operation 547 for identifying at least partially the user detected as having primary control of the computing device by determining that the detected user who was detected as having primary control of the computing device is a registered user who is registered with the computing device. For instance, the user identifying module 218 including the registered user determining module 219 of the computing device 10\* identifying at least partially the user 20\* detected as having primary control of the computing device 10\* when the registered user determining module 219 determines that the detected user 20\* who was detected as having primary control of the computing device 10\* is a registered user who is registered with the computing device 10\* (e.g., a user whose identification credentials such as biometric profiles and/or formatting preferences are registered with the computing device 10\*).

As further depicted in FIG. 5f, operation 547 may in some cases include an operation 548 for determining that the detected user is a registered user by acquiring the detected user's one or more identification credentials and determining that the detected user's one or more identification credentials are registered with the computing device. For instance, the registered user determining module 219 including the identification credential acquiring module 220 (see FIG. 3c) and the registered identification credential determining module 221 (see FIG. 3c) of the computing device 10\* determining that the detected user (e.g., the user 20\* who was detected as having primary control of the computing device 10\*) is a registered user by having the identification credential acquiring module 220 acquire the detected user's one or more identification credentials and determining by the registered identification credential determining module 221 that the detected user's one or more identification credentials are registered with the computing device 10\*.

As further illustrated in FIG. 5f, operation 548 may include one or more additional operations in various alternative implementations. For example, in some cases, operation 548 may include an operation 549 for acquiring the detected user's one or more identification credentials by acquiring the detected user's one or more identification credentials via one or more movement sensors, one or more image capturing devices, or one or more audio capturing devices. For instance, the identification credential acquiring module 220 of the computing device 10\* acquiring the detected user's one or more identification credentials by acquiring the detected user's one or more identification credentials (e.g., biometric credentials such as facial profile and/or voice profile) via one or more movement sensors 302, one or more image capturing devices 304, or one or more audio capturing devices 306.

In the same or different implementations, operation 548 may include an operation 550 for acquiring the detected user's one or more identification credentials and determining that the detected user's one or more identification credentials are registered with the computing device by acquiring the detected user's one or more biometric identification credentials and determining that the detected user's one or more biometric identification credentials are at least registered with the computing device. For instance, the identification credential acquiring module 220 and the registered identification credential determining module 221 of the computing device 10\* acquiring the detected user's one or more identification credentials (e.g., acquiring one or more identification credentials of the user 20\* who was detected as having primary control of the computing device 10\*) and determining that the detected user's one or more identification credentials are registered with the computing device 10\* by having the biometric identification credential acquiring module 222 (see FIG. 3c) acquire the detected user's one or more biometric identification credentials and having the registered biometric identification credential determining module 223 (see FIG. 3c) determine that the detected user's one or more biometric identification credentials are at least registered (e.g., inputted or entered) with the computing device 10\*.

In some implementations, operation 550 may include an operation 551 for acquiring the detected user's one or more biometric identification credentials and determining that the detected user's one or more biometric identification credentials are at least registered with the computing device by acquiring the detected user's one or more facial and/or retinal profiles and determining that the detected user's one or more facial and/or retinal profiles are at least registered with the computing device. For instance, the biometric identification credential acquiring module 222 and the registered biometric identification credential determining module 223 of the computing device 10\* acquiring the detected user's one or more biometric identification credentials (e.g., acquiring one or more biometric identification credentials of the user 20\* who was detected as having primary control of the computing device 10\*) and determining that the detected user's one or more biometric identification credentials are at least registered with the computing device when the biometric identification credential acquiring module 222 acquires the detected user's one or more facial and/or retinal profiles and when the registered biometric identification credential determining module 223 determines that the detected user's one or more facial and/or retinal profiles are at least registered with the computing device 10\*.

In the same or different implementations, operation 550 may include an operation 552 for acquiring the detected user's one or more biometric identification credentials and determining that the detected user's one or more biometric identification credentials are at least registered with the computing device by acquiring the detected user's one or more signature voice patterns and determining that the detected user's one or more signature voice patterns are at least registered with the computing device. For instance, the biometric identification credential acquiring module 222 and the registered biometric identification credential determining module 223 of the computing device 10\* acquiring the detected user's one or more biometric identification credentials and determining that the detected user's one or more biometric identification credentials are at least registered with the computing device 10\* when the biometric identification credential acquiring module 222 acquires the detected user's one or more signature voice patterns and when the registered biometric identification credential determining module 223 determines that the detected user's one or more signature voice patterns are at least registered with the computing device 10\*.

In the same or different implementations, operation 550 may include an operation 553 for acquiring the detected user's one or more biometric identification credentials and determining that the detected user's one or more biometric identification credentials are at least registered with the computing device by acquiring the detected user's one or more signature movement patterns and determining that the detected user's one or more signature movement patterns are at least registered with the computing device. For instance, the biometric identification credential acquiring module 222 and the registered biometric identification credential determining module 223 of the computing device 10\* acquiring the detected user's one or more biometric identification credentials and determining that the detected user's one or more biometric identification credentials are at least registered with the computing device 10\* when the biometric identification credential acquiring module 222 acquires the detected user's one or more signature movement patterns (e.g., signature heart or pulse rate) and when the registered biometric identification credential determining module 223 determines that the detected user's one or more signature movement patterns are at least registered with the computing device 10\*.

Figure 5G:
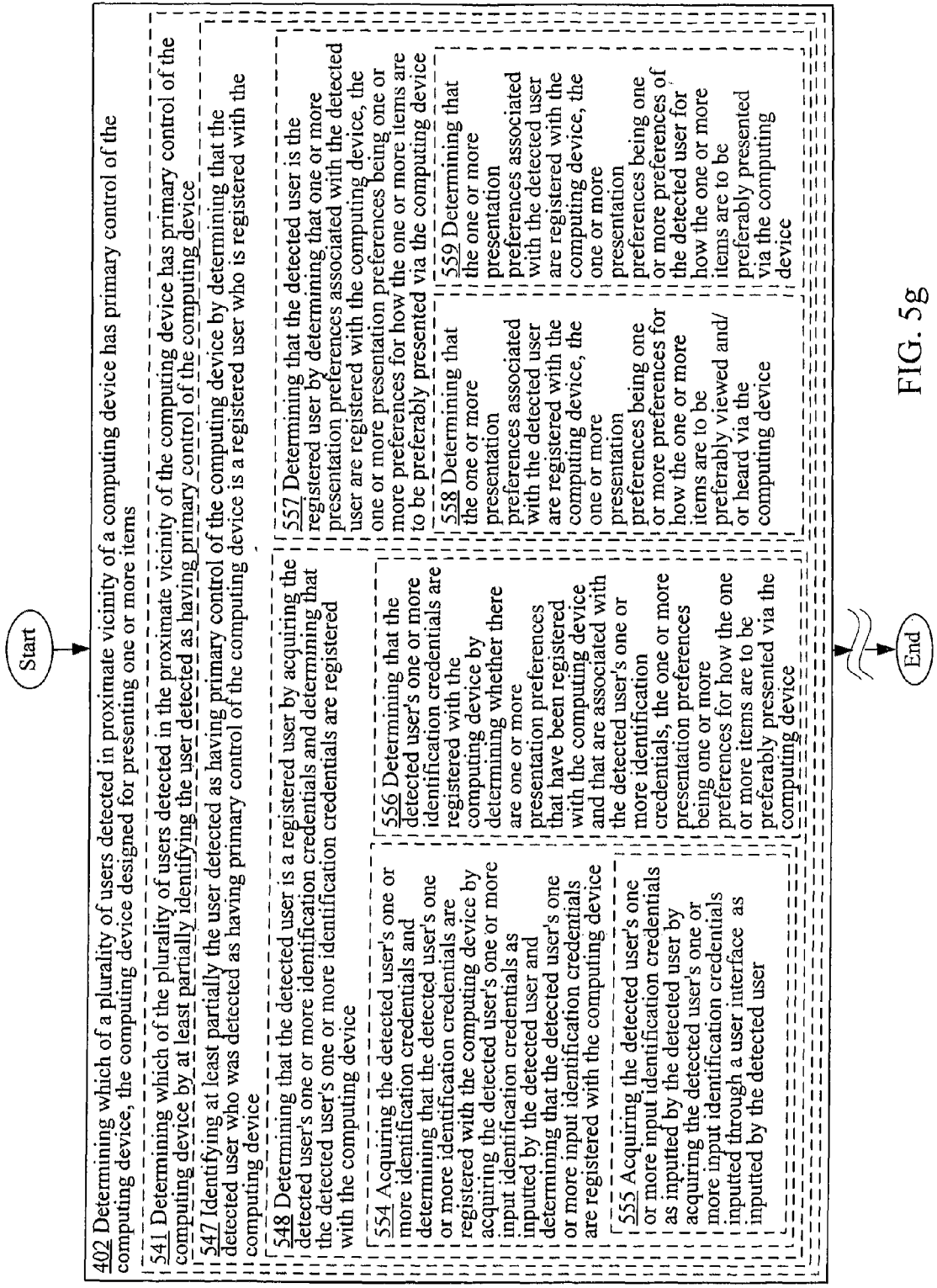
FIG. 5g is a high-level logic flowchart of a process depicting alternate implementations of the primary control determining operation 402 of FIG. 4.

Turning now to FIG. 5g, in some implementations, operation 548 for determining that the detected user is a registered user by acquiring the detected user's one or more identification credentials and determining that the detected user's one or more identification credentials are registered with the computing device may include an operation 554 for acquiring the detected user's one or more identification credentials and determining that the detected user's one or more identification credentials are registered with the computing device by acquiring the detected user's one or more input identification credentials as inputted by the detected user and determining that the detected user's one or more input identification credentials are registered with the computing device. For instance, the identification credential acquiring module 220 and the registered identification credential determining module 221 of the computing device 10\* acquiring the detected user's one or more identification credentials (e.g., acquiring one or more identification credentials of the user 20\* who was detected as having primary control of the computing device 10\*) and determining that the detected user's one or more identification credentials are registered with the computing device 10\* by having the user input identification credential acquiring module 224 (see FIG. 3c) acquire the detected user's one or more input identification credentials (e.g., a finger gesture inputted through a touch screen or a hand or body gesture inputted through one or more image capturing devices 304) as inputted by the detected user and the registered user identification credential determining module 225 (see FIG. 3c) determines that the detected user's one or more input identification credentials are registered with the computing device 10\*.

As further depicted in FIG. 5g, in some cases, operation 554 may include an operation 555 for acquiring the detected user's one or more input identification credentials as inputted by the detected user by acquiring the detected user's one or more input identification credentials inputted through a user interface as inputted by the detected user. For instance, the user input identification credential acquiring module 224 of the computing device 10\* acquiring the detected user's one or more input identification credentials as inputted by the detected user (e.g., the user 20\* detected as having primary control of the computing device 10\*) by acquiring the detected user's one or more input identification credentials inputted through a user interface 110 (e.g., a touch screen, a microphone, a digital camera or webcam, and so forth) as inputted by the detected user.

In the same or different implementations, operation 548 may additionally or alternatively include an operation 556 for determining that the detected user's one or more identification credentials are registered with the computing device by determining whether there are one or more presentation preferences that have been registered with the computing device and that are associated with the detected user's one or more identification credentials, the one or more presentation preferences being one or more preferences for how the one or more items are to be preferably presented via the computing device. For instance, the registered identification credential determining module 221 including the registered presentation preference determining module 226 (see FIG. 3c) of the computing device 10\* determining that the detected user's one or more identification credentials are registered with the computing device 10\* by having the registered presentation preference determining module 226 determine whether there are one or more presentation preferences 174 that have been registered with the computing device 10\* and that are associated with the detected user's one or more identification credentials, the one or more presentation preferences 174 being one or more preferences for how the one or more items are to be preferably presented via the computing device 10\*. Note that a presentation preference 174 may or may not be the preference of the detected user (e.g., the user detected as having primary control of the computing device 10\*). That is, a presentation preference 174, in some cases, may be a preference of a third party as to how one or more items are to be formatted/presented through the computing device 10\* when the detected user is detected as having primary control of the computing device 10\*.

As further illustrated in FIG. 5g, in various implementations, operation 547 for identifying at least partially the user detected as having primary control of the computing device by determining that the detected user who was detected as having primary control of the computing device is a registered user who is registered with the computing device may include an operation 557 for determining that the detected user is the registered user by determining that one or more presentation preferences associated with the detected user are registered with the computing device, the one or more presentation preferences being one or more preferences for how the one or more items are to be preferably presented via the computing device. For instance, the registered user determining module 219 including the registered presentation preference determining module 226 of the computing device 10* determining that the detected user is a registered user when the registered presentation preference determining module 226 determines that one or more presentation preferences 174 associated with the detected user are registered with the computing device 10*, the one or more presentation preferences 174 being one or more preferences for how the one or more items are to be preferably presented via the computing device 10*. Note that although operation 556 and 557 appear to be similar, in fact, they are different because operation 557 does not require that the user identification credentials be registered with the computing device 10*.

In some cases, operation 557 may include an operation 558 for determining that the one or more presentation preferences associated with the detected user are registered with the computing device, the one or more presentation preferences being one or more preferences for how the one or more items are to be preferably viewed and/or heard via the computing device. For instance, the registered presentation preference determining module 226 of the computing device 10* determining that the one or more presentation preferences 174 associated with the detected user (e.g., the user 20* detected as having primary control of the computing device 10*) are registered with the computing device 10*, the one or more presentation preferences 174 being one or more preferences for how the one or more items are to be preferably viewed and/or heard via the computing device 10*.

In the same or different implementations, operation 557 may include an operation 559 for determining that the one or more presentation preferences associated with the detected user are registered with the computing device, the one or more presentation preferences being one or more preferences of the detected user for how the one or more items are to be preferably presented via the computing device. For instance, the registered presentation preference determining module 226 of the computing device 10* determining that the one or more presentation preferences 174 associated with the detected user are registered with the computing device 10*, the one or more presentation preferences 174 being one or more preferences of the detected user (e.g., the user 20* detected as having primary control of the computing device 10*) for how the one or more items are to be preferably presented via the computing device 10*.

Figure 6:
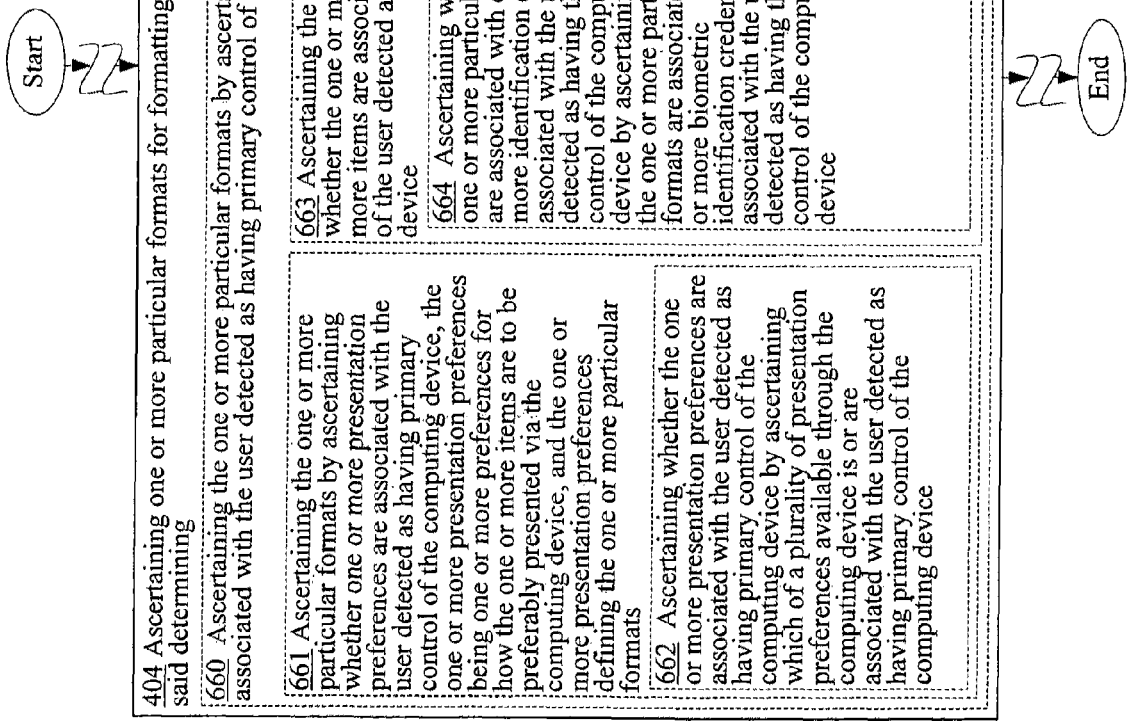
FIG. 6 is a high-level logic flowchart of a process depicting alternate implementations of the format ascertaining operation 404 of FIG. 4.

Referring back to the format ascertaining operation 404 of FIG. 4 for ascertaining one or more particular formats for formatting the one or more items based, at least in part, on said determining, the format ascertaining operation 404 similar to the primary control determining operation 402 of FIG. 4 may be executed in a number of different ways in various alternative embodiments as illustrated in FIG. 6. In some implementations, for example, the format ascertaining operation 404 of FIG. 4 may include an operation 660 for ascertaining the one or more particular formats by ascertaining that the one or more particular formats are associated with the user detected as having primary control of the computing device. For instance, the format ascertaining module 104*(e.g., the format ascertaining module 104' of FIG. 3a or the format ascertaining module 104" of FIG. 3b) including the user associated format ascertaining module 230 (see FIG. 3d) of the computing device 10* ascertaining the one or more particular formats when the user associated format ascertaining module 230 ascertains that the one or more particular formats are associated with the user 20* detected as having primary control of the computing device 10*.

As further illustrated in FIG. 6, operation 660 may include one or more additional operations in various alternative implementations. For example, in some cases, operation 660 may include an operation 661 for ascertaining the one or more particular formats by ascertaining whether one or more presentation preferences are associated with the user detected as having primary control of the computing device, the one or more presentation preferences being one or more preferences for how the one or more items are to be preferably presented via the computing device, and the one or more presentation preferences defining the one or more particular formats. For instance, the format ascertaining module 104* including the user associated presentation preference ascertaining module 232 (see FIG. 3d) of the computing device 10* ascertaining the one or more particular formats when the user associated presentation preference ascertaining module 232 ascertains whether one or more presentation preferences 174 are associated with (e.g., linked or assigned to) the user 20* detected as having primary control of the computing device 10*, the one or more presentation preferences 174 being one or more preferences for how the one or more items are to be preferably presented via the computing device 10*, and the one or more presentation preference 174 defining the one or more particular formats.

In some implementations, operation 661 may further include an operation 662 for ascertaining whether the one or more presentation preferences are associated with the user detected as having primary control of the computing device by ascertaining which of a plurality of presentation preferences available through the computing device is or are associated with the user detected as having primary control of the computing device. For instance, the user associated presentation preference ascertaining module 232 of the computing device 10* ascertaining whether the one or more presentation preferences 174 are associated with the user 20* detected as having primary control of the computing device 10* by ascertaining which of a plurality of presentation preferences 174 available through the computing device 10*(e.g., accessible or stored in the computing device 10*) is or are associated with the user 20* who was detected as having primary control of computing device 10*.

In various implementations, operation 660 may include an operation 663 for ascertaining the one or more particular formats by ascertaining whether the one or more particular formats for formatting the one or more items are associated with one or more identification credentials of the user detected as having the primary control of the computing device. For instance, the format ascertaining module 104* including the identification credential associated format ascertaining module 234 (see FIG. 3d) of the computing device 10* ascertaining the one or more particular formats when the identification credential associated format ascertaining module 234 ascertains whether the one or more particular formats for formatting the one or more items are associated (e.g., linked or affiliate) with one or more identification credentials (e.g., biometric credentials such as facial or voice profiles) of the user 20* detected as having the primary control of the computing device 10*. In various implementations, the one or more identification credentials of the user 20* detected as having the primary control of the computing device 10\* may have been acquired in the primary control determining operation 402 using, for example, one or more sensors 120.

As further illustrated in FIG. 6, operation 663 in some implementations may include an operation 664 for ascertaining whether the one or more particular formats are associated with one or more identification credentials associated with the user detected as having the primary control of the computing device by ascertaining whether the one or more particular formats are associated with one or more biometric identification credentials associated with the user detected as having the primary control of the computing device. For instance, the identification credential associated format ascertaining module 234 including the biometric identification credential associated format ascertaining module 236 (see FIG. 3*d*) of the computing device 10\* ascertaining whether the one or more particular formats are associated with one or more identification credentials associated with the user 20\* detected as having the primary control of the computing device 10\* when the biometric identification credential associated format ascertaining module 236 ascertains whether the one or more particular formats are associated with (e.g., assigned or lined to) one or more biometric identification credentials (e.g., facial or retinal profiles, voice profile, movement profile such as heart rate, and so forth) associated with the user detected as having the primary control of the computing device 10\*.

In the same or different implementations, operation 663 may alternatively or additionally include an operation 665 for ascertaining whether the one or more particular formats are associated with one or more identification credentials associated with the user detected as having the primary control of the computing device by ascertaining whether the one or more particular formats for formatting the one or more items are associated with one or more input identification credentials entered by the user detected as having the primary control of the computing device. For instance, the identification credential associated format ascertaining module 234 including the input identification credential associated format ascertaining module 238 (see FIG. 3*d*) of the computing device 10\* ascertaining whether the one or more particular formats are associated with one or more identification credentials associated with the user 20\* detected as having the primary control of the computing device 10\* when the input identification credential associated format ascertaining module 238 ascertains whether the one or more particular formats for formatting the one or more items are associated with (e.g., linked or assigned to) one or more input identification credentials (e.g., finger gesture as inputted through a touch screen or other types of gestures such as hand or body gestures inputted through an image capturing device 304) entered by the user 20\* detected as having the primary control of the computing device 10\*.

Figure 7A:
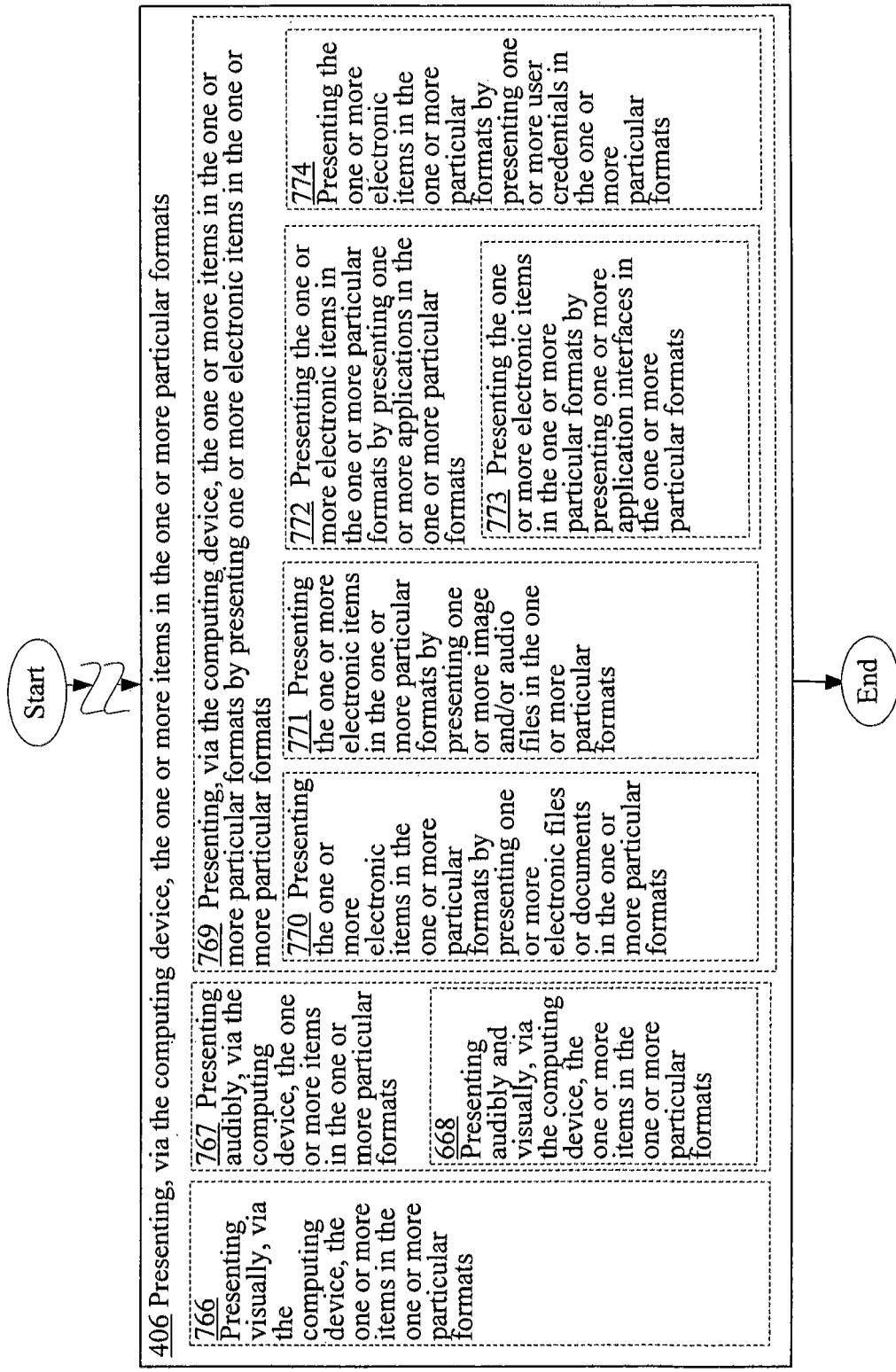
FIG. 7a is a high-level logic flowchart of a process depicting alternate implementations of the particular formatted item presenting operation 406 of FIG. 4.

Referring back to particular formatted item presenting operation 406 of FIG. 4, the particular formatted item presenting operation 406 similar to the primary control determining operation 402 and the format ascertaining operation 404 of FIG. 4 may be executed in a number of different ways in various alternative embodiments as illustrated in FIGS. 7*a*, 7*b*, 7*c*, 7*d*, and 7*e*. In some implementations, for example, the particular formatted item presenting operation 406 of FIG. 4 may include an operation 766 for presenting visually, via the computing device, the one or more items in the one or more particular formats as depicted in FIG. 7*a*. For instance, the particular formatted item presenting module 106\* of the computing device 10\* presenting visually, via the computing device 10\*(e.g., displaying visually via at least one display device 12 such as a touchscreen), the one or more items (e.g., image or video files, textual documents, application interface, passwords, spreadsheet documents, websites, homepage, and so forth) in the one or more particular formats (e.g., particular font style or size, color, brightness, and so forth).

In some implementations, the particular formatted item presenting operation 406 of FIG. 4 may include an operation 767 for presenting audibly, via the computing device, the one or more items in the one or more particular formats as further depicted in FIG. 7*a*. For instance, the particular formatted item presenting module 106\* of the computing device 10\* presenting audibly, via the computing device 10\*(e.g., audibly presenting via one or more speakers of the computing device 10\*) the one or more items (e.g., audio files, video files, voice messages, and so forth) in the one or more particular formats (e.g., volume level).

As further illustrated in FIG. 6*a*, in some cases, operation 767 may further include an operation 768 for presenting audibly and visually, via the computing device, the one or more items in the one or more particular formats. For instance, the particular formatted item presenting module 106\* of the computing device 10\* presenting audibly and visually, via the computing device 10\*(e.g., via a display device 12 and one or more speakers), the one or more items (e.g., video files) in the one or more particular formats.

In various implementations, the particular formatted item presenting operation 406 may include an operation 769 for presenting, via the computing device, the one or more items in the one or more particular formats by presenting one or more electronic items in the one or more particular formats. For instance, the particular formatted item presenting module 106\* of the computing device 10\* presenting, via the computing device 10\*, the one or more items in the one or more particular formats by presenting one or more electronic items (e.g., audio, video, and/or image files, word processing documents, spreadsheet documents, application interface, electronic passwords, software applications including gaming, productivity, and/or communication applications, and so forth) in the one or more particular formats.

As further illustrated in FIG. 6*a*, operation 769 may include one or more additional operations including, for example, an operation 770 for presenting the one or more electronic items in the one or more particular formats by presenting one or more electronic files or documents in the one or more particular formats. For instance, the particular formatted item presenting module 106\* of the computing device 10\* presenting the one or more electronic items in the one or more particular formats by presenting one or more electronic files or documents (e.g., productivity documents such as word processing documents or spreadsheet documents, image or audio files, and so forth) in the one or more particular formats.

In the same or different implementations, operation 769 may include an operation 771 for presenting the one or more electronic items in the one or more particular formats by presenting one or more image and/or audio files in the one or more particular formats. For instance, the particular formatted item presenting module 106\* of the computing device 10\* presenting the one or more electronic items in the one or more particular formats by presenting one or more image and/or audio files (e.g., digital photos, audio recordings, voice messages, and so forth) in the one or more particular formats.

In the same or different implementations, operation 769 may include an operation 772 for presenting the one or more electronic items in the one or more particular formats by presenting one or more applications in the one or more particular formats. For instance, the particular formatted item presenting module 106* of the computing device 10* presenting the one or more electronic items in the one or more particular formats by presenting one or more applications (e.g., software applications including gaming applications, communication applications, and/or productivity applications) in the one or more particular formats.

In some cases, operation 772 may further include an operation 773 for presenting the one or more electronic items in the one or more particular formats by presenting one or more application interfaces in the one or more particular formats. For instance, the particular formatted item presenting module 106* of the computing device 10* presenting the one or more electronic items in the one or more particular formats by presenting (e.g., displaying) one or more application interfaces (e.g., modified application interfaces) in the one or more particular formats. For example, displaying an application interface that has been modified so that one or more functionalities are not available or modifying portions of the application interface (e.g., making a menu or drop down menu bigger of the application interface so that it is easier to use or see).

In the same or different implementations, operation 769 may include an operation 774 for presenting the one or more electronic items in the one or more particular formats by presenting one or more user credentials in the one or more particular formats. For instance, the particular formatted item presenting module 106* of the computing device 10* presenting the one or more electronic items in the one or more particular formats by presenting one or more electronic user credentials (e.g., electronic passwords that cannot be copied or duplicated) in the one or more particular formats.

Figure 7B:
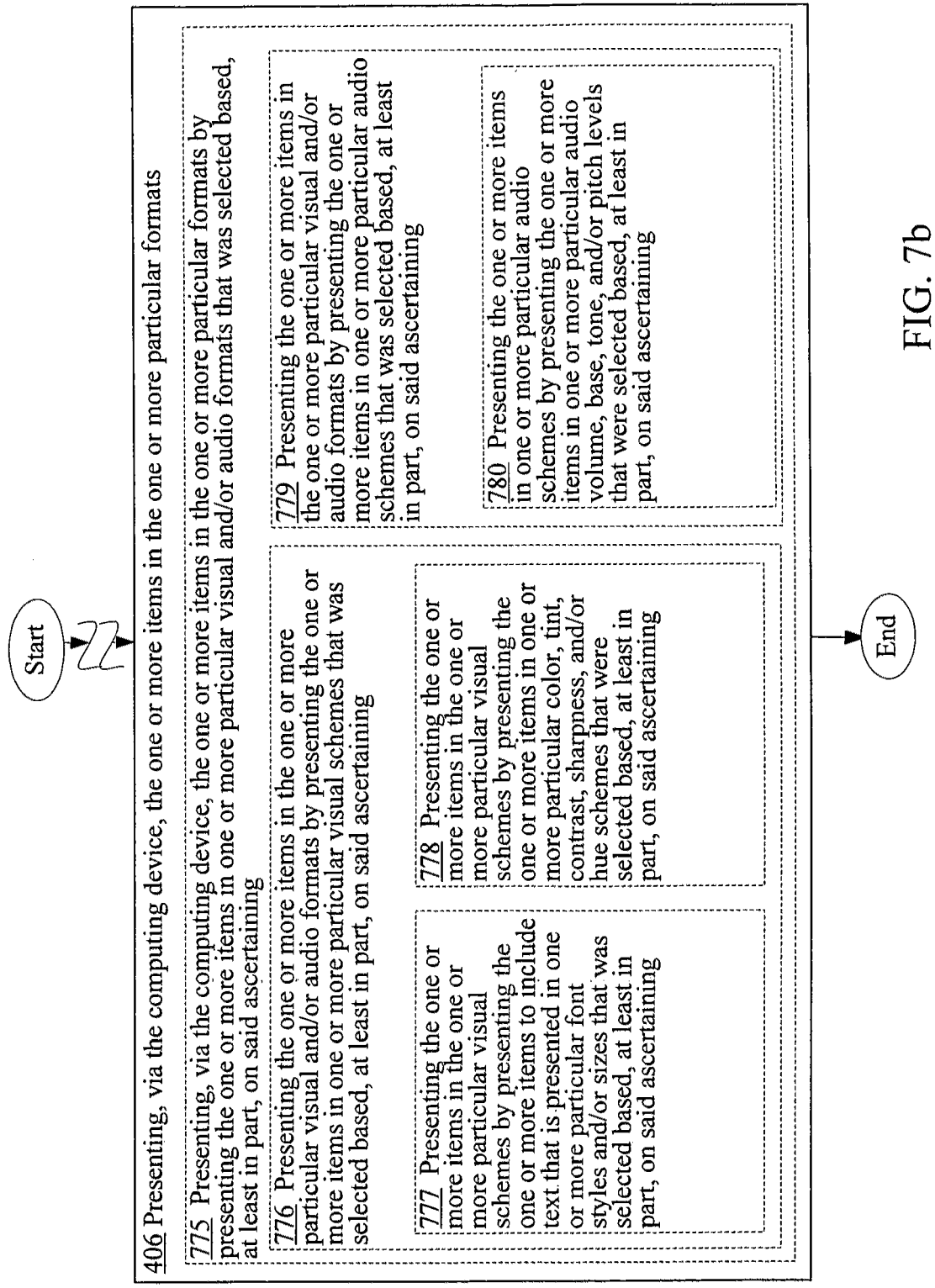
FIG. 7b is a high-level logic flowchart of a process depicting alternate implementations of the particular formatted item presenting operation 406 of FIG. 4.

Referring to FIG. 7b, in some implementations, the particular formatted item presenting operation 406 of FIG. 4 may include an operation 775 for presenting, via the computing device, the one or more items in the one or more particular formats by presenting the one or more items in one or more particular visual and/or audio formats that was selected based, at least in part, on said ascertaining. For instance, the particular formatted item presenting module 106* including the visual/audio format selecting module 241 (see FIG. 3e) of the computing device 10* presenting, via the computing device 10*, the one or more items in the one or more particular formats by presenting the one or more items in one or more particular visual and/or audio formats that was selected by the visual/audio format selecting module 241 based, at least in part, on said ascertaining of the one or more particular formats for formatting the one or more items.

As further illustrated in FIG. 7b, in various implementations, operation 775 may include one or more additional operations including an operation 776 for presenting the one or more items in the one or more particular visual and/or audio formats by presenting the one or more items in one or more particular visual schemes that was selected based, at least in part, on said ascertaining as further illustrated in FIG. 6b. For instance, the particular formatted item presenting module 106* including the visual scheme selecting module 242 (see FIG. 3e) of the computing device 10* the one or more items in the one or more particular visual and/or audio formats by presenting the one or more items in one or more particular visual schemes (e.g., particular color, brightness, font style or size, and so forth) that was selected by the visual scheme selecting module 242 based, at least in part, on said ascertaining of the one or more particular formats.

As illustrated in FIG. 7b, in some cases, operation 776 may include an operation 777 for presenting the one or more items in the one or more particular visual schemes by presenting the one or more items to include text that is presented in one or more particular font styles and/or sizes that was selected based, at least in part, on said ascertaining. For instance, the particular formatted item presenting module 106* including the font style/size selecting module 244 (see FIG. 3e) of the computing device 10* presenting the one or more items in the one or more particular visual schemes by presenting the one or more items to include text that is presented in one or more particular font styles and/or sizes that was selected by the font style/size selecting module 244 based, at least in part, on said ascertaining of the one or more particular formats.

In the same or different implementations, operation 776 may include an operation 778 for presenting the one or more items in the one or more particular visual schemes by presenting the one or more items in one or more particular color, tint, contrast, sharpness, and/or hue schemes that were selected based, at least in part, on said ascertaining. For instance, the particular formatted item presenting module 106* including the color/tint/contrast/sharpness/hue selecting module 246 (see FIG. 3e) of the computing device 10* presenting the one or more items in the one or more particular visual schemes by presenting the one or more items in one or more particular color, tint, contrast, sharpness, and/or hue schemes that were selected by the color/tint/contrast/sharpness/hue selecting module 246 based, at least in part, on said ascertaining of the one or more particular formats.

In the same or different implementations, operation 775 may include an operation 779 for presenting the one or more items in the one or more particular visual and/or audio formats by presenting the one or more items in one or more particular audio schemes that was selected based, at least in part, on said ascertaining. For instance, the particular formatted item presenting module 106* including the audio scheme selecting module 248 (see FIG. 3e) of the computing device 10* presenting the one or more items in the one or more particular visual and/or audio formats by presenting the one or more items (e.g., audio files or audio messages) in one or more particular audio schemes that was selected by the audio scheme selecting module 248 based, at least in part, on said ascertaining of the one or more particular formats.

In some implementations, operation 779 may, in turn, include an operation 780 for presenting the one or more items in one or more particular audio schemes by presenting the one or more items in one or more particular audio volume, base, tone, and/or pitch levels that were selected based, at least in part, on said ascertaining. For instance, the particular formatted item presenting module 106* including the audio volume/base/tone/pitch level selecting module 250 (see FIG. 3e) of the computing device 10* presenting the one or more items in one or more particular audio schemes by presenting the one or more items in one or more particular audio volume, base, tone, and/or pitch levels that were selected by the audio volume/base/tone/pitch level selecting module 250 based, at least in part, on said ascertaining of the one or more particular formats.

Figure 7C:
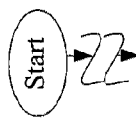
FIG. 7c is a high-level logic flowchart of a process depicting alternate implementations of the particular formatted item presenting operation 406 of FIG. 4.
Figure 7C:

Turning now to FIG. 7c, in various implementations, the particular formatted item presenting operation 406 of FIG. 4 may include an operation 781 for presenting, via the computing device, the one or more items in the one or more particular formats by presenting the one or more items in one or more modified forms based, at least in part, on said ascertaining, the one or more items in the one or more modified forms to include one or more selective portions of the one or more items that have been selectively modified based, at least in part, on said ascertaining. For instance, the particular formatted item presenting module 106* including the modified form presenting module 252 (see FIG. 3e) of the computing device 10* presenting, via the computing device 10*, the one or more items in the one or more particular formats by having the modified form presenting module 252 present the one or more items in one or more modified forms based, at least in part, on said ascertaining of the one or more particular formats, the one or more items in the one or more modified forms to include one or more selective portions of the one or more items that have been selectively modified based, at least in part, on said ascertaining of the one or more particular formats.

Figure 8A:
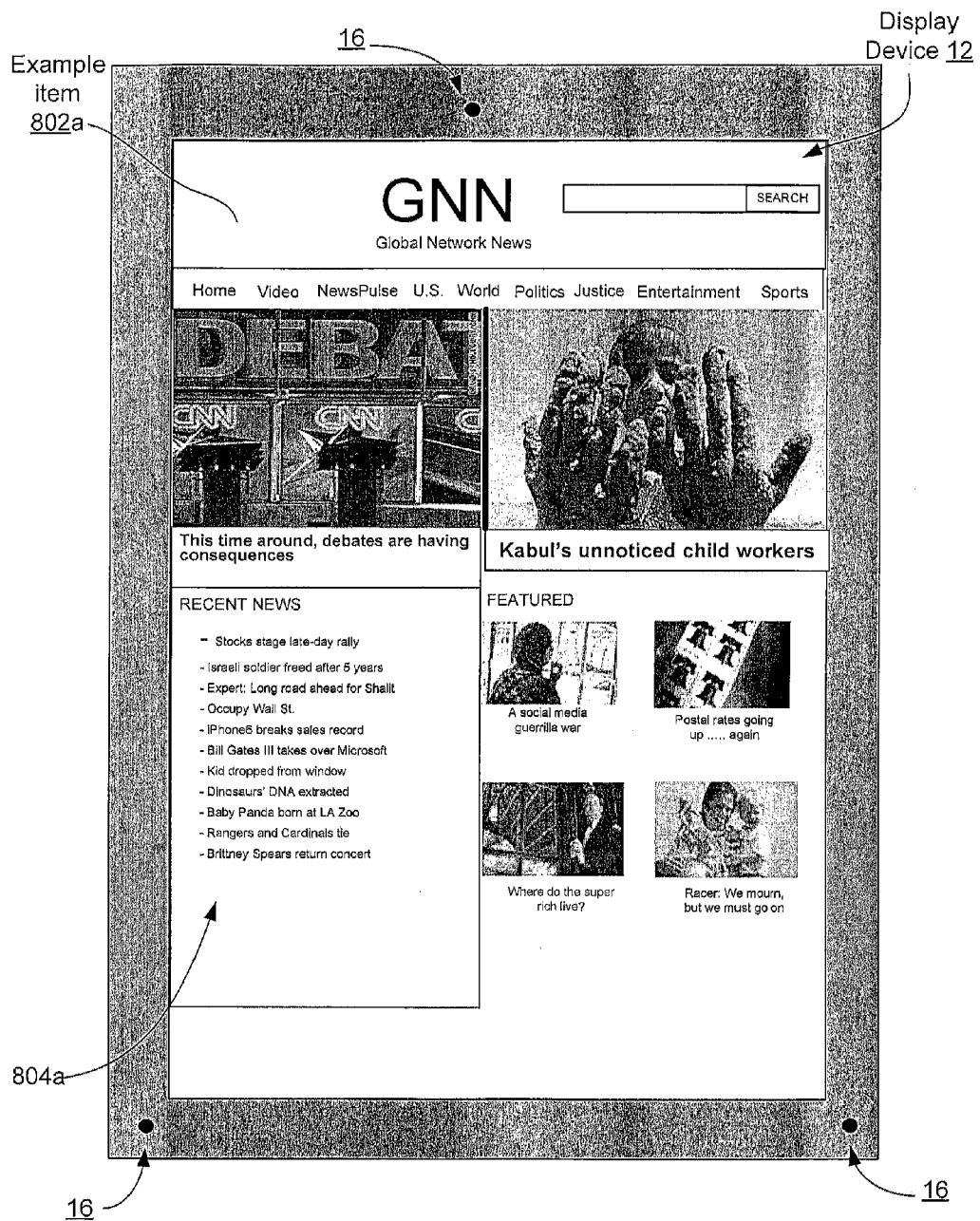
FIG. 8a illustrates an example item 802a being displayed by the computing device 10* of FIG. 1.
Figure 8B:
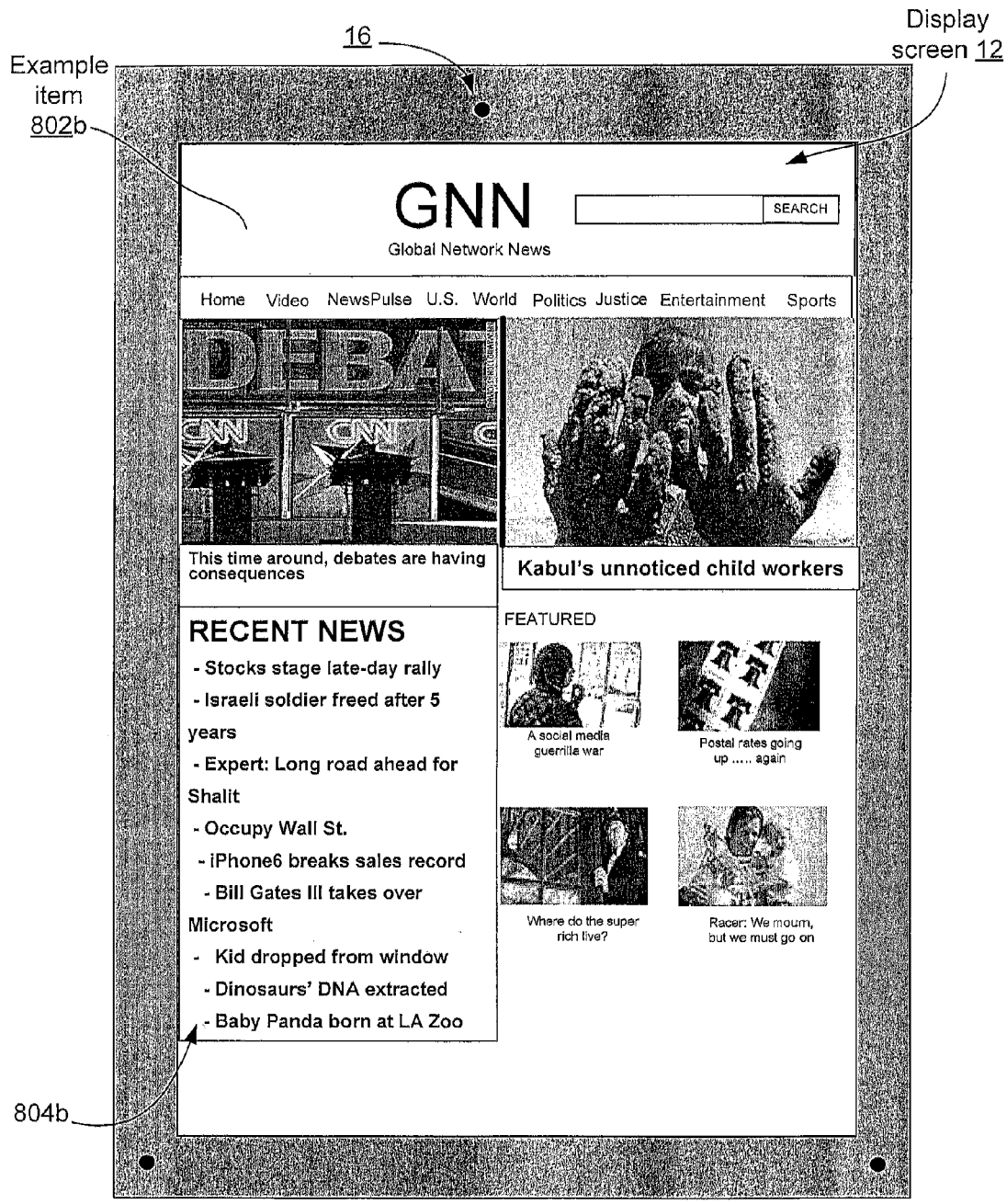
FIG. 8b illustrates an example item 802b being displayed by the computing device 10* of FIG. 1.

As a further illustration, referring now to FIG. 8*a*, which illustrate an example item 802*a* being displayed by the computing device 10* through a display device 12 (e.g., a touch screen). In this example, the example item 802*a* being a web page for an Internet news site having multiple sections or portions. Included in the example item 802*a* is a menu portion 804*a*, which allows a user to navigate to related linked pages. Turning now to FIG. 8*b*, which illustrated a modified version (illustrated as example item 802*b*) of the example item 802*a* of FIG. 8*a*. In particular, the menu portion 804*a* has been modified (depicted as menu portion 804*b*) to include text having a larger and bolded font. This may help for example, a user 20* to better see and select the text included in the modified menu portion 804*b* of the modified example item 802*b*.

As further illustrated in FIG. 7*c*, operation 781 may include one or more additional operations in various alternative implementations. For example, in various implementations, operation 781 may include an operation 782 for presenting the one or more items in the one or more modified forms by presenting the one or more items in one or more forms that are one or more modified versions of one or more versions of the one or more items that were presented via the computing device prior to said determining. For instance, the modified form presenting module 252 of the computing device 10* presenting the one or more items in the one or more modified forms by presenting the one or more items in one or more forms that are one or more modified versions of one or more versions of the one or more items that were presented via the computing device 10* prior to said determining which of the plurality of users 20* detected in proximate vicinity of the computing device 10* has primary control of the computing device 10*.

Figure 8C:
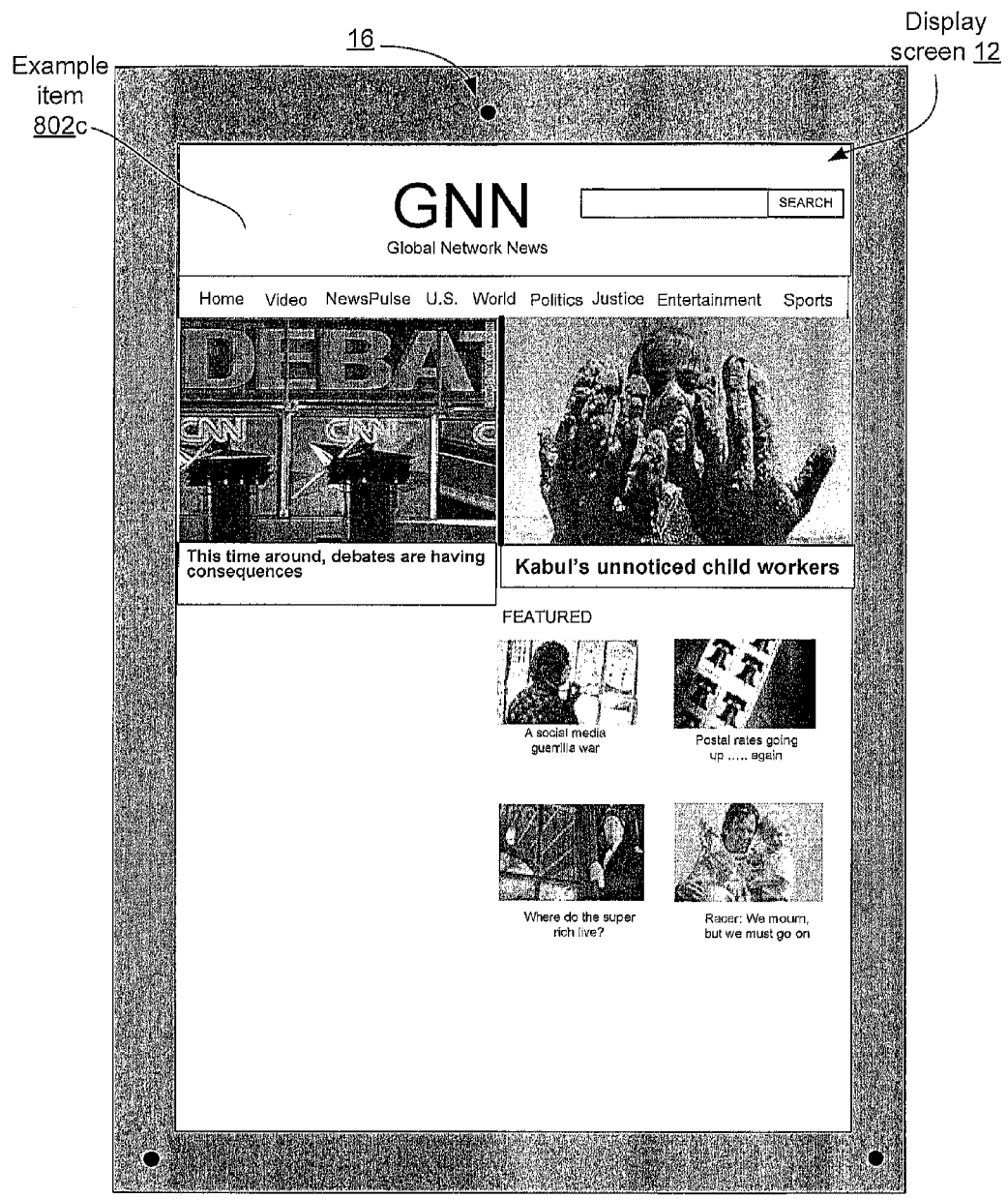
FIG. 8c illustrates an example item 802c being displayed by the computing device 10* of FIG. 1.

In the same or different implementations, operation 781 may include an operation 783 for presenting the one or more items in the one or more modified forms by presenting the one or more items to exclude one or more selective portions of the one or more items that have been selectively deleted based, at least in part, on said ascertaining. For instance, the modified form presenting module 252 including the deleting module 253 (see FIG. 3*e*) of the computing device 10* presenting the one or more items in the one or more modified forms by presenting the one or more items to exclude one or more selective portions of the one or more items that have been selectively deleted by the deleting module 253 based, at least in part, on said ascertaining of the one or more particular formats. For example, FIG. 8*c* illustrates a modified version (illustrated as example item 802*c*) of the example item 802*a* of FIG. 8*a* in which a selected portion (e.g., menu portion 804*a*) of the example item 802*c* has been deleted. As a result, such modification of the example item 802*c* may prevent a user 20* who has primary control of the computing device 10* from viewing or accessing deleted portions of the example item 802*c*.

Figure 8D:
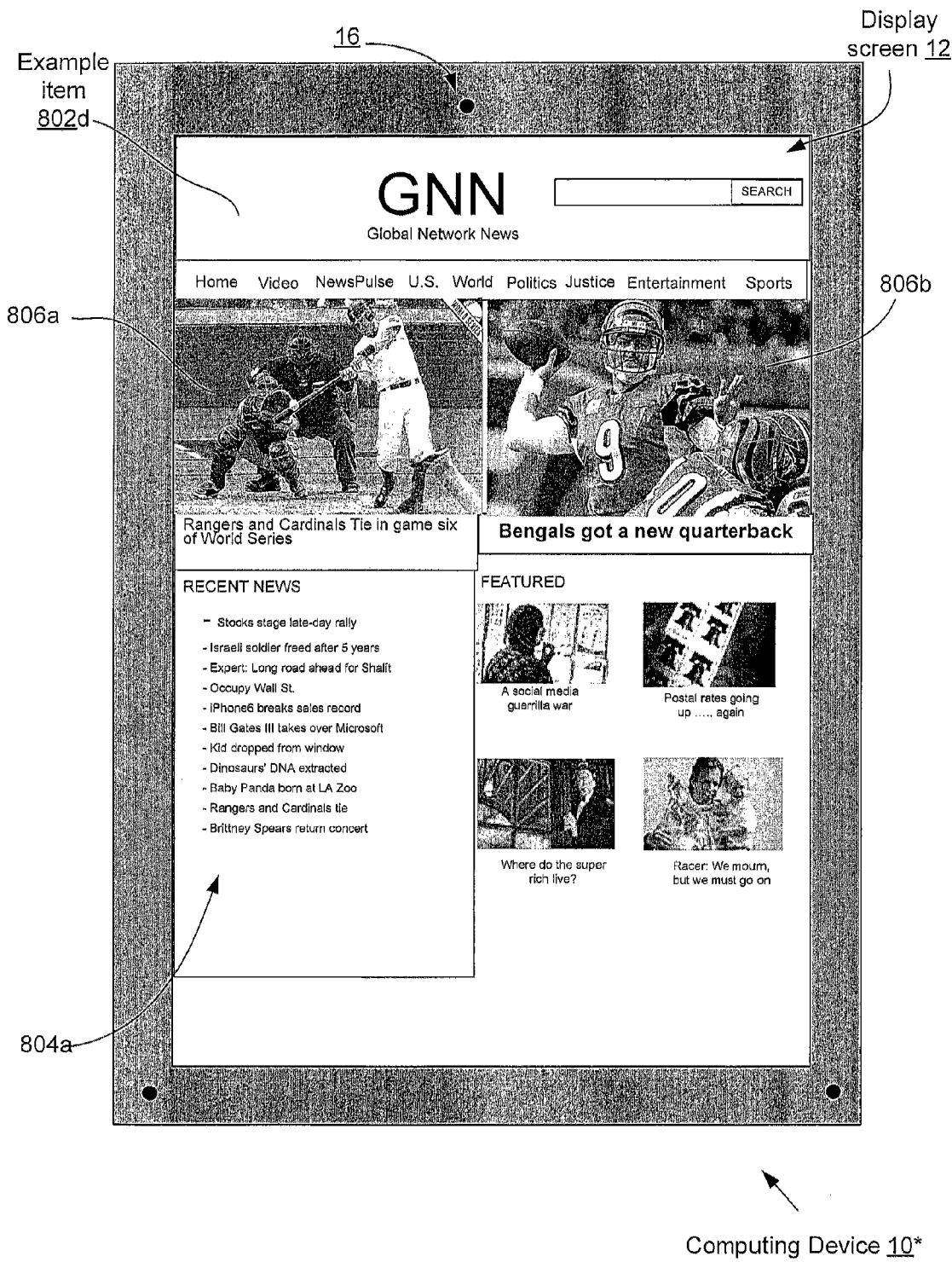
FIG. 8d illustrates an example item 802d being displayed by the computing device 10* of FIG. 1.

In the same or different implementations, operation 781 may additionally or alternatively include an operation 784 for presenting the one or more items in the one or more modified forms by presenting the one or more items to include one or more substitutes for one or more selective portions of the one or more items that have been selectively replaced based, at least in part, on said ascertaining as further depicted in FIG. 7*c*. For instance, the modified form presenting module 252 including the replacing module 254 (see FIG. 3*e*) of the computing device 10* presenting the one or more items in the one or more modified forms by presenting the one or more items to include one or more substitutes for one or more selective portions of the one or more items that have been selectively replaced by the replacing module 254 based, at least in part, on said ascertaining of the one or more particular formats. For example, FIG. 8*d* illustrates a modified version (illustrated as example item 802*d*) of the example item 802*a* of FIG. 8*a* in which two portions of original example item 802*a* have been replaced with two replacements 806*a* and 806*b* (e.g., in the case where a user 20* having primary control of the computing device 10*, for example, is primarily interested in sports rather than general news).

In the same or different implementations, operation 781 may alternatively or additionally include an operation 785 for presenting the one or more items in the one or more modified forms by presenting the one or more items to include one or more additions that have been selectively added to the one or more items based, at least in part, on said ascertaining. For instance, the modified form presenting module 252 including the adding module 255 (see FIG. 3*e*) of the computing device 10* presenting the one or more items in the one or more modified forms by presenting the one or more items to include one or more additions that have been selectively added to the one or more items by the adding module 255 based, at least in part, on said ascertaining the one or more particular formats. An example result of such an operation would be, for example, the inverse of FIGS. 8*a* and 8*c*. That is, instead of deleting menu portion 804*a*, adding the menu portion 804*a* to the example item 802*c* of FIG. 8*c*.

In the same or different implementations, operation 781 may alternatively or additionally include an operation 786 for presenting the one or more items in the one or more modified forms by presenting the one or more items to include one or more portions that have been selectively altered based, at least in part, on said ascertaining. For instance, the modified form presenting module 252 including the altering module 256 (see FIG. 3*e*) of the computing device 10* presenting the one or more items in the one or more modified forms by presenting the one or more items to include one or more portions that have been selectively altered (e.g., changing a color in an image) by the altering module 256 based, at least in part, on said ascertaining of the one or more particular formats.

In various implementations, the particular formatted item presenting operation 406 of FIG. 4 may include an operation 787 for presenting the one or more items in the one or more particular formats by presenting the one or more items through a user interface that has been particularly configured to present the one or more items in one or more particular ways, the user interface being particularly configured based, at least in part, on said ascertaining. For instance, the particular formatted item presenting module 106* including the user interface configuring module 260 (see FIG. 3*e*) of the computing device 10* presenting the one or more items in the one or more particular formats by presenting the one or more items through a user interface 110 that has been particularly configured by the user interface configuring module 260 to present the one or more items in one or more particular ways, the user interface being particularly configured based, at least in part, on said ascertaining.

In some implementations, operation 787 may further include an operation 788 for presenting the one or more items through the user interface that has been particularly configured to present the one or more items in the one or more particular ways, the user interface to be visually configured in the one or more particular ways based, at least in part, on said ascertaining. For instance, the particular formatted item presenting module 106* including the visual configuring module 261 (see FIG. 3e) of the computing device 10* presenting the one or more items through the user interface 110 (e.g., a touchscreen) that has been particularly configured by the visual configuring module 261 to present the one or more items in the one or more particular ways, the user interface 110 to be visually configured (e.g., adjust color or brightness of a touch screen) by the visual configuring module 261 in the one or more particular ways based, at least in part, on said ascertaining the one or more particular formats.

In the same or different implementations, operation 787 may additionally or alternatively include an operation 789 for presenting the one or more items through the user interface that has been particularly configured to present the one or more items in the one or more particular ways, the user interface to be audibly configured in the one or more particular ways based, at least in part, on said ascertaining. For instance, the particular formatted item presenting module 106* including the audio configuring module 262 of the computing device 10* presenting the one or more items through the user interface 110 (e.g., speakers) that has been particularly configured by the audio configuring module 262 to present the one or more items in the one or more particular ways, the user interface 110 to be audibly configured by the audio configuring module 262 in one or more particular ways based, at least in part, on said ascertaining the one or more particular formats.

Figure 7D:
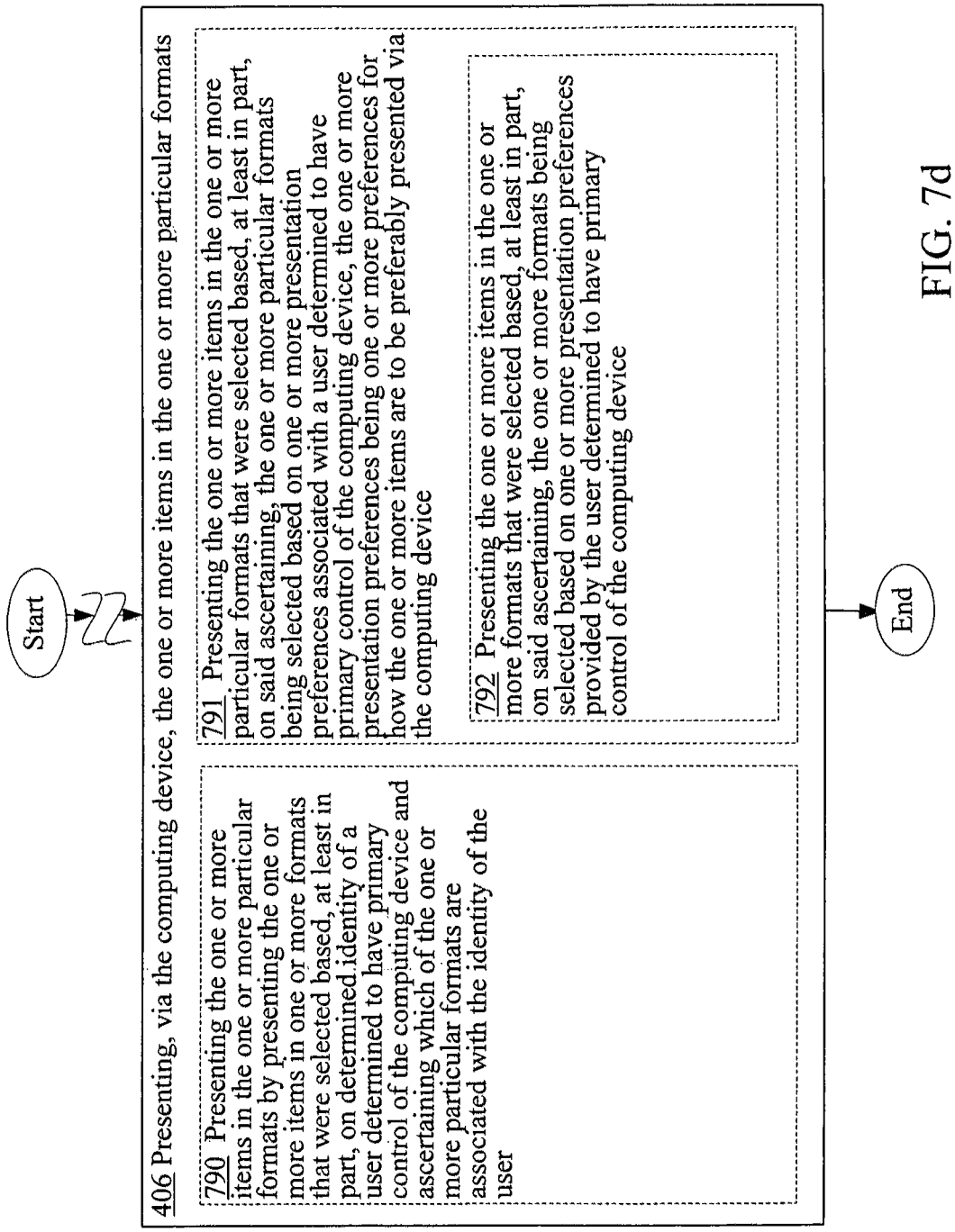
FIG. 7d is a high-level logic flowchart of a process depicting alternate implementations of the particular formatted item presenting operation 406 of FIG. 4.

Referring now to FIG. 7d, in the same or different implementations, the particular formatted item presenting operation 406 of FIG. 4 may include an operation 690 for presenting the one or more items in the one or more particular formats by presenting the one or more items in one or more formats that were selected based, at least in part, on determined identity of a user determined to have primary control of the computing device and ascertaining which of the one or more particular formats are associated with the identity of the user. For instance, the particular formatted item presenting module 106* including the format selecting module 264 (see FIG. 3e) of the computing device 10* presenting the one or more items in the one or more particular formats by presenting the one or more items in one or more formats that were selected by the format selecting module 264 based, at least in part, on determined identity of a user 20*(as determined by, for example, the user identifying module 218) determined to have primary control of the computing device 10* and ascertaining by the format ascertaining module 104 as to which of the one or more particular formats are associated with the identity of the user 20* determined to have primary control of the computing device 10*. For example, the computing device 10* or the logic endowed with the computing device 10*, upon at least partially identifying the user 20* determined to have primary control of the computing device 10* may search through its memory 114 for one or more presentation preferences 174 (see FIG. 3a or 3b) that are associated with the user 20* and to apply one or more formats to the one or more items as dictated by the one or more presentation preferences 174 of the user 20*.

Note that in various implementations, a presentation preference 174 may indicate how one or more items may be preferably presented (e.g., preferable format) via, for example, the computing device 10*. Note further that a presentation preference 174 of a particular user 20* may or may not be the actual preferences of that particular user 20*. That is, in some cases, a presentation preference 174 of the particular user 20* may be the preference of another party. In other cases, however, a presentation preference 174 of the particular user 20* may be the preference of the particular user 20*. For example, if the particular user 20* is the primary user or owner of the computing device 10*, then the presentation preference 174 of the particular user 20* may be the preference of the particular user 20* as to how the particular user 20* wishes the one or more items to be presented to the particular user 20* via the computing device 10*. On the other hand, if the particular user 20* is some third party who has no direct connection to the computing device 10*(e.g., not a primary user or owner of the computing device 10*), then the presentation preference 174 of the particular user 20* may be a preference of another party such as a primary user or owner of the computing device 10* as to how the other party (e.g., the primary user or owner) wishes the one or more items are to be presented when the particular user 20* has primary control of the computing device 10*.

Accordingly and as further illustrated in FIG. 7d, in some cases, the particular formatted item presenting operation 406 of FIG. 4 may include an operation 791 for presenting the one or more items in the one or more particular formats that were selected based, at least in part, on said ascertaining, the one or more particular formats being selected based on one or more presentation preferences associated with a user determined to have primary control of the computing device, the one or more presentation preferences being one or more preferences for how the one or more items are to be preferably presented via the computing device. For instance, the particular formatted item presenting module 106* including the format selecting module 264 of the computing device 10* presenting the one or more items in the one or more particular formats that were selected by the format selecting module 264 based, at least in part, on said ascertaining the one or more particular formats, the one or more formats being selected by the format selecting module 264 based on one or more presentation preferences 174 associated with the user 20* determined to have primary control of the computing device 10*, the one or more presentation preferences 174 being one or more preferences for how the one or more items are to be preferably presented via the computing device 10*.

As further illustrated in FIG. 7d, in some implementations, operation 791 may further include an operation 792 for presenting the one or more items in the one or more formats that were selected based, at least in part, on said ascertaining, the one or more formats being selected based on one or more presentation preferences provided by the user determined to have primary control of the computing device. For instance, the particular formatted item presenting module 106* including the format selecting module 264 of the computing device 10* presenting the one or more items in the one or more formats that were selected by the format selecting module 264 based, at least in part, on said ascertaining the one or more particular formats, the one or more formats being selected by the format selecting module 264 based on one or more presentation preferences 174 provided by the user 20* determined to have primary control of the computing device 10*.

Figure 7E:
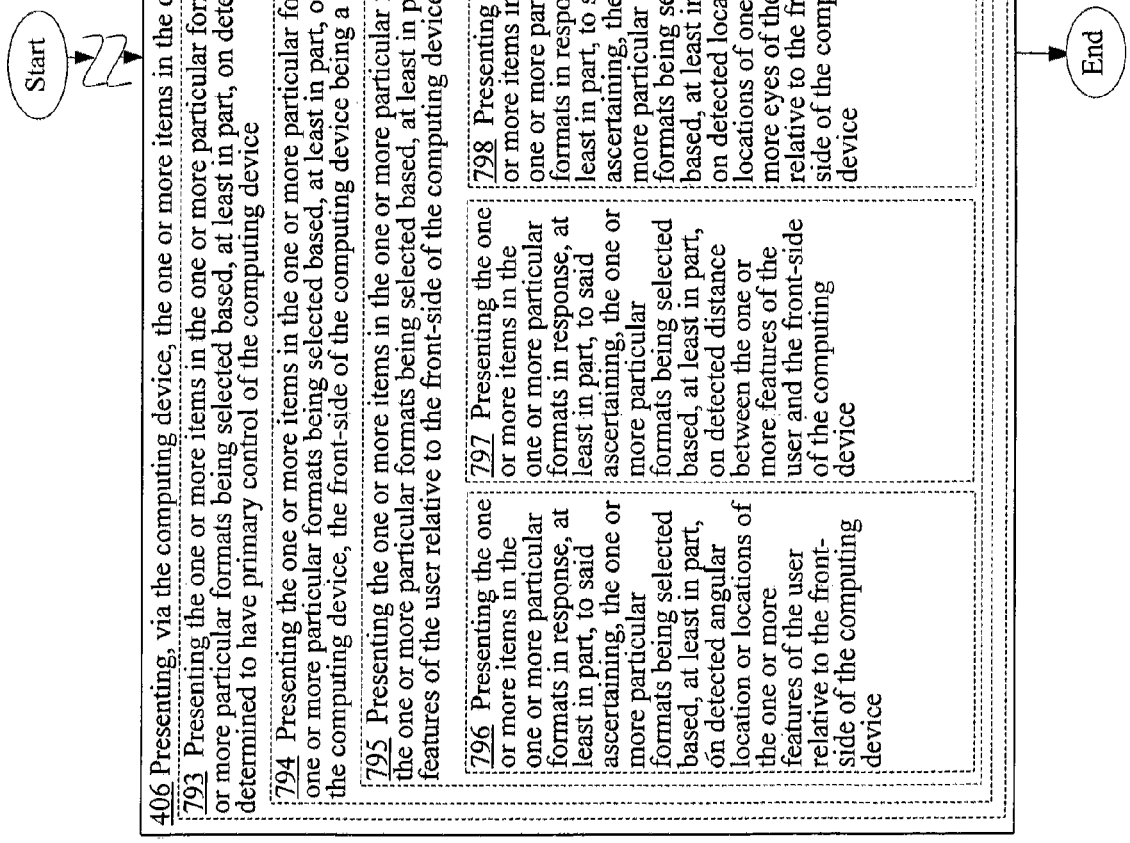
FIG. 7e is a high-level logic flowchart of a process depicting alternate implementations of the particular formatted item presenting operation 406 of FIG. 4.

Turning now to FIG. 7e, in various implementations, the particular formatted item presenting operation 406 of FIG. 4 may include an operation 793 for presenting the one or more items in the one or more particular formats in response, at least in part, to said ascertaining, the one or more particular formats being selected based, at least in part, on detected location, relative to the computing device, of a user determined to have primary control of the computing device. For instance, the particular formatted item presenting module 106* including the format selecting module 264 and the user location detecting module 266 (see FIG. 3e) of the computing device 10* presenting the one or more items in the one or more particular formats in response, at least in part, to said ascertaining of the one or more particular formats, the one or more particular formats being selected by the format selecting module 264 based, at least in part, on detected (e.g., determined) location relative to the computing device 10*, as detected by the user location determining module 248, of the user 20* determined to have primary control of the computing device 10*.

As further illustrated in FIG. 7e, in various implementations, operation 793 may include one or more additional operations in various alternative implementations. For example, in some implementations, operation 793 may include an operation 794 for presenting the one or more items in the one or more particular formats in response, at least in part, to said ascertaining, the one or more particular formats being selected based, at least in part, on the detected location of the user relative to front-side of the computing device, the front-side of the computing device being a side of the computing device having a display device. For instance, the particular formatted item presenting module 106* including the format selecting module 264 and the user location detecting module 266 of the computing device 10* presenting the one or more items in the one or more particular formats in response, at least in part, to said ascertaining of the one or more particular formats, the one or more particular formats being selected by the format selecting module 264 based, at least in part, on the detected (e.g., determined) location of the user 20*(as detected by the user location detecting module 266) relative to front-side 17a of the computing device 10*, the front-side 17a of the computing device 10* being a side of the computing device 10* having a display device 12.

In some cases, operation 794 may further include an operation 795 for presenting the one or more items in the one or more particular formats in response, at least in part, to said ascertaining, the one or more particular formats being selected based, at least in part, on detected location or locations of one or more features of the user relative to the front-side of the computing device. For instance, the particular formatted item presenting module 106* including the format selecting module 264 and the user location detecting module 266 of the computing device 10* presenting the one or more items in the one or more particular formats in response, at least in part, to said ascertaining of the one or more particular formats, the one or more particular formats being selected by the format selecting module 264 based, at least in part, on detected (e.g., determined) location or locations (e.g., as detected by the user location detecting module 266) of one or more features of the user 20* relative to the front-side 17a of the computing device 10*.

As further illustrated in FIG. 7e, operation 795 may include one or more additional operations in various alternative implementations. For example, in some implementations, operation 795 may include an operation 796 for presenting the one or more items in the one or more particular formats in response, at least in part, to said ascertaining, the one or more particular formats being selected based, at least in part, on detected angular location or locations of the one or more features of the user relative to the front-side of the computing device. For instance, the particular formatted item presenting module 106* including the format selecting module 264 and the user location detecting module 266 of the computing device 10* presenting the one or more items in the one or more particular formats in response, at least in part, to said ascertaining of the one or more particular formats, the one or more particular formats being selected by the format selecting module 264 based, at least in part, on detected angular location or locations (e.g., as detected by the user location detecting module 266) of the one or more features of the user 20* relative to the front-side 17a of the computing device 10*. For example, if the user location determining module 264 determines that the face or the eyes of the user 20* determined to have primary control of the computing device 10* is not located directly in front of the display device 12, but instead, is determined to be located on the periphery or side of the display device 12, then the format selecting module 264 may accordingly select the best color scheme or brightness level (e.g. formats) for the one or more items to be displayed through the display device 12 that will allow the user 20* to see the one or more items even though the user 20* will be viewing the items from an angle.

In the same or different implementations, operation 795 may include an operation 797 for presenting the one or more items in the one or more particular formats in response, at least in part, to said ascertaining, the one or more particular formats being selected based, at least in part, on detected distance between the one or more features of the user and the front-side of the computing device. For instance, the particular formatted item presenting module 106* including the format selecting module 264 and the user location detecting module 266 of the computing device 10* presenting the one or more items in the one or more particular formats in response, at least in part, to said ascertaining of the one or more particular formats, the one or more particular formats being selected by the format selecting module 264 based, at least in part, on detected distance (e.g., as detected by the user location detecting module 266) between the one or more features of the user 20* and the front-side 17a of the computing device 10*. For example, increasing the font size of the one or more items or increasing brightness of the display device 12 through which the one or more items are to be displayed if the face of the user 20* having primary control of computing device 10* is determined by the user location determining module 248 as being relatively "far away" from the front-side 17a of the computing device 10*.

In the same or different implementations, operation 795 may include an operation 798 for presenting the one or more items in the one or more particular formats in response, at least in part, to said ascertaining, the one or more particular formats being selected based, at least in part, on detected location or locations of one or more eyes of the user relative to the front-side of the computing device. For instance, the particular formatted item presenting module 106* including the format selecting module 264 and the user location detecting module 266 of the computing device 10* presenting the one or more items in the one or more particular formats in response, at least in part, to said ascertaining of the one or more particular formats, the one or more particular formats being selected by the format selecting module 264 based, at least in part, on detected location or locations (e.g., as detected by the user location detecting module 266) of one or more eyes of the user relative to the front-side 17a of the computing device.

In the same or different implementations, operation 795 may include an operation 799 for presenting the one or more items in the one or more particular formats in response, at least in part, to said ascertaining, the one or more particular formats being selected based, at least in part, on detected location of a face of the user relative to the front-side of the computing device. For instance, the particular formatted item presenting module 106* including the format selecting module 264 and the user location detecting module 266 of the computing device 10* presenting the one or more items in the one or more particular formats in response, at least in part, to said ascertaining of the one or more particular formats, the one or more particular formats being selected by the format selecting module 264 based, at least in part, on detected location (e.g., as detected by the user location detecting module 266) of a face of the user relative to the front-side 17a of the computing device 10*.

In the same or different implementations, operation 795 may include an operation 800 for presenting the one or more items in the one or more particular formats in response, at least in part, to said ascertaining, the one or more particular formats being selected based, at least in part, on the detected location or locations of the one or more features of the user as sensed by one or more image capturing devices. For instance, the particular formatted item presenting module 106* including the format selecting module 264 and the user location detecting module 266 of the computing device 10* presenting the one or more items in the one or more particular formats in response, at least in part, to said ascertaining of the one or more particular formats, the one or more particular formats being selected by the format selecting module 264 based, at least in part, on the detected location or locations (e.g., as detected by the user location detecting module 266) of the one or more features of the user as sensed by one or more image capturing devices 304.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system comprising:
    a primary control determining module configured to determine which of a plurality of users detected in proximate vicinity of a computing device has primary control of the computing device, the detected plurality of users to include at least some users jointly using the computing device by at least providing input at least in part via a shared input device associated with the computing device, the computing device designed for presenting one or more items;
    a format ascertaining module configured to ascertain one or more particular formats for formatting the one or more items responsive, at least in part, to said primary control determining module, the format ascertaining module including at least:
        a user associated format ascertaining module configured to ascertain that the one or more particular formats are associated with the user detected as having primary control of the computing device, the user associated format ascertaining module including at least:
            a user associated presentation preference ascertaining module configured to ascertain that one or more presentation preferences are associated with the user detected as having primary control of the computing device, the one or more presentation preferences being one or more preferences for how the one or more items are to be preferably presented via the computing device; and
    a particular formatted item presenting module configured to present, via the computing device, the one or more items in the one or more particular formats; and
    wherein each of the primary control determining module and the format ascertaining module is as least partially implemented with one or more processing devices and/or one or more memory devices.

2. The system of claim 1, wherein said primary control determining module comprises:
   a primary control determining module configured to determine automatically which of the plurality of users detected in the proximate vicinity of the computing device has primary control of the computing device.

3. The system of claim 2, wherein said primary control determining module comprises:
   a primary control determining module including a user detecting module and a user relinquishment detecting module configured to determine automatically which of the plurality of users detected in the proximate vicinity of the computing device by the user detecting module has primary control of the computing device in response to detecting by the user relinquishment detecting module that a user has relinquished primary control of the computing device.

4. The system of claim 3, wherein said primary control determining module including a user detecting module and a user relinquishment detecting module comprises:
   a primary control determining module including a user detecting module and a user relinquishment detecting module configured to determine automatically which of the plurality of users detected in the proximate vicinity of the computing device, as detected by the user detecting module, has primary control of the computing device in response to detecting by the user relinquishment detecting module that a user has relinquished primary control of the computing device, the user relinquishment detecting module configured to perform the detection that a user has relinquished primary control of the computing device based at least in part on one or more movements of the computing device, one or more visual cues, and/or one or more audio cues that when detected allow an inference of a transfer of the computing device from the user to another user.

5. The system of claim 2, wherein said primary control determining module comprises:
   a primary control determining module including a user detecting module configured to determine automatically which of the plurality of users detected in the proximate vicinity of the computing device, as detected by the user detecting module, has primary control of the computing device in response to detecting presence of the plurality of users in the proximate vicinity of the computing device.

6. The system of claim 1, wherein said primary control determining module comprises:
   a user detecting module configured to detect the plurality of users being in the proximate vicinity of the computing device based, at least in part, on data provided by one or more sensors.

7. The system of claim 1, wherein said primary control determining module comprises:
   a user spatial location detecting module configured to detect spatial locations of the plurality of users with respect to the computing device.

8. The system of claim 7, wherein said user spatial location detecting module comprises:
   a nearest user detecting module configured to detect which of the plurality of users is or are spatially nearest to the computing device.

9. The system of claim 8, wherein said nearest user detecting module comprises:
   a visual nearest user detecting module configured to detect visually which of the plurality of users is or are spatially nearest to the computing device.

10. The system of claim 8, wherein said nearest user detecting module comprises:
    an audio nearest user detecting module configured to detect audibly which of the plurality of users is or are audibly nearest to the computing device.

11. The system of claim 7, wherein said user spatial location detecting module comprises:
    a nearest user detecting module configured to detect visually and audibly which of the plurality of users is or are visually and audibly nearest to the computing device.

12. The system of claim 7, wherein said user spatial location detecting module comprises:
    a user spatial location detecting module configured to detect spatial locations of the plurality of users relative to specific orientation of the computing device, the computing device having at least a first side and a second side opposite of the first side, the first side having at least a display device.

13. The system of claim 12, wherein said user spatial location detecting module comprises:
    a user spatial location detecting module configured to detect which of the plurality of users is or are spatially located principally on the side of the first side of the computing device.

14. The system of claim 13, wherein said user spatial location detecting module comprises:
    a centered detecting module configured to detect which of the users is spatially located centered on the first side or spatially located closest to center of the first side.

15. The system of claim 14, wherein said centered detecting module comprises:
    a centered detecting module configured to detect an eye or a pair of eyes that are centered or nearest to center of the first side of the computing device, the eye or the pair of eyes that are detected belonging to one of the plurality of users.

16. The system of claim 14, wherein said centered detecting module comprises:
    a centered detecting module configured to detect a face that is centered or nearest to center of the first side of the computing device, the face that is detected belonging to one of the plurality of users.

17. The system of claim 1, wherein said primary control determining module comprises:
    a movement detecting module configured to detect that the computing device is exhibiting one or more movements that at least substantially matches with one or more signature movements of a particular user from the plurality of users detected in the proximate vicinity of the computing device.

18. The system of claim 1, wherein said primary control determining module comprises:
    a primary control determining module including a user identifying module configured to determine which of the plurality of users detected in the proximate vicinity of the computing device has primary control of the computing device by having the user identifying module at least partially identify the user detected as having primary control of the computing device.

19. The system of claim 18, wherein said user identifying module comprises:
    a user identifying module configured to identify at least partially the user detected as having primary control of the computing device by identifying at least partially the user based, at least in part, on data provided by one or more image capturing devices.

20. The system of claim 18, wherein said user identifying module comprises:
a user identifying module including a registered user determining module configured to identify at least partially the user detected as having primary control of the computing device by having the registered user determining module determine that the detected user who was detected as having primary control of the computing device is a registered user who is registered with the computing device.

21. The system of claim 20, wherein said registered user determining module comprises:
a registered user determining module including an identification credential acquiring module and a registered identification credential determining module configured to determine that the detected user is a registered user by having the identification credential acquiring module acquire the detected user's one or more identification credentials and by having the registered identification credential determining module determine that the detected user's one or more identification credentials are registered with the computing device.

22. The system of claim 21, wherein registered identification credential determining module comprises:
a registered presentation preference determining module configured to determine whether there are one or more presentation preferences that have been registered with the computing device and that are associated with the detected user's one or more identification credentials, the one or more presentation preferences being one or more preferences for how the one or more items are to be preferably presented via the computing device.

23. The system of claim 20, wherein said registered user determining module comprises:
a registered presentation preference determining module configured to determine that one or more presentation preferences associated with the detected user are registered with the computing device, the one or more presentation preferences being one or more preferences for how the one or more items are to be preferably presented via the computing device.

24. The system of claim 1, wherein said user associated presentation preference ascertaining module comprises:
a user associated presentation preference ascertaining module configured to ascertain that one or more presentation preferences are associated with the user detected as having primary control of the computing device, the one or more presentation preferences defining the one or more particular formats.

25. The system of claim 1, wherein said particular formatted item presenting module comprises:
a particular formatted item presenting module including a visual/audio format selecting module configured to present the one or more items in the one or more particular formats by presenting the one or more items in one or more particular visual and/or audio formats that was selected by the visual/audio format selecting module based, at least in part, on said ascertaining.

26. The system of claim 25, wherein said particular formatted item presenting module including a visual/audio format selecting module comprises:
a particular formatted item presenting module including a visual scheme selecting module configured to present the one or more items in the one or more particular formats by presenting the one or more items in one or more particular visual and/or audio formats that was selected by the visual scheme selecting module based, at least in part, on said ascertaining.

27. The system of claim 26, wherein said particular formatted item presenting module including a visual scheme selecting module comprises:
a particular formatted item presenting module including a font style/size selecting module configured to present the one or more items in one or more particular visual schemes by presenting the one or more items to include text that is presented in one or more particular font styles and/or sizes that was selected by the font style/size selecting module based, at least in part, on said ascertaining.

28. The system of claim 26, wherein said particular formatted item presenting module including a visual scheme selecting module comprises:
a particular formatted item presenting module including a color/tint/contrast/sharpness/hue selecting module configured to present the one or more items in one or more particular visual schemes by presenting the one or more items in one or more particular color, tint, contrast, sharpness, and/or hue schemes that were selected by the color/tint/contrast/sharpness/hue selecting module based, at least in part, on said ascertaining.

29. The system of claim 25, wherein said particular formatted item presenting module including a visual/audio format selecting module comprises:
a particular formatted item presenting module including an audio scheme selecting module configured to present the one or more items in the one or more particular visual and/or audio formats by presenting the one or more items in one or more particular audio schemes that was selected by the audio scheme selecting module based, at least in part, on said ascertaining.

30. The system of claim 1, wherein said particular formatted item presenting module comprises:
a particular formatted item presenting module including a modified form presenting module configured to present the one or more items in the one or more particular formats by having the modified form presenting module present the one or more items in one or more modified forms based, at least in part, on said ascertaining, the one or more items in the one or more modified forms to include one or more selective portions of the one or more items that have been selectively modified based, at least in part, on said ascertaining.

31. The system of claim 30, wherein said modified form presenting module comprises:
a modified form presenting module configured to present the one or more items in the one or more modified forms by presenting the one or more items in one or more forms that are one or more modified versions of one or more versions of the one or more items that were presented via the computing device prior to said determining.

32. The system of claim 30, wherein said modified form presenting module comprises:
a modified form presenting module including a deleting module configured to present the one or more items in the one or more modified forms by presenting the one or more items to exclude one or more selective portions of the one or more items that have been selectively deleted by the deleting module based, at least in part, on said ascertaining.

33. The system of claim 30, wherein said modified form presenting module comprises:
a modified form presenting module including a replacing module configured to present the one or more items in the one or more modified forms by presenting the one or more items to include one or more substitutes for one or more selective portions of the one or more items that have been selectively replaced by the replacing module based, at least in part, on said ascertaining.

34. The system of claim 30, wherein said modified form presenting module comprises:
a modified form presenting module including an adding module configured to present the one or more items in the one or more modified forms by presenting the one or more items to include one or more additions that have been selectively added to the one or more items by the adding module based, at least in part, on said ascertaining.

35. The system of claim 30, wherein said modified form presenting module comprises:
a modified form presenting module including an alerting module configured to present the one or more items in the one or more modified forms by presenting the one or more items to include one or more portions that have been selectively altered by the alerting module based, at least in part, on said ascertaining.

36. The system of claim 1, wherein said particular formatted item presenting module comprises:
a particular formatted item presenting module including a user interface configuring module configured to present the one or more items in the one or more particular formats by presenting the one or more items through a user interface that has been particularly configured by the user interface configuring module to present the one or more items in one or more particular ways, the user interface being particularly configured based, at least in part, on said ascertaining.

37. The system of claim 36, wherein said particular formatted item presenting module including a user interface configuring module comprises:
a particular formatted item presenting module including a visual configuring module configured to present the one or more items through the user interface that has been particularly configured by the visual configuring module to present the one or more items in the one or more particular ways, the user interface to be visually configured by the visual configuring module in the one or more particular ways based, at least in part, on said ascertaining.

38. The system of claim 1, wherein said particular formatted item presenting module comprises:
a particular formatted item presenting module including a format selecting module and a user location detecting module configured to present the one or more items in the one or more particular formats in response, at least in part, to said ascertaining, the one or more particular formats being selected by the format selecting module based, at least in part, on detected location relative to the computing device, as detected by the user location detecting module, of a user determined to have primary control of the computing device.

39. The system of claim 38, wherein said particular formatted item presenting module including a format selecting module and a user location detecting module comprises:
a particular formatted item presenting module including a format selecting module and a user location detecting module configured to present the one or more items in the one or more particular formats in response, at least in part, to said ascertaining, the one or more particular formats being selected by the format selecting module based, at least in part, on the detected location of the user as detected by the user location detecting module relative to front-side of the computing device, the front-side of the computing device being a side of the computing device having a display device.

40. The system of claim 39, wherein said particular formatted item presenting module including a format selecting module and a user location detecting module comprises:
a particular formatted item presenting module including a format selecting module and a user location detecting module configured to present the one or more items in the one or more particular formats in response, at least in part, to said ascertaining, the one or more particular formats being selected by the format selecting module based, at least in part, on detected location or locations, as detected by the user location detecting module, of one or more features of the user relative to the front-side of the computing device.

41. The system of claim 40, wherein said particular formatted item presenting module including a format selecting module and a user location detecting module comprises:
a particular formatted item presenting module including a format selecting module and a user location detecting module configured to present the one or more items in the one or more particular formats in response, at least in part, to said ascertaining, the one or more particular formats being selected by the format selecting module based, at least in part, on detected angular location or locations, as detected by the user location detecting module, of the one or more features of the user relative to the front-side of the computing device.

42. The system of claim 40, wherein said particular formatted item presenting module including a format selecting module and a user location detecting module comprises:
a particular formatted item presenting module including a format selecting module and a user location detecting module configured to present the one or more items in the one or more particular formats in response, at least in part, to said ascertaining, the one or more particular formats being selected by the format selecting module based, at least in part, on detected distance, as detected by the user location detecting module, between the one or more features of the user and the front-side of the computing device.

43. The system of claim 40, wherein said particular formatted item presenting module including a format selecting module and a user location detecting module comprises:
a particular formatted item presenting module including a format selecting module and a user location detecting module configured to present the one or more items in the one or more particular formats in response, at least in part, to said ascertaining, the one or more particular formats being selected by the format selecting module based, at least in part, on the detected location or locations, as detected by the user location detecting module, of the one or more features of the user as sensed by one or more image capturing devices.

44. A computationally-implemented system, comprising:
circuitry for determining which of a plurality of users detected in proximate vicinity of a computing device has primary control of the computing device, the detected plurality of users to include at least some users jointly using the computing device by at least providing input at least in part via a shared input device associated with the computing device, the computing device designed for presenting one or more items;
circuitry for ascertaining one or more particular formats for formatting the one or more items responsive, at least in part, to said circuitry for determining, the circuitry for ascertaining one or more particular formats being configured to ascertain the one or more particular formats based at least in part on ascertaining that one or more presentation preferences are associated with a user that is determined to have primary control of the computing device, the one or more presentation preferences being one or more preferences for how the one or more items are to be preferably presented via the computing device; and circuitry for presenting, via the computing device, the one or more items in the one or more particular formats.

45. An article of manufacture, comprising:

a non-transitory signal bearing storage medium bearing:

one or more instructions for determining which of a plurality of users detected in proximate vicinity of a computing device has primary control of the computing device, the detected plurality of users to include at least some users jointly using the computing device by at least providing input at least in part via a shared input device associated with the computing device, the computing device designed for presenting one or more items;

one or more instructions for ascertaining one or more particular formats for formatting the one or more items based, at least in part, on said determining, the ascertaining of the one or more particular formats being based at least in part on ascertaining that one or more presentation preferences are associated with a user that is determined to have primary control of the computing device, the one or more presentation preferences being one or more preferences for how the one or more items are to be preferably presented via the computing device; and one or more instructions for presenting, via the computing device, the one or more items in the one or more particular formats.

46. The system of claim 1 wherein the primary control determining module configured to determine which of a plurality of users detected in proximate vicinity of a computing device has primary control of the computing device, the detected plurality of users to include at least some users jointly using the computing device by at least providing input at least in part via a shared input device associated with the computing device, the computing device designed for presenting one or more items comprises:

a primary control determining module configured to determine which of a plurality of users detected in proximate vicinity of a computing device has primary control of the computing device, the detected plurality of users to include at least some users jointly using the computing device by at least providing input at least in part via the shared input device, wherein the shared input device includes at least a shared touch screen associated with the computing device.

47. The system of claim 1 wherein the primary control determining module configured to determine which of a plurality of users detected in proximate vicinity of a computing device has primary control of the computing device, the detected plurality of users to include at least some users jointly using the computing device by at least providing input at least in part via a shared input device associated with the computing device, the computing device designed for presenting one or more items comprises:

a primary control determining module configured to determine which of a plurality of users detected in proximate vicinity of a computing device has primary control of the computing device, the detected plurality of users to include at least some users jointly using the computing device by at least providing input at least in part via the shared input device, wherein the shared input device includes at least least a shared microphone associated with the computing device.

48. The system of claim 1 wherein the primary control determining module configured to determine which of a plurality of users detected in proximate vicinity of a computing device has primary control of the computing device, the detected plurality of users to include at least some users jointly using the computing device by at least providing input at least in part via a shared input device associated with the computing device, the computing device designed for presenting one or more items comprises:

a primary control determining module configured to determine which of a plurality of users detected in proximate vicinity of a computing device has primary control of the computing device, the detected plurality of users to include at least some users jointly using the computing device by at least providing input at least in part via the shared input device, wherein the computing device includes at least, as part of the computing device, the shared input device.

49. A system comprising:

a primary control determining module configured to determine which of a plurality of users detected in proximate vicinity of a computing device has primary control of the computing device, the computing device designed for presenting one or more items and configured to facilitate at least some of the plurality of users to jointly provide input at least in part via a shared input device associated with the computing device;

a format ascertaining module configured to ascertain one or more particular formats for formatting the one or more items responsive at least in part to said primary control determining module, the format ascertaining module including at least:

a user associated format ascertaining module configured to ascertain that the one or more particular formats are associated with the user detected as having primary control of the computing device, the user associated format ascertaining module including at least:

a user associated presentation preference ascertaining module configured to ascertain that one or more presentation preferences are associated with the user detected as having primary control of the computing device, the one or more presentation preferences being one or more preferences for how the one or more items are to be preferably presented via the computing device; and a particular formatted item presenting module configured to present, via the computing device, the one or more items in the one or more particular formats; and wherein each of the primary control determining module and the format ascertaining module is as least partially implemented with one or more processing devices and/or one or more memory devices.

* * * * *